US007027061B1

(12) United States Patent
Dotson et al.

(10) Patent No.: US 7,027,061 B1

(45) **Date of Patent: *Apr. 11, 2006**

(54) RASTER ENGINE WITH MULTIPLE COLOR DEPTH DIGITAL DISPLAY INTERFACE

(75) Inventors: Gary Dan Dotson, Muskego, WI (US); Thomas Lloyd Heidebrecht, Cambridge, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 912 days.

This patent is subject to a terminal disclaimer.

(21) Appl. No.: 09/672,637

(22) Filed: Sep. 28, 2000

(51) Int. Cl.
*G09G 5/36* (2006.01)
*G06F 13/00* (2006.01)

(52) U.S. Cl. .................................... 345/545; 345/536

(58) Field of Classification Search ............... 345/682, 345/505, 204, 698, 214, 570, 88, 506, 422, 345/536, 593, 611, 690, 3.1, 545, 554; 358/1.15, 358/1.16
See application file for complete search history.

(56) References Cited

U.S. PATENT DOCUMENTS 4,998,100 A * 3/1991 Ishii ........................... 345/3.1
5,122,783 A * 6/1992 Bassetti, Jr. ................. 345/88
5,315,540 A * 5/1994 Lawless ...................... 708/653
5,321,809 A * 6/1994 Aranda ....................... 345/570
5,758,045 A 5/1998 Moon et al.
5,841,444 A 11/1998 Mun et al.
5,898,442 A * 4/1999 Takebe ....................... 345/531
6,157,393 A * 12/2000 Potter et al. ................ 345/505
6,189,082 B1 * 2/2001 Ramamurthy ............... 711/202
6,215,459 B1 * 4/2001 Reddy et al. ................ 345/3.1
6,326,935 B1 * 12/2001 Boger ........................ 345/3.2
6,333,750 B1 * 12/2001 Odryna et al. .............. 345/629
6,466,216 B1 * 10/2002 Gotze et al. ................ 345/501
6,516,467 B1 * 2/2003 Schindler et al. ........... 725/153
6,750,876 B1 * 6/2004 Atsatt et al. ................ 345/656

* cited by examiner

*Primary Examiner*—Ryan Yang
(74) *Attorney, Agent, or Firm*—Amin & Turocy LLP; Alexander M. Gerasimow

(57) ABSTRACT

An improved raster engine adapted to render video data from a frame buffer to one of a plurality of disparate displays is disclosed which comprises an integral bounded video signature analyzer, a hardware cursor apparatus supporting dual scanned displays, programmatic support for multiple disparate display types, multi-mode programmable hardware blinking, programmable multiple color depth digital display interface, and programmable matrix controlled gray-scale generation.

20 Claims, 42 Drawing Sheets

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | STOP 10 | STOP 9 | STOP 8 | STOP 7 | STOP 6 | STOP 5 | STOP 4 | STOP 3 | STOP 2 | STOP 1 | STOP 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | START 10 | START 9 | START 8 | START 7 | START 6 | START 5 | START 4 | START 3 | START 2 | START 1 | START 0 |

HSIGSTRTSTOP

136

FIG. 6D

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | VCLR 10 | VCLR 9 | VCLR 8 | VCLR 7 | VCLR 6 | VCLR 5 | VCLR 4 | VCLR 3 | VCLR 2 | VCLR 1 | VCLR 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | HCLR 10 | HCLR 9 | HCLR 8 | HCLR 7 | HCLR 6 | HCLR 5 | HCLR 4 | HCLR 3 | HCLR 2 | HCLR 1 | HCLR 0 |

SIGCLR

138

FIG. 6E

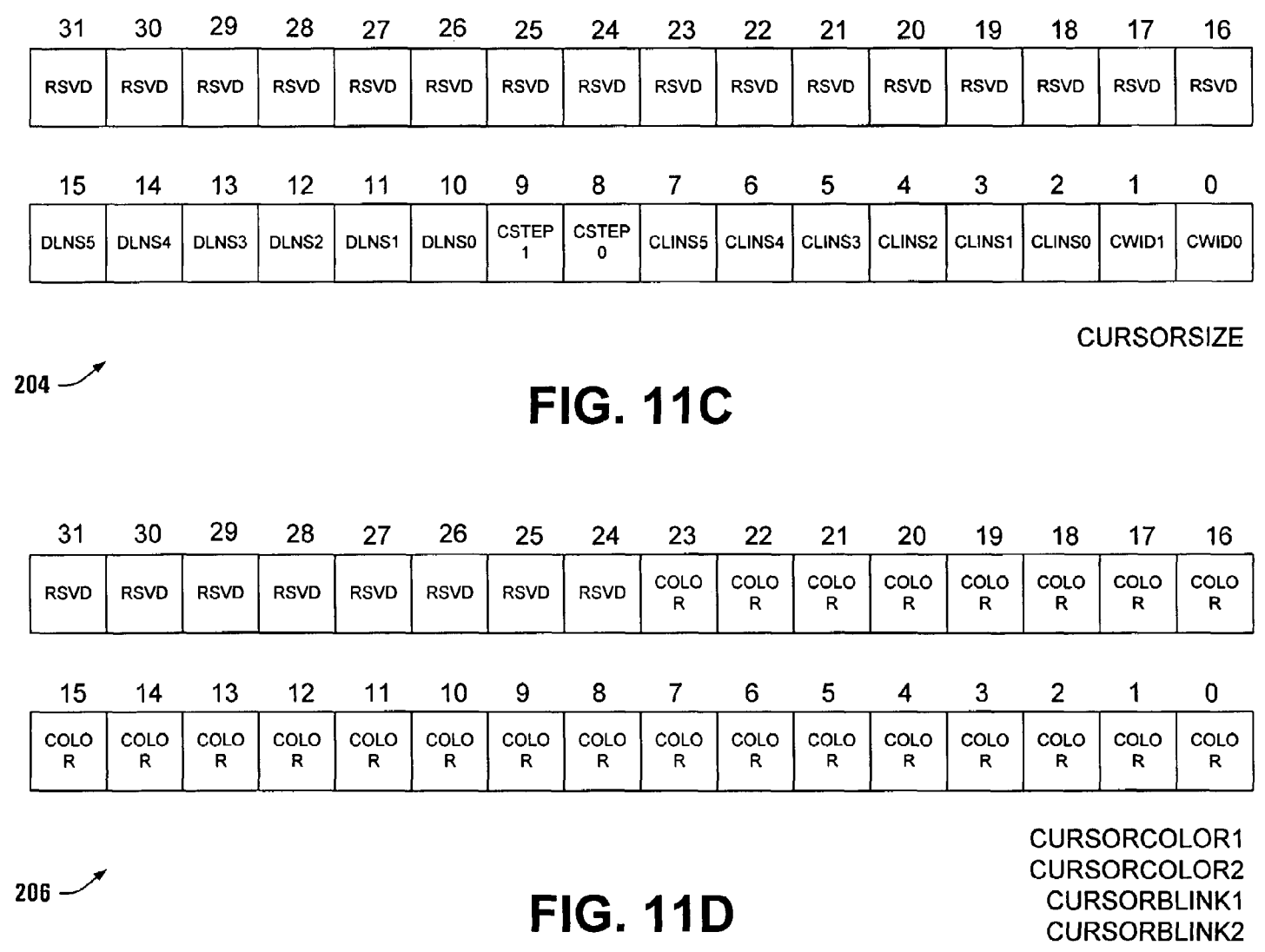

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| DLNS5 | DLNS4 | DLNS3 | DLNS2 | DLNS1 | DLNS0 | CSTEP 1 | CSTEP 0 | CLINS5 | CLINS4 | CLINS3 | CLINS2 | CLINS1 | CLINS0 | CWID1 | CWID0 |

CURSORSIZE

204

FIG. 11C

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | COLO R | COLO R | COLO R | COLO R | COLO R | COLO R | COLO R | COLO R |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| COLO R | COLO R | COLO R | COLO R | COLO R | COLO R | COLO R | COLO R | COLO R | COLO R | COLO R | COLO R | COLO R | COLO R | COLO R | COLO R |

CURSORCOLOR1
CURSORCOLOR2
CURSORBLINK1
CURSORBLINK2

206

FIG. 11D

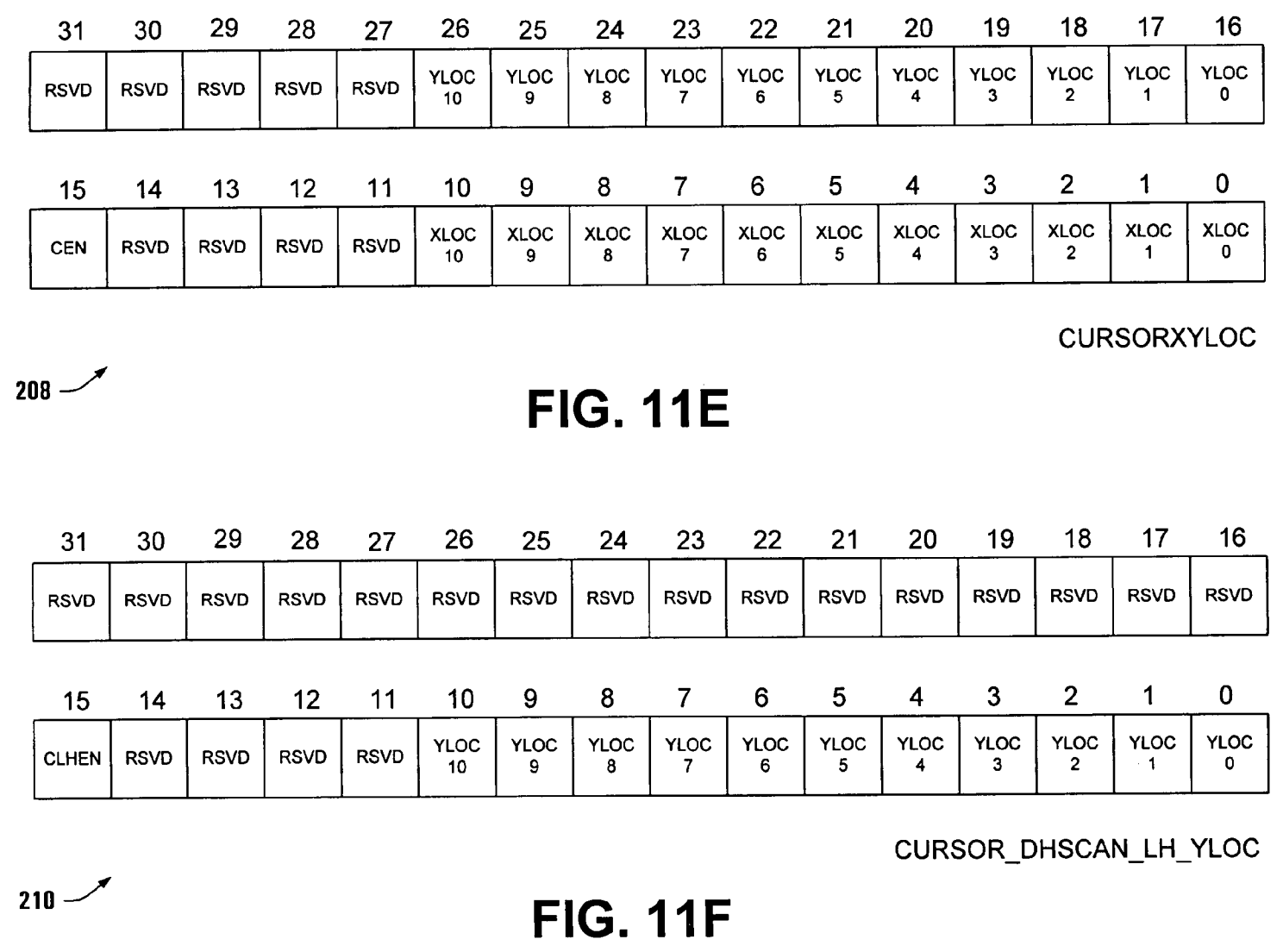

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | YLOC 10 | YLOC 9 | YLOC 8 | YLOC 7 | YLOC 6 | YLOC 5 | YLOC 4 | YLOC 3 | YLOC 2 | YLOC 1 | YLOC 0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CEN | RSVD | RSVD | RSVD | RSVD | XLOC 10 | XLOC 9 | XLOC 8 | XLOC 7 | XLOC 6 | XLOC 5 | XLOC 4 | XLOC 3 | XLOC 2 | XLOC 1 | XLOC 0 |

CURSORXYLOC

208

FIG. 11E

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CLHEN | RSVD | RSVD | RSVD | RSVD | YLOC 10 | YLOC 9 | YLOC 8 | YLOC 7 | YLOC 6 | YLOC 5 | YLOC 4 | YLOC 3 | YLOC 2 | YLOC 1 | YLOC 0 |

CURSOR_DHSCAN_LH_YLOC

210

FIG. 11F

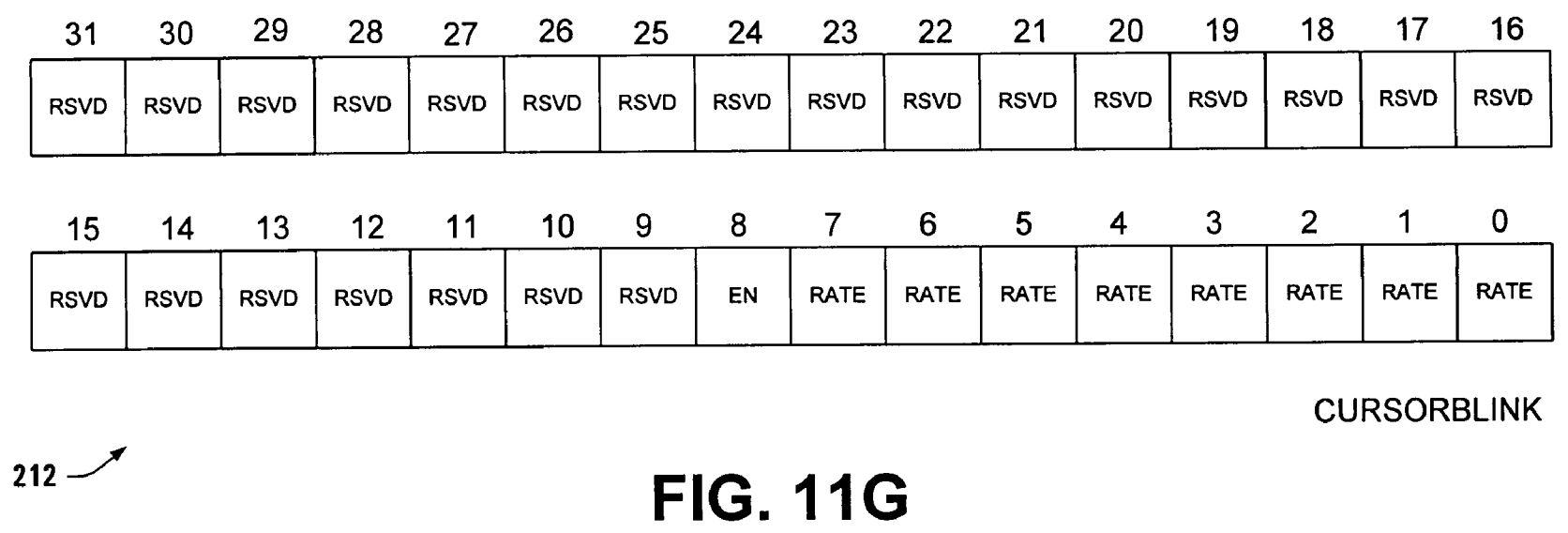

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | RSVD | RSVD | EN | RATE | RATE | RATE | RATE | RATE | RATE | RATE | RATE |

CURSORBLINK

212

FIG. 11G

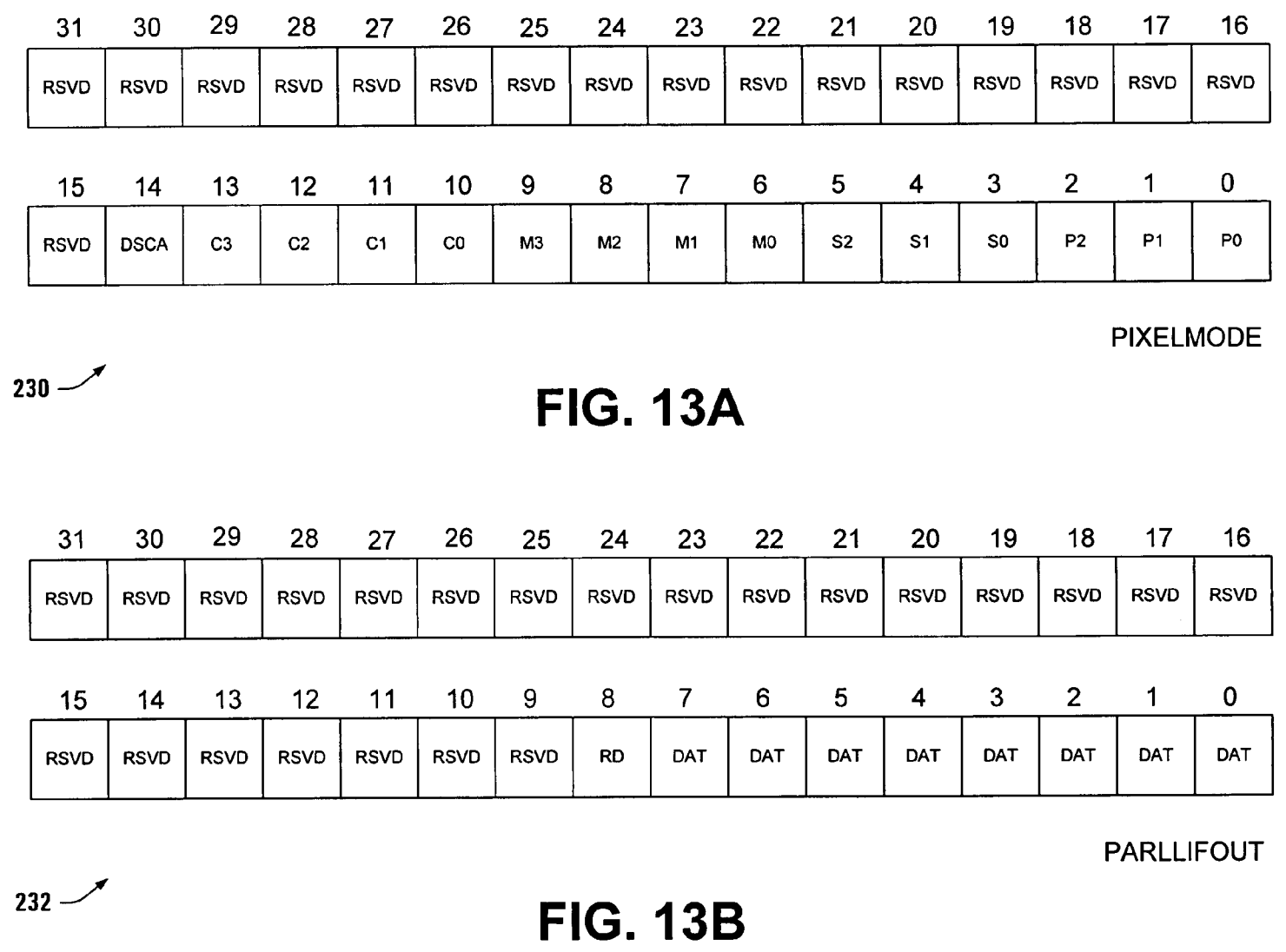

230

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | DSCA | C3 | C2 | C1 | C0 | M3 | M2 | M1 | M0 | S2 | S1 | S0 | P2 | P1 | P0 |

PIXELMODE

FIG. 13A

232

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | RSVD | RSVD | RSVD | RSVD | RSVD | RSVD | RSVD | RSVD |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | RSVD | RSVD | RD | DAT | DAT | DAT | DAT | DAT | DAT | DAT | DAT |

PARLLIFOUT

FIG. 13B

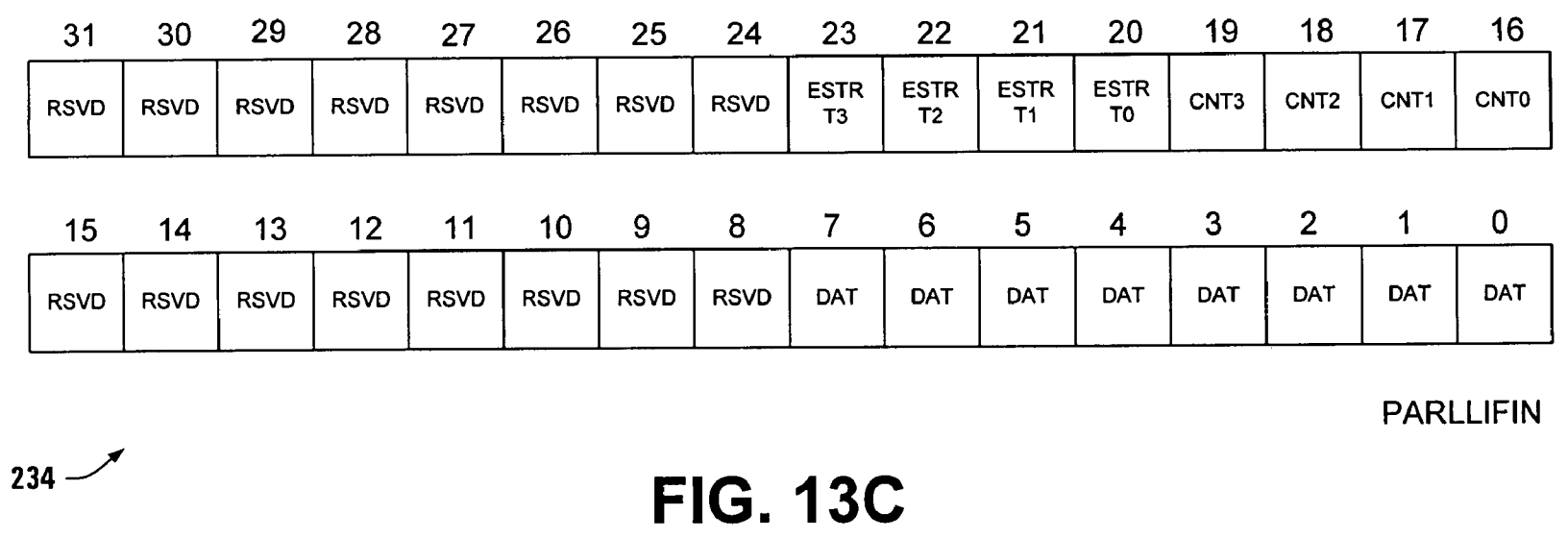

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | ESTR T3 | ESTR T2 | ESTR T1 | ESTR T0 | CNT3 | CNT2 | CNT1 | CNT0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSVD | RSVD | RSVD | RSVD | RSVD | RSVD | RSVD | RSVD | DAT | DAT | DAT | DAT | DAT | DAT | DAT | DAT |

PARLLIFIN

234

FIG. 13C

236

| shift mode | color mode | output mode | P(23) *** | P(22) *** | P(21) *** | P(20) *** | P(19) *** | P(18) *** | P(17) | P(16) | P(15) | P(14) | P(13) **** | P(12) | P(11) | P(10) | P(9) **** | P(8) | P(7) | P(6) | P(5) **** | P(4) | P(3) | P(2) | P(1) **** | P(0) |
|---|---|---|---|---|---|---|---|---|---|---|---|---|---|---|---|---|---|---|---|---|---|---|---|---|---|---|
| 0x0 | 0x0 0x4 0x8 | single pixel per clock up to 24 bits wide | P(23) R(7) | P(22) R(6) | P(21) R(5) | P(20) R(4) | P(19) R(3) | P(18) R(2) | P(17) R(1) | P(16) R(0) | P(15) G(7) | P(14) G(6) | P(13) G(5) | P(12) G(4) | P(11) G(3) | P(10) G(2) | P(9) G(1) | P(8) G(0) | P(7) B(7) | P(6) B(6) | P(5) B(5) | P(4) B(4) | P(3) B(3) | P(2) B(2) | P(1) B(1) | P(0) B(0) |
| 0x0 | 0x5 | single 16-bit 565 pixel per clock | R(4) | R(3) | R(2) | R(1) | R(0) | R(4) | R(3) | R(2) | G(5) | G(4) | G(3) | G(2) | G(1) | G(0) | G(5) | G(4) | B(4) | B(3) | B(2) | B(1) | B(0) | B(4) | B(3) | B(2) |
| 0x0 | 0x6 | single 16-bit 555 pixel per clock | R(4) | R(3) | R(2) | R(1) | R(0) | R(4) | R(3) | R(2) | G(4) | G(3) | G(2) | G(1) | G(0) | G(4) | G(3) | G(2) | B(4) | B(3) | B(2) | B(1) | B(0) | B(4) | B(3) | P(2) |
| 0x1 | 0x0 0x4 0x8 | single 24 bit pixel on 18 lines | X | X | X | X | X | X | R(7) | R(6) | R(5) | R(4) | R(3) | R(2) | G(7) | G(6) | G(5) | G(4) | G(3) | G(2) | B(7) | B(6) | B(5) | B(4) | B(3) | B(2) |
| 0x1 | 0x5 | single 16-bit 565 pixel on 18 lines | X | X | X | X | X | X | R(4) | R(3) | R(2) | R(1) | R(0) | R(4) | G(5) | G(4) | G(3) | G(2) | G(1) | G(0) | B(4) | B(3) | B(2) | B(1) | B(0) | B(4) |
| 0x1 | 0x6 | single 16-bit 555 pixel on 18 lines | X | X | X | X | X | X | R(4) | R(3) | R(2) | R(1) | R(0) | R(4) | G(4) | G(3) | G(2) | G(1) | G(0) | G(4) | B(4) | B(3) | B(2) | B(1) | B(0) | B(4) |
| 0x2 | 0x0 0x8 | progressive scan 2 pixels per shift clock | P1(20) R1(4) * | P1(12) G1(4) * | P1(4) B1(4) * | P0(20) R0(4) * | P0(12) G0(4) * | P0(4) B0(4) * | P1(23) R1(7) | P1(22) G1(6) | P1(21) G1(5) | P1(15) G1(7) | P1(14) G1(6) | P1(13) G1(5) | P1(7) B1(7) | P1(6) B1(6) | P1(5) B1(5) | P0(23) R0(7) | P0(22) R0(6) | P0(21) R0(5) | P0(15) G0(7) | P0(14) G0(6) | P0(13) G0(5) | P0(7) B0(7) | P0(6) B0(6) | P0(5) B0(5) |
| | | dual scan | Lower P(20) R(4) * | Lower P(12) G(4) * | Lower P(4) B(4) * | Upper P(20) R(4) * | Upper P(12) G(4) * | Upper P(4) B(4) * | Lower P(23) R(7) | Lower P(22) R(6) | Lower P(21) R(5) | Lower P(15) G(7) | Lower P(14) G(6) | Lower P(13) G(5) | Lower P(7) B(7) | Lower P(6) B(6) | Lower P(5) B(5) | Upper P(23) R(7) | Upper P(22) R(6) | Upper P(21) R(5) | Upper P(15) G(7) | Upper P(14) G(6) | Upper P(13) G(5) | Upper P(7) B(7) | Upper P(6) B(6) | Upper P(5) B(5) |
| 0x3 | 0x0 0x8 | progressive scan 4 pixels per shift clock | P3(14) G3(6) * | P3(6) B3(6) * | P2(14) B2(6) * | P2(6) B2(6) * | P1(14) G1(6) * | P1(6) B1(6) * | P0(14) G0(6) * | P0(6) B0(6) * | P3(23) R3(7) | P3(22) R3(6) * | P3(15) G3(7) | P3(7) B3(7) | P2(23) R2(7) | P2(22) R2(6) * | P2(15) G2(7) | P2(7) B2(7) | P1(23) R1(7) | P1(22) R1(6) * | P1(15) G1(7) | P1(7) B1(7) | P0(23) R0(7) | P0(22) R0(6) * | P0(15) G0(7) | P0(7) B0(7) |
| | | dual scan | Lower P1(14) G1(6) * | Lower P1(6) B1(6) * | Upper P1(14) G1(6) * | Upper P1(6) B1(6) * | Lower P0(14) G0(6) * | Lower P0(6) B0(6) * | Upper P0(14) G0(6) * | Upper P0(6) B0(6) * | Lower P1(23) R1(7) | Lower P1(22) R1(6) * | Lower P1(15) G1(7) | Lower P1(7) B1(7) | Upper P1(23) R1(7) | Upper P1(22) R1(6) * | Upper P1(15) G1(7) | Upper P1(7) B1(7) | Lower P0(23) R0(7) | Lower P0(22) R0(6) * | Lower P0(15) G0(7) | Lower P0(7) B0(7) | Upper P0(23) R0(7) | Upper P0(22) R0(6) * | Upper P0(15) G0(7) | Upper P0(7) B0(7) |

FIG. 14A

236

| | | | | | | | | | | | | | | | | | | | | | | | | | | |
|---|---|---|---|---|---|---|---|---|---|---|---|---|---|---|---|---|---|---|---|---|---|---|---|---|---|---|
| 0x4 | 0x0 0x8 | progressive scan 8 pixels per shift clock dual scan | P7(23) R7 * | P6(23) R6 * | P5(23) R5 * | P4(23) R4 * | P3(23) R3 * | P2(23) R2 * | P1(23) R1 * | P0(23) R0 * | P7(15) G7 * | P7(7) B7 * | P6(15) G6 * | P6(7) B6 * | P5(15) G5 * | P5(7) B5 * | P4(15) G4 * | P4(7) B4 * | P3(15) G3 * | P3(7) B3 * | P2(15) G2 * | P2(7) B2 * | P1(15) G1 * | P1(7) B1 * | P0(15) G0 * | P0(7) B0 * |
| | | | Lower P3(23) R3 * | Upper P3(23) R3 * | Lower P2(23) R2 * | Upper P2(23) R2 * | Lower P1(23) R1 * | Upper P1(23) R1 * | Lower P0(23) R0 * | Upper P0(23) R0 * | Lower P3(15) G3 * | Lower P3(7) B3 * | Upper P3(15) G3 * | Upper P3(7) B3 * | Lower P2(15) G2 * | Lower P2(7) B2 * | Upper P2(15) G2 * | Upper P2(7) B2 * | Lower P1(15) G1 * | Lower P1(7) B1 * | Upper P1(15) G1 * | Upper P1(7) B1 * | Lower P0(15) G0 * | Lower P0(7) B0 * | Upper P0(15) G0 * | Upper P0(7) B0 * |
| 0x5 | 0x0 0x8 | 2 2/3 pixels per clock | X | X | X | X | X | X | X | X | X | X | X | X | X | X | X | X | G2 | B2 | R1 | G1 | B1 | R0 | G0 | B0 |
| | | | X | X | X | X | X | X | X | X | X | X | X | X | X | X | X | X | B5 | R4 | G4 | B4 | R3 | G3 | B3 | R2 |
| | | | X | X | X | X | X | X | X | X | X | X | X | X | X | X | X | X | R7 | G7 | B7 | R6 | G6 | B6 | R5 | G5 |
| 0x6 | 0x0 0x8 | Dual 2 2/3 pixels per clock | X | X | X | X | X | X | X | X | L G2 | L B2 | L R1 | L G1 | L B1 | L R0 | L G0 | L B0 | U G2 | U B2 | U R1 | U G1 | U B1 | U R0 | U G0 | U B0 |
| | | | X | X | X | X | X | X | X | X | L B5 | L R4 | L G4 | L B4 | L R3 | L G3 | L B3 | L R2 | U B5 | U R4 | U G4 | U B4 | U R3 | U G3 | U B3 | U R2 |
| | | | X | X | X | X | X | X | X | X | L R7 | L G7 | L B7 | L R6 | L G6 | L B6 | L R5 | L G5 | U R7 | U G7 | U B7 | U R6 | U G6 | U B6 | U R5 | U G5 |
| ** | ** | CCIREN subs | ** | ** | ** | ** | ** | ** | ** | ** | ** | ** | ** | ** | ** | ** | ** | ** | D(7) | D(6) | D(5) | D(4) | D(3) | D(2) | D(1) | D(0) |
| ** | ** | LCDEN subs | ** | ** | ** | ** | ** | ** | ** | XECL | YSCL | ** | ** | ** | ** | ** | ** | ** | ** | ** | ** | ** | ** | ** | ** | ** |
| ** | ** | ACEN subs | ** | ** | ** | ** | ** | ** | AC | ** | ** | ** | ** | ** | ** | ** | ** | ** | ** | ** | ** | ** | ** | ** | ** | ** |

* These bits are an ORed combination of the bit value shown and the next significant bit below (This rounds the color value to nearest color).
** These bits do not get a substitute and are defined to the values controlled by the pixel output mode in the upper part of the table.
*** These bits are pinned out in certain variants only.
**** Set PIXELMODE.P13951 high to use these pins as outputs.

FIG. 14B

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| RSVD | RSVD | RSVD | RSVD | RSVD | RSVD | RSVD | RSVD | BGOFF | BGOFF | BGOFF | BGOFF | BGOFF | BGOFF | BGOFF | BGOFF |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BGOFF | BGOFF | BGOFF | BGOFF | BGOFF | BGOFF | BGOFF | BGOFF | BGOFF | BGOFF | BGOFF | BGOFF | BGOFF | BGOFF | BGOFF | BGOFF |

BG_OFFSET

258

FIG. 16E

| F,V,H def | FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|---|
| for pixel | Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| in value | | | | register address | | | | | | | | | | | | | | | | | | Value |
| 000 | D18 | D17 | D16 | base + 0x80 | D15 | D14 | D13 | D12 | D11 | D10 | D9 | D8 | D7 | D6 | D5 | D4 | D3 | D2 | D1 | D0 | 00 | 000 |
| 001 | D18 | D17 | D16 | base + 0x84 | D15 | D14 | D13 | D12 | D11 | D10 | D9 | D8 | D7 | D6 | D5 | D4 | D3 | D2 | D1 | D0 | 00 | 001 |
| 010 | D18 | D17 | D16 | base + 0x88 | D15 | D14 | D13 | D12 | D11 | D10 | D9 | D8 | D7 | D6 | D5 | D4 | D3 | D2 | D1 | D0 | 00 | 010 |
| 011 | D18 | D17 | D16 | base + 0x8C | D15 | D14 | D13 | D12 | D11 | D10 | D9 | D8 | D7 | D6 | D5 | D4 | D3 | D2 | D1 | D0 | 00 | 011 |
| 100 | D18 | D17 | D16 | base + 0x90 | D15 | D14 | D13 | D12 | D11 | D10 | D9 | D8 | D7 | D6 | D5 | D4 | D3 | D2 | D1 | D0 | 00 | 100 |
| 101 | D18 | D17 | D16 | base + 0x94 | D15 | D14 | D13 | D12 | D11 | D10 | D9 | D8 | D7 | D6 | D5 | D4 | D3 | D2 | D1 | D0 | 00 | 101 |
| 110 | D18 | D17 | D16 | base + 0x98 | D15 | D14 | D13 | D12 | D11 | D10 | D9 | D8 | D7 | D6 | D5 | D4 | D3 | D2 | D1 | D0 | 00 | 110 |
| 111 | D18 | D17 | D16 | base + 0x9C | D15 | D14 | D13 | D12 | D11 | D10 | D9 | D8 | D7 | D6 | D5 | D4 | D3 | D2 | D1 | D0 | 00 | 111 |
| | X | X | X | base + 0xA0 | D15 | D14 | D13 | D12 | D11 | D10 | D9 | D8 | D7 | D6 | D5 | D4 | D3 | D2 | D1 | D0 | 01 | 000 |
| | X | X | X | base + 0xA4 | D15 | D14 | D13 | D12 | D11 | D10 | D9 | D8 | D7 | D6 | D5 | D4 | D3 | D2 | D1 | D0 | 01 | 001 |
| | X | X | X | base + 0xA8 | D15 | D14 | D13 | D12 | D11 | D10 | D9 | D8 | D7 | D6 | D5 | D4 | D3 | D2 | D1 | D0 | 01 | 010 |
| | X | X | X | base + 0xAC | D15 | D14 | D13 | D12 | D11 | D10 | D9 | D8 | D7 | D6 | D5 | D4 | D3 | D2 | D1 | D0 | 01 | 011 |
| | X | X | X | base + 0xB0 | D15 | D14 | D13 | D12 | D11 | D10 | D9 | D8 | D7 | D6 | D5 | D4 | D3 | D2 | D1 | D0 | 01 | 100 |
| | X | X | X | base + 0xB4 | D15 | D14 | D13 | D12 | D11 | D10 | D9 | D8 | D7 | D6 | D5 | D4 | D3 | D2 | D1 | D0 | 01 | 101 |
| | X | X | X | base + 0xB8 | D15 | D14 | D13 | D12 | D11 | D10 | D9 | D8 | D7 | D6 | D5 | D4 | D3 | D2 | D1 | D0 | 01 | 110 |
| | X | X | X | base + 0xBC | D15 | D14 | D13 | D12 | D11 | D10 | D9 | D8 | D7 | D6 | D5 | D4 | D3 | D2 | D1 | D0 | 01 | 111 |
| | X | X | X | base + 0xC0 | D15 | D14 | D13 | D12 | D11 | D10 | D9 | D8 | D7 | D6 | D5 | D4 | D3 | D2 | D1 | D0 | 10 | 000 |
| | X | X | X | base + 0xC4 | D15 | D14 | D13 | D12 | D11 | D10 | D9 | D8 | D7 | D6 | D5 | D4 | D3 | D2 | D1 | D0 | 10 | 001 |
| | X | X | X | base + 0xC8 | D15 | D14 | D13 | D12 | D11 | D10 | D9 | D8 | D7 | D6 | D5 | D4 | D3 | D2 | D1 | D0 | 10 | 010 |
| | X | X | X | base + 0xCC | D15 | D14 | D13 | D12 | D11 | D10 | D9 | D8 | D7 | D6 | D5 | D4 | D3 | D2 | D1 | D0 | 10 | 011 |
| | X | X | X | base + 0xD0 | D15 | D14 | D13 | D12 | D11 | D10 | D9 | D8 | D7 | D6 | D5 | D4 | D3 | D2 | D1 | D0 | 10 | 100 |
| | X | X | X | base + 0xD4 | D15 | D14 | D13 | D12 | D11 | D10 | D9 | D8 | D7 | D6 | D5 | D4 | D3 | D2 | D1 | D0 | 10 | 101 |
| | X | X | X | base + 0xD8 | D15 | D14 | D13 | D12 | D11 | D10 | D9 | D8 | D7 | D6 | D5 | D4 | D3 | D2 | D1 | D0 | 10 | 110 |
| | X | X | X | base + 0xDC | D15 | D14 | D13 | D12 | D11 | D10 | D9 | D8 | D7 | D6 | D5 | D4 | D3 | D2 | D1 | D0 | 10 | 111 |
| | X | X | X | base + 0xE0 | D15 | D14 | D13 | D12 | D11 | D10 | D9 | D8 | D7 | D6 | D5 | D4 | D3 | D2 | D1 | D0 | 11 | 000 |
| | X | X | X | base + 0xE4 | D15 | D14 | D13 | D12 | D11 | D10 | D9 | D8 | D7 | D6 | D5 | D4 | D3 | D2 | D1 | D0 | 11 | 001 |
| | X | X | X | base + 0xE8 | D15 | D14 | D13 | D12 | D11 | D10 | D9 | D8 | D7 | D6 | D5 | D4 | D3 | D2 | D1 | D0 | 11 | 010 |
| | X | X | X | base + 0xEC | D15 | D14 | D13 | D12 | D11 | D10 | D9 | D8 | D7 | D6 | D5 | D4 | D3 | D2 | D1 | D0 | 11 | 011 |
| | X | X | X | base + 0xF0 | D15 | D14 | D13 | D12 | D11 | D10 | D9 | D8 | D7 | D6 | D5 | D4 | D3 | D2 | D1 | D0 | 11 | 100 |
| | X | X | X | base + 0xF4 | D15 | D14 | D13 | D12 | D11 | D10 | D9 | D8 | D7 | D6 | D5 | D4 | D3 | D2 | D1 | D0 | 11 | 101 |
| | X | X | X | base + 0xF8 | D15 | D14 | D13 | D12 | D11 | D10 | D9 | D8 | D7 | D6 | D5 | D4 | D3 | D2 | D1 | D0 | 11 | 110 |
| | X | X | X | base + 0xFC | D15 | D14 | D13 | D12 | D11 | D10 | D9 | D8 | D7 | D6 | D5 | D4 | D3 | D2 | D1 | D0 | 11 | 111 |

300

FIG. 20

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| X | X | X | base + 0x80 | 0 | 0 | 0 | 0 | 0 | 0 | 0 | 0 | 0 | 0 | 0 | 0 | 0 | 0 | 0 | 0 | 00 | 000 |
| | | | base + 0xA0 | 0 | 0 | 0 | 0 | 0 | 0 | 0 | 0 | 0 | 0 | 0 | 0 | 0 | 0 | 0 | 0 | 01 | 000 |
| | | | base + 0xC0 | 0 | 0 | 0 | 0 | 0 | 0 | 0 | 0 | 0 | 0 | 0 | 0 | 0 | 0 | 0 | 0 | 10 | 000 |
| | | | base + 0xE0 | 0 | 0 | 0 | 0 | 0 | 0 | 0 | 0 | 0 | 0 | 0 | 0 | 0 | 0 | 0 | 0 | 11 | 000 |
| X | X | X | base + 0x9C | 1 | 1 | 1 | 1 | 1 | 1 | 1 | 1 | 1 | 1 | 1 | 1 | 1 | 1 | 1 | 1 | 00 | 111 |
| | | | base + 0xBC | 1 | 1 | 1 | 1 | 1 | 1 | 1 | 1 | 1 | 1 | 1 | 1 | 1 | 1 | 1 | 1 | 01 | 111 |
| | | | base + 0xDC | 1 | 1 | 1 | 1 | 1 | 1 | 1 | 1 | 1 | 1 | 1 | 1 | 1 | 1 | 1 | 1 | 10 | 111 |
| | | | base + 0xFC | 1 | 1 | 1 | 1 | 1 | 1 | 1 | 1 | 1 | 1 | 1 | 1 | 1 | 1 | 1 | 1 | 11 | 111 |

302

FIG. 21

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 1 | 1 | 1 | base + 0x8C | 0 | 1 | 0 | 1 | 1 | 1 | 0 | 0 | 0 | 1 | 0 | 1 | 0 | 0 | 1 | 1 | 00 | 011 |
| | | | base + 0xAC | 1 | 0 | 1 | 0 | 0 | 0 | 1 | 1 | 1 | 0 | 1 | 0 | 1 | 1 | 0 | 0 | 01 | 011 |
| | | | base + 0xCC | 1 | 1 | 0 | 0 | 0 | 1 | 0 | 1 | 0 | 0 | 1 | 1 | 0 | 1 | 0 | 1 | 10 | 011 |
| | | | base + 0xEC | 0 | 0 | 1 | 1 | 1 | 0 | 1 | 0 | 1 | 1 | 0 | 0 | 1 | 0 | 1 | 0 | 11 | 011 |

310

FIG. 25

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 0 | 0 | 0 | base + 0x88 | x | x | x | x | x | 0 | 1 | 0 | x | 1 | 0 | 0 | x | 0 | 0 | 1 | 00 | 010 |
| | | | base + 0xA8 | x | x | x | x | x | 1 | 0 | 0 | x | 0 | 1 | 0 | x | 0 | 1 | 0 | 01 | 010 |
| | | | base + 0xC8 | x | x | x | x | x | 0 | 0 | 1 | x | 0 | 0 | 1 | x | 1 | 0 | 0 | 10 | 010 |
| | | | base + 0xE8 | x | x | x | x | x | x | x | x | x | x | x | x | x | x | x | x | 11 | 010 |

316

FIG. 28

| FRAME | Vert | Horz | VCNT (lines) | 11 | 11 | 11 | 11 | 10 | 10 | 10 | 10 | 01 | 01 | 01 | 01 | 00 | 00 | 00 | 00 | GSLUT Address *4 | |
|---|---|---|---|---|---|---|---|---|---|---|---|---|---|---|---|---|---|---|---|---|---|
| Ctr | Ctr | Ctr | HCNT (pixels) | 11 | 10 | 01 | 00 | 11 | 10 | 01 | 00 | 11 | 10 | 01 | 00 | 11 | 10 | 01 | 00 | FRAME | Pixel |
| D18 | D17 | D16 | register address | D15 | D14 | D13 | D12 | D11 | D10 | D9 | D8 | D7 | D6 | D5 | D4 | D3 | D2 | D1 | D0 | | Value |
| 0 | 0 | 0 | base + 0x88 | x | x | x | x | 0 | 0 | 1 | 0 | 1 | 1 | 0 | 0 | 0 | 0 | 0 | 1 | 00 | 010 |
| | | | base + 0xA8 | x | x | x | x | 1 | 1 | 0 | 0 | 0 | 0 | 1 | 0 | 0 | 0 | 1 | 0 | 01 | 010 |
| | | | base + 0xC8 | x | x | x | x | 0 | 0 | 0 | 1 | 1 | 0 | 0 | 1 | 1 | 1 | 0 | 0 | 10 | 010 |
| | | | base + 0xE8 | x | x | x | x | x | x | x | x | x | x | x | x | x | x | x | x | 11 | 010 |

320

FIG. 30

| Display Type | Horizontal Resolution x Vertical Resolution | Video Clock frequency (MHz) | Frame Buffer Storage format | Display Data format | pixels per shift clock | Pixel Shift Clock frequency (MHz) | Vertical Frame Rate (Hz) |
|---|---|---|---|---|---|---|---|
| VFD | 128 x 32 | 2 | 4 bpp | monochrome | 8 | 0.25 | 400 |
| LCD | 128 x 64 | 2 | 4 bpp | monochrome | 4 | 0.5 | 230 |
| LCD | 256 x 128 | 2 | 4 bpp | monochrome | 4 | 0.5 | 60 |
| "QVGA" TFT LCD | 320 x 234 | 6.4 | 8 bpp | analog | 1 | 6.4 | 80 |
| QVGA STN LCD | 320 x 240 | 4 | 4 bit RGB | 4 bit RGB | 1 | 4 | 50 |
| HVGA STN LCD | 640 x 240 | 8 | 4 bit RGB | 4 bit RGB | 1 | 8 | 50 |
| "VGA" DC Plasma | 640 x 400 | 16 | 4 bpp | monochrome | 4 | 4 | 60 |
| VGA EL | 640 x 480 | 24 | 4 or 8 bpp | grayscale | 8 | 3 | 75 |
| VGA STN LCD | 640 x 480 | 24 | 8 or 16 bpp | 18 bit RGB | 1 | 24 | 75 |
| VGATFT LCD | 640 x 480 | 24 | 8, 16, or 24 bpp | 18 bit RGB | 1 | 24 | 75 |
| VGA CRT | 640 x 480 | 25.175 | 8, 16, or 24 bpp | analog | 1 | NA | 70 |
| VGA CRT | 640 x 480 | 32 | 8, 16, or 24 bpp | analog | 1 | NA | 85 |
| SVGA TFT LCD | 800 x 600 | 40 | 8, 16, or 24 bpp | 18 bit RGB | 1 | 40 | 80 |
| SVGA CRT | 800 x 600 | 50 | 8, 16, or 24 bpp | analog | 1 | NA | 85 |
| XGA TFT LCD | 1024 x 768 | 60 | 8, 16, or 24 bpp | 18 bit RGB | 2 | 30 | 72 |
| XGA CRT | 1024 x 768 | 75 | 8, 16, or 24 bpp | analog | 1 | NA | 80 |
| SXGA TFT LCD | 1280 x 1024 | 85 | 8, 18, or 24 bpp | 18 or 24 bit RGB | 1 | 85 | 60 |
| SXGA CRT | 1280 x 1024 | 110 | 8, 16, or 24 bpp | analog | 1 | NA | 70 |
| SXGAW TFT LCD | 1400 x 1024 | 90 | 8, 16, or 24 bpp | 18 or 24 bit RGB | 1 | 90 | 60 |
| SXGA+ TFT LCD | 1400 x 1050 | 110 | 8, 16, or 24 bpp | 18 or 24 bit RGB | 1 | 110 | 70 |
| UXGA TFT LCD | 1600 x 1200 | 135 | 8, 16, or 24 bpp | 18 or 24 bit RGB | 1 | 135 | 65 |
| UXGA CRT | 1600 x 1200 | 135 | 8, 16, or 24 bpp | analog | 1 | NA | 60 |
| UXGAW TFT LCD | 1900 x 1200 | 135 | 8, 16, or 24 bpp | 18 or 24 bit RGB | 1 | 135 | 60 |
| HDTV-2 LCD | 1280 x 720 | 50 | 8, 16, or 24 bpp | 24 bit RGB | 1 | 50 | 50 |
| HDTV-2 CRT | 1280 x 720 | 66 | 8, 16, or 24 bpp | analog | 1 | NA | 60 |
| HDTV-4 LCD | 1920 x 1080 | 135 | 8, 16, or 24 bpp | 24 bit RGB | 1 | 135 | 60 |
| HDTV-4 CRT | 1920 x 1080 | 135 | 8, 16, or 24 bpp | analog | 1 | NA | 55 |
| QXGA LCD | 2048 x 1536 | 135 | 4 bpp | monochrome | 8 | 16.875 | 40 |
| QSXGA LCD | 2560 x 2048 | 135 | 4 bpp | monochrome | 8 | 16.875 | 24 |
| QUXGA LCD | 3200 x 2400 | 135 | 4 bpp | monochrome | 8 | 16.875 | 17 |

350

FIG. 31

RASTER ENGINE WITH MULTIPLE COLOR DEPTH DIGITAL DISPLAY INTERFACE

TECHNICAL FIELD

The present invention relates generally to the field of video displays and more particularly to an improved raster engine with a multiple color depth digital display interface.

BACKGROUND OF THE INVENTION

Video displays are used in computer systems to present visual images to a user based on video data provided by a computer or other processing device. The display allows a user to effectively receive information from and to interact with application programs running in the system. Such computer systems and displays are employed in numerous business, consumer, entertainment, and industrial settings, including automated industrial control systems.

Displays are available in a variety of forms, such as color or monochrome, flat panel, liquid crystal display (LCD), electro-luminescent (EL), plasma display panels (PDP), vacuum fluorescent displays (VFD), cathode ray tube (CRT), and may be interfaced to a computer system in analog or digital fashion. The display is provided with video data frame by frame, which is scanned onto the display screen according to a scanning method which may include progressive scan, dual scan, interleave scan, or interlaced scanning. The cost of displays varies with the display resolution and quality. For example, color displays generally cost more than monochrome displays. The number of pixels, as well as the number of available colors per pixel (bits per pixels) also affects display cost. The cost of a computer display may be a large percentage of the overall computer system cost. As the application of computer system displays varies greatly, displays are accordingly provided in a variety of price ranges.

Interfacing between a computer or other processing device and a display is ordinarily accomplished using a video controller, also variously referred to as graphics adapter, graphics controller, video display adapter, display controller, and display adapter. The screen resolution on a PC is determined by the video controller, which may be plugged into one of the computer's expansion slots. In conventional systems, the display must also be able to adjust to the resolution of the video controller. Common video controllers come with their own drivers for an operating system, which are installed after the video controller is installed. The driver allows the operating system to display its video output at a certain number of resolutions and colors. The video controller may include a raster engine which rasterizes video data from a frame buffer into a format that the display can accept for rendering to a user.

Some typical display screen resolutions include 640×480, 800×600, 1024×768, 1280×1024, and 1600×1200, expressed in terms of the number of columns and rows (lines) of bits on the display screen. Higher resolutions can be used to display larger images or to show more detailed images, depending on the number of pixels per inch (ppi) and the distance of the user from the screen. In addition to display resolution, the number of colors that can be displayed varies from 2, to 8, to 16, to 256, to 65 thousand, up to 16 million. Although high-end video controllers can provide maximum colors at maximum resolution, there is typically a tradeoff involving memory and bus bandwidth, wherein the higher the resolution, the fewer the available colors. With the wide variety of available display types, and the associated cost variance, there is a need for improved video controllers which are easily adaptable to interface the display requirements of computer system applications with a plurality of disparate display types, allowing a single video controller to be used in a variety of computer systems of various cost requirements.

In addition, where a computer system application is particularly cost sensitive, a lower cost monochrome display may be selected, such as a Super Twist Nematic (STN) LCD display. In environments that require high temperature operation, it may be beneficial to use an EL display. In many such displays, it may be desirable to employ pixel dithering techniques in order to represent a variety of shades of gray or colored shades. Such grayscale dithering may improve the visual image presented to a user by selectively energizing and de-energizing certain pixels according to a dithering algorithm or scheme. This may be particularly effective when employed with display types where each pixel has only two states, e.g., an 'on' state and an 'off' state. Conventional techniques, however do not allow flexible application of grayscaling to multiple disparate display types in a single video controller. Thus, there is a need for improved video controllers having easily adaptable grayscaling functionality which may be employed in association with a plurality of disparate display types.

Images on a display may be overlayed with a cursor image in order to facilitate user interaction with an application program and/or an operating system. The cursor image may be superimposed on the displayed image by computer system software or by the video controller. Using the video controller to overlay a cursor image on a displayed image is difficult in association with a dual scanned display, where the upper and lower portions of the display screen are scanned in parallel. Cursor overlaying is particularly difficult where the cursor image location crosses the boundary between the upper and lower portions of the display. Software cursor overlaying techniques occupy system resources and processor time, which may be unacceptable or undesirable in some applications. Hence, there is a need for improved cursor overlaying apparatus and methodologies, particularly for use with dual scanned displays.

Blinking objects or portions thereof may be presented on a computer display, to indicate special conditions or to otherwise accentuate a video feature. Software blinking techniques have thusfar been employed to effectuate blinking characters and display features on bitmapped displays. However, the use of software occupies computer system processor time and may consume additional memory and other resources. In addition, blinking of individual pixels, as opposed to character blinking, is burdensome using conventional techniques. Thus, there is a need for improved display blinking apparatus and methods which provide for pixel blinking and which reduce or minimize the overhead and possible memory usage associated with conventional bit-mapped display blinking techniques.

Conventional video controllers are sometimes tested during manufacturing, to ensure proper operation prior to shipment to an end user or retailer. This testing typically involves applying a known set of video input data to the video controller and obtaining an output data set, known as a video signature. This signature is then analyzed using a signature analyzer to determine whether the video controller is operating properly. However, where the display image includes changing pixels, such as time, date, or other information which varies as a function of time, conventional signature analyzers may indicate a failed signature comparison, even where the video controller is operating properly. In addition, conventional video signature analyzers are expensive, and require extensive programming and user knowledge in order to operate. Moreover, the conventional signature analyzers may not be easily employed to test video controllers installed in a customer computer system. Thus, there is a need for improved video signature analyzers and video controllers which provide for verification of proper operation in association with changing video displays, and which provide for self-testing in a user computer system.

Raster engines typically obtain image data from a frame buffer in memory via a bus, wherein the frame buffer may be in main memory or in a separate display memory. The bus may provide access between the raster engine as well as between other devices in a computer system. Thus, there are situations in which the raster engine requires display image data from the frame buffer, and yet the raster engine cannot timely obtain such data due to contention with other devices using the common or shared bus. Thus, the raster engine may become empty, for example, during excessive bus loading conditions. In this case, the video display interfaced by the raster engine may exhibit undesirable visual effects under these conditions. For example, the display may suffer from visual defects such as jittering, shifting, flashing, and blank-outs in the displayed video image. Thus, there is a need for improved methods and apparatus for preventing or minimizing empty raster engine conditions, and the undesirable display effects associated therewith.

SUMMARY OF THE INVENTION

The foregoing and other shortcomings associated with conventional video controller devices and methodologies are reduced or minimized by the present invention, which provides a video controller and raster engine which is easily programmed to interface a computer system running a variety of application programs with a plurality of disparate display types. The invention may thus be employed in high end as well as highly cost sensitive computer system applications in association with displays ranging from high definition television (HDTV) to low resolution monochrome EL and/or LCD display panels. The invention provides for software programmable registers in the video controller raster engine by which a user may programmatically adapt or configure the raster engine to provide video data to a wide variety of different displays with different color capabilities and resolutions. In addition, programmable grayscaling is provided, together with hardware cursor features applicable to dual scan displays, and hardware blinking apparatus providing low overhead blinking on an individual pixel basis. Moreover, the invention provides for integrating a video signature analyzer in the video controller, providing for self-testing, as well as the capability of testing video signatures for displays having changing portions.

In accordance with one aspect of the invention, there is provided a video controller for interfacing a frame buffer to a display in a computer system, which comprises a raster engine adapted to receive video data from the frame buffer, to format the video data, and to render the formatted data to a display, as well as an integral bounded signature analyzer. The bounded signal analyzer is adapted to analyze the formatted data from the raster engine in whole or in part, allowing a signature to be taken, for example, on any rectangular area within an image. Thus, areas of a screen containing changing images may be selectively avoided. In addition, whereas conventional unbounded signature analyzers provide only pass or fail indications based on signature comparison, the analyzer of the present invention allows finer grain identification of where a problem occurs.

For example, testing four quadrants of a display separately allows isolation of an image problem to a specific quadrant. In this regard, a portion of the formatted data from the raster engine may be bounded by first horizontal and vertical values corresponding to a first location on the display, and second horizontal and vertical values corresponding to a second location on the display, wherein the signature analyzer is adapted to provide a signature indicative of the portion of the formatted data. These first and second horizontal and vertical values are programmable through the use of one or more control registers via the host computer system.

Integration of the signature analyzer with the raster engine, moreover, enables regression testing of video simulations during various manufacturing steps where a separate signature analyzer may not be otherwise available. In addition, the integral signature analyzer may be used for periodic or operator initiated self-testing of the video controller after the device has been shipped to an end user and/or a retailer. The invention thus provides significant advantages over conventional signature analyzers and video controllers through the bounded nature of the signature analyzer as well as by the integration thereof with a raster engine.

The signature analyzer may further comprise a linear feedback shift register (LFSR) adapted to receive parallel input data (e.g., 24 bits), and further to provide a signature output indicative of the parallel input data. This provides testing time advantages over previous signature analyzers, wherein video data was obtained serially. In addition, the LFSR may be adapted to provide a non-zero signature output in response to zero parallel input data, through the use of a logical inversion in the LFSR chain.

The video signature analyzer is further programmable through the use of one or more control registers accessible to the host computer system, whereby test initiation and definition/adjustment of the bounded display areas to be tested is controlled by a computer system user and/or an application program running on the system. For example, self-testing may be initiated as part of a startup application program to verify proper video controller operation before proceeding to run one or more application programs. This may be advantageously employed, for example, in industrial control applications wherein the display of safety related information is desired. Once proper video controller operation is verified, the video signature analyzer can also be used to test other system functions such as graphics operations or DMA memory operations. This is done by manipulating a target image and then taking a signature of the image as it passes to the display.

In accordance with another aspect of the invention, there is provided a video controller for interfacing a frame buffer to a dual scan display having adjacent first and second display portions with a display boundary therebetween, such as a dual scan display. The video controller comprises a raster engine adapted to receive video data from the frame buffer, to format the video data, and to render the formatted data to the dual scan display line by line, as well as a hardware cursor adapted to selectively overlay a cursor image onto one or both of the first and second display portions of the dual scan display. The invention thus allows the use of a cursor in a dual scan display environment, without the software overhead associated with conventional software cursor overlaying techniques. The hardware cursor is adaptable to both progressive scan and dual scan type displays, and employs hardware counters for determining where to insert cursor image data into the raster engine video data stream associated with a displayed image, which may include first and second data paths in dual scan mode of operation.

The hardware cursor is adapted to overlay a first portion of the cursor image onto the first display portion and to overlay a second portion of the cursor image onto the second display portion if the cursor crosses the display boundary. For example, first portion cursor data associated with the first portion of the cursor image is inserted into the first data path of the raster engine as the first display portion is scanned out. The second portion cursor data associated with the second portion of the cursor image is then inserted by the hardware cursor apparatus into the second data path of the raster engine. The selective insertion of the first and second portion cursor data may be accomplished via vertical counter with first and second vertical counter values respectively indicating first and second lines of formatted data being rendered to the first and second display portions, and a horizontal counter with a horizontal counter value indicating the column of formatted data being rendered to the display.

Accordingly, the hardware cursor may comprise a first cursor start address register with a first cursor start address indicating a first cursor portion starting line in the first display portion, a second cursor start address register with a second cursor start address indicating a second cursor portion starting line in the second display portion, a first cursor portion height register with a first cursor portion height value indicating a first cursor portion height, a second cursor portion height register with a second cursor portion height value indicating a second cursor portion height, a cursor column register with a cursor column start value, and a cursor image width register with a cursor image width value indicating a cursor image width. A cursor state machine is provided to compare the first vertical counter value with the first cursor start address and the first cursor portion height value, to compare the second vertical counter value with the second cursor start address and the second cursor portion height value, and to compare the horizontal counter value with the cursor column start value and the cursor image width value.

In addition, the hardware cursor may comprise a cursor line buffer adapted to selectively insert first portion cursor data associated with the first portion of the cursor image into the first data path of the raster engine according to the comparison of the first vertical counter value with the first cursor start address and the first cursor portion height value and the comparison of the horizontal counter value with the cursor column start value and the cursor image width value, and to selectively insert second portion cursor data associated with the second portion of the cursor image into the second data path of the raster engine according to the comparison of the second vertical counter value with the second cursor start address and the second cursor portion height value and the comparison of the horizontal counter value with the cursor column start value and the cursor image width value, if the cursor crosses the display boundary.

The invention further provides a method of overlaying a cursor image onto a dual scan display in a video controller for interfacing a frame buffer to a dual scan display having adjacent first and second display portions with a display boundary therebetween, which comprises rendering video data from the frame buffer to the dual scan display using a raster engine, and selectively overlaying a cursor image onto at least one of the first and second display portions according to a cursor position using a hardware cursor. The method may further comprise determining whether the cursor image crosses the display boundary according to the cursor position, determining first and second portions of the cursor image if the cursor image crosses the display boundary, overlaying the first portion of the cursor image onto the first display portion if the cursor crosses the display boundary, and overlaying the second portion of the cursor image onto the second display portion if the cursor crosses the display boundary.

In accordance with still another aspect of the invention, there is provided a raster engine for interfacing a frame buffer in a computer system to a display, which provides programmable support for a variety of disparate display types. The raster engine comprises one or more control registers which are programmable via the computer system to select a display mode. A dual port RAM device is provided to obtain pixel data from the frame buffer, and a multiplexer is provided to select appropriate pixel data from the dual port RAM device according to the selected display mode, and to provide the selected pixel data to an output device according to the selected display mode. In addition, the raster engine comprises a pixel shift logic system with a parallel output, the pixel shift logic system being adapted to receive the pixel data from the multiplexer and to present the selected pixel data at the parallel output according to the selected display mode.

The raster engine is thus programmable to support many different and disparate display types over the same digital interface by formatting and routing color data to the appropriate pins on the interface, which may include a parallel output. Accordingly, interfacing capability is achieved from direct control of LCD row and column drive chips all the way to high definition television (HDTV) size flat panel display types and beyond. Support is also provided for a digital parallel command word interface for low cost displays, such as LCDs and/or VFDs via programmable direct display command interface operation, and YCrCb digital interface to an NTSC encoder for supporting television type displays. In addition, the raster engine may further comprise an integrated digital to analog converter (DAC) to support analog LCD displays and CRTs.

The raster engine may also comprise a look up table, a grayscale generator, and a blink logic system, wherein the multiplexer receives the selected pixel data from the dual port RAM device via the one of the look up table, the grayscale generator, and the blink logic system. The pixel shift logic system may be adapted to present the selected pixel data in a 24 bit parallel format when the selected display mode is one of single 16 bit 565 pixels per clock and single 16 bit 555 pixels per clock. In achieving the appropriate routing of video output signals for such universal display type interfacing, the pixel shift logic system may be adapted to copy a plurality of most significant bits from the selected pixel data into a corresponding plurality of unused least significant bits in the 24 bit parallel format.

Thus, whereas conventional raster engines and video controllers required manual rerouting of signal connections to interface different display formats, the present invention provides universal connectivity via the novel signal translation using the pixel shift logic system. In addition, the raster engine provides programmable support for both progressive scan and dual scan type displays according to the selected display mode. The display mode may comprise shift mode and pixel mode settings programmable via one or more control registers. For example, the shift mode may comprise one of single pixel per pixel clock up to 24 bits wide, single 24 or 16 bit pixel per pixel clock mapped to 18 bits, 2 pixels per shift clock up to 9 bits wide, 4 pixels per shift clock up to 4 bits wide, 8 pixels per shift clock up to 2 bits wide, 2 2/3 3 bit pixels per clock over 8 bit bus, dual scan 2 2/3 3 bit pixels per clock over two 8 bit busses, and 1 pixel per pixel clock. In addition, the pixel mode may comprise one of 4 bits per pixel, 8 bits per pixel, 16 bits per pixel, 24 bits per pixel, or 32 bits per pixel.

In accordance with yet another aspect of the present invention, there is provided a video controller for interfacing a frame buffer to a display in a computer system, which comprises a raster engine adapted to receive video data from the frame buffer, to format the video data, and to render the formatted data to the display, as well as a hardware blink logic system operatively associated with the raster engine to selectively blink at least one pixel on the display. A blink mode control register may be operatively associated with the hardware blink logic system and programmable via the computer system to select a blink mode, wherein the hardware blink logic system is adapted to selectively blink at least one pixel on the display according to the selected blink mode. The provision of a hardware blink logic system eliminates the overhead associated with conventional software intensive blinking techniques such as redrawing blinking objects continuously or drawing a blinked and unblinked frame for the hardware to switch between, and further provides for selective blinking of individual pixels, heretofore not achieved in hardware blinking systems.

The selected blink mode may comprise one of pixels ANDed with blink mask, pixels ORed with blink mask, pixels XORed with blink mask, blink to background, blink to offset color single value mode, blink to offset color 888 mode, blink dimmer, blink brighter, blink dimmer 888 mode, blink brighter 888 mode, and blink mode disabled, wherein the '888' modes comprise 3 bits each for the colors red, green, and blue, and wherein separate mathematical operations may be performed separately for each such color channel. The hardware further identifies blinking pixels according to the formatted data, and selectively blinks one or more blinking pixels on the display according to the selected blink mode. A blink mask control register may be provided, which is programmable in order to select a blink mask. For some blink modes, the hardware blink logic system may accordingly blink the blinking pixel or pixels on the display according to the selected blink mode and the selected blink mask.

For example, the blink logic system may selectively perform a logical AND, OR, or exclusive OR (XOR) operation on formatted data associated with the blinking pixels using the selected blink mask, in order to change the color or shading of the blinking pixels in the blink state in a programmatically controlled fashion. This flexibility allows high quality display of blinking pixels not limited to a single blink color (e.g., blink to background color) as was common in the past. Blink to background color operation is supported along with blinking to an offset, as well as blinking brighter and/or blinking dimmer. Multiple blinking rates and duty cycles may be further programmed via a blink rate control register in the raster engine.

In accordance with still another aspect of the invention, there is provided a raster engine for interfacing a frame buffer in a computer system to one of a plurality of disparate displays, which comprises a control register programmable via the computer system to select a display mode, a dual port RAM device operative to obtain pixel data from the frame buffer, and a logic device having a parallel output, the logic device being adapted to select appropriate pixel data from the dual port RAM device according to the selected display mode, to remap the selected pixel data according to the selected display mode, and to provide the remapped selected pixel data at the parallel output according to a universal routing scheme applicable to multiple disparate display types. The raster engine remaps the pixel data from the frame buffer format to an output format required by a selected display type according to a universal routing scheme, without requiring any rerouting of signals outside the raster engine. The raster engine thus provides programmable support for a plurality of color depth application programs, as well as interfacing thereof with a plurality of disparate displays having varying color depth capabilities, wherein the color depth refers to the number of bits per pixel.

For example, the raster engine display mode may comprise single pixel per clock up to 24 bits wide, single 16 bit 565 pixel per clock, single 16 bit 555 pixel per clock, single 24 bit pixel on 18 lines, single 16 bit 565 pixel on 18 lines, single 16 bit 555 pixel on 18 lines, 2 pixels per clock, 4 pixels per clock, 8 pixels per shift clock, 2 2/3 pixels per clock, and/or dual 2 2/3 pixels per clock. The raster engine may further comprise a look up table (LUT), a grayscale generator, and a blink logic system, wherein the logic device receives the selected pixel data from the dual port RAM device via the one of the LUT, the grayscale generator, and the blink logic system according to the selected display mode. Thus, the raster engine may programmatically combine grayscaling, blinking, and color translation functionality via one or more programmable control registers. In this regard, the logic device may comprise a multiplexer.

The logic device may be further adapted to copy a plurality of most significant bits from the selected pixel data into a corresponding plurality of unused least significant bits in the 24 bit parallel format, whereby improved color intensity range is provided. Thus, where a translation from an application program having one color depth to a display type having a different color depth capability, the logic device ensures maximum available color capability utilization. The display mode selected via the control register may comprise a color mode, a shift mode, and a pixel mode, wherein the color mode comprises one of a look up table mode, triple 8 bits per channel, 16 bit 565 color mode, 16 bit 555 color mode, and a grayscale palette enabled mode. The logic device is thus adapted to translate the selected pixel data from a first format to a second format according to the selected display mode. In addition, where certain bits in the selected pixel data may otherwise be unused, the raster engine may selectively interpolate between a portion of the selected pixel data in the first format to generate a portion of the data in the second format. For example, the logic device may perform a logical OR combination of at least two bits of the selected pixel data in the first format to generate a bit in the second format.

In accordance with yet another aspect of the present invention, there is provided a raster engine for interfacing a frame buffer in a computer system to one of a plurality of disparate display types, comprising a control register programmable via the computer system to select a display mode, a grayscale generator operative to obtain pixel data from the frame buffer and programmable via the computer system to generate grayscale formatted data according to the selected display mode, and a logic device having a parallel output, the logic device being adapted to select appropriate pixel data from the grayscale generator according to the selected display mode, and to provide the selected pixel data at the parallel output according to the selected display mode.

The raster engine may further comprise a grayscale look up table control register programmable by the computer system, and a grayscale look up table programmable by the computer system via the grayscale look up table control register. The grayscale generator may further comprise a frame counter, a vertical counter, and a horizontal counter, wherein the grayscale look up table data entries define dithering operation for a pixel value according to the frame counter, the vertical counter, and the horizontal counter. The invention thus provides a grayscale look up table or matrix which is programmable by a user or an application program in order to effectively provide flexible interfacing to low cost display panels, such as monochrome, LCD, and electroluminescent (EL) displays.

According to another aspect of the invention, the raster engine may provide an indication to a host processor that the raster engine is underflowing or about to underflow. Input and output counters in the raster engine first in first out (FIFO) memory, which interfaces the host bus with the raster engine video systems, are read by an underflow detection system which is adapted to provide an underflow indication according to the counter values. The underflow detection and indication system thus minimizes or reduces the undesirable visual effects associated with a starved or empty raster engine.

To the accomplishment of the foregoing and related ends, certain illustrative aspects of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of various aspects of the invention and the attached drawings in which:

FIGS. 6A–6E are schematic diagrams illustrating exemplary control and/or data registers associated with the exemplary signature analyzer of FIG. 3;

FIGS. 11A–11G are schematic diagrams illustrating exemplary control and/or data registers associated with the hardware cursor controller of FIG. 1;

FIGS. 13A–13C are schematic diagrams illustrating exemplary control and/or data registers associated with the color mux of FIG. 12;

FIGS. 14A and 14B illustrated an exemplary pixel transfer mapping in accordance with another aspect of the invention;

FIGS. 16A–16E are schematic diagrams illustrating exemplary control and/or data registers associated with the hardware blinking apparatus of FIG. 15;

FIG. 20 is a schematic diagram illustrating an exemplary programmable grayscale look up table matrix in accordance with another aspect of the invention;

FIG. 21 is a schematic diagram illustrating another exemplary programmable grayscale look up table matrix in accordance with the invention;

FIG. 25 is a schematic diagram illustrating another exemplary programmable grayscale look up table matrix in accordance with the invention;

FIG. 28 is a schematic diagram illustrating another exemplary programmable grayscale look up table matrix in accordance with the invention;

FIG. 30 is a schematic diagram illustrating another exemplary programmable grayscale look up table matrix in accordance with the invention; and FIG. 31 is a table illustrating several exemplary raster engine output modes in accordance with the invention.

DETAILED DESCRIPTION OF THE INVENTION

Figure 1:
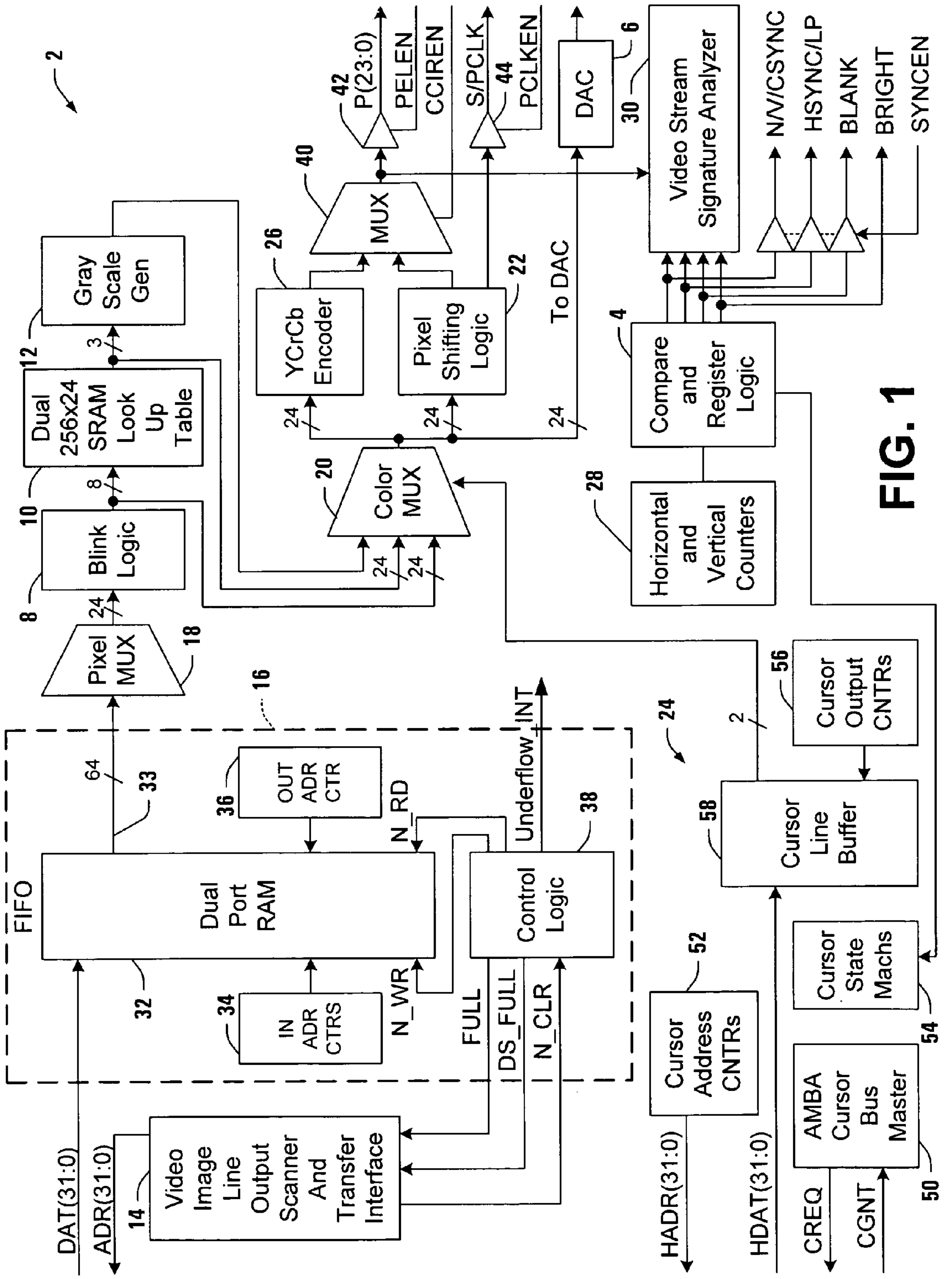
FIG. 1 is a schematic diagram illustrating an exemplary raster engine in accordance with the present invention.

The following is a detailed description of the present invention made in conjunction with the attached figures, wherein like reference numerals will refer to like elements throughout. According to the invention, an improved raster engine is provided to render video data from a frame buffer to one of a plurality of disparate displays which comprises an integral bounded video signature analyzer, a hardware cursor apparatus supporting dual scanned displays, programmatic support for multiple disparate display types, multimode programmable hardware blinking, programmable multiple color depth digital display interface, and programmable matrix controlled grayscale generation.

Referring now to the drawings, FIG. 1 illustrates an exemplary raster engine 2, which is adapted to provide data and interface signals for a variety of displays, including analog CRTs and digital LCDs (not shown). In addition, the raster engine 2 has fully programmable video interface timing for progressive non-interlaced, dual scanning, line interleaved, and interlaced displays. Programmable compare and register logic 4 allows a user or a host system application program to select appropriate display modes for interfacing a frame buffer with one or a plurality of disparate display devices. Compare and register logic 4 may comprise one or more of the control registers illustrated and described hereinafter. Separate DAC interface signals are provided to allow analog red, green, blue (RGB) signal generation for analog LCD displays or CRTs. Raster engine 2 is also designed to generate CCIR656 4:2:2 YCrCb digital video output signals for optionally interfacing an NTSC encoder (not shown). Raster engine 2 further advantageously provides support for an 8-bit parallel display interface for interfacing to low-end display modules with integrated controller and frame buffer, and may also comprise an integrated triple 8-bit DAC 6 for directly supporting analog output to CRT displays.

As illustrated in FIG. 1, the raster engine 2 includes a video pipeline comprising several major sections; a video image line output scanner and transfer interface (VILOSATI) 14, a video first in first out system (FIFO) 16, a pixel mux 18, a blink logic system 8, a dual color look up table (LUT) 10, a grayscale generator 12, an RGB color mux 20, a pixel shift logic system 22, hardware cursor logic system 24, a YCrCb encoder 26, a video timing section comprising horizontal and vertical counters 28, and the compare and register logic 4. In addition, a video stream signature analyzer 30 may be integrated in the raster engine 2 for built in self testing. The FIFO 16 further comprises a dual-port RAM device 32, input address counters 34, an output address counter 36, and control logic 38 for interfacing with the VILOSATI 14. The FIFO control logic 38 further comprises an underflow interrupt output adapted to indicate a current or potential underflow condition in the FIFO 16. An output mux 40 selectively provides output video data from one of the YCrCb encoder 26 and the pixel shift logic system 22 via data and clock buffers 42 and 44, respectively. The hardware cursor system 24 comprises an AMBA cursor bus master 50 for controlling the transfer of cursor data, cursor address counters 52, cursor state machines 54, cursor output counters 56, and a cursor line buffer 58.

Figure 2A:
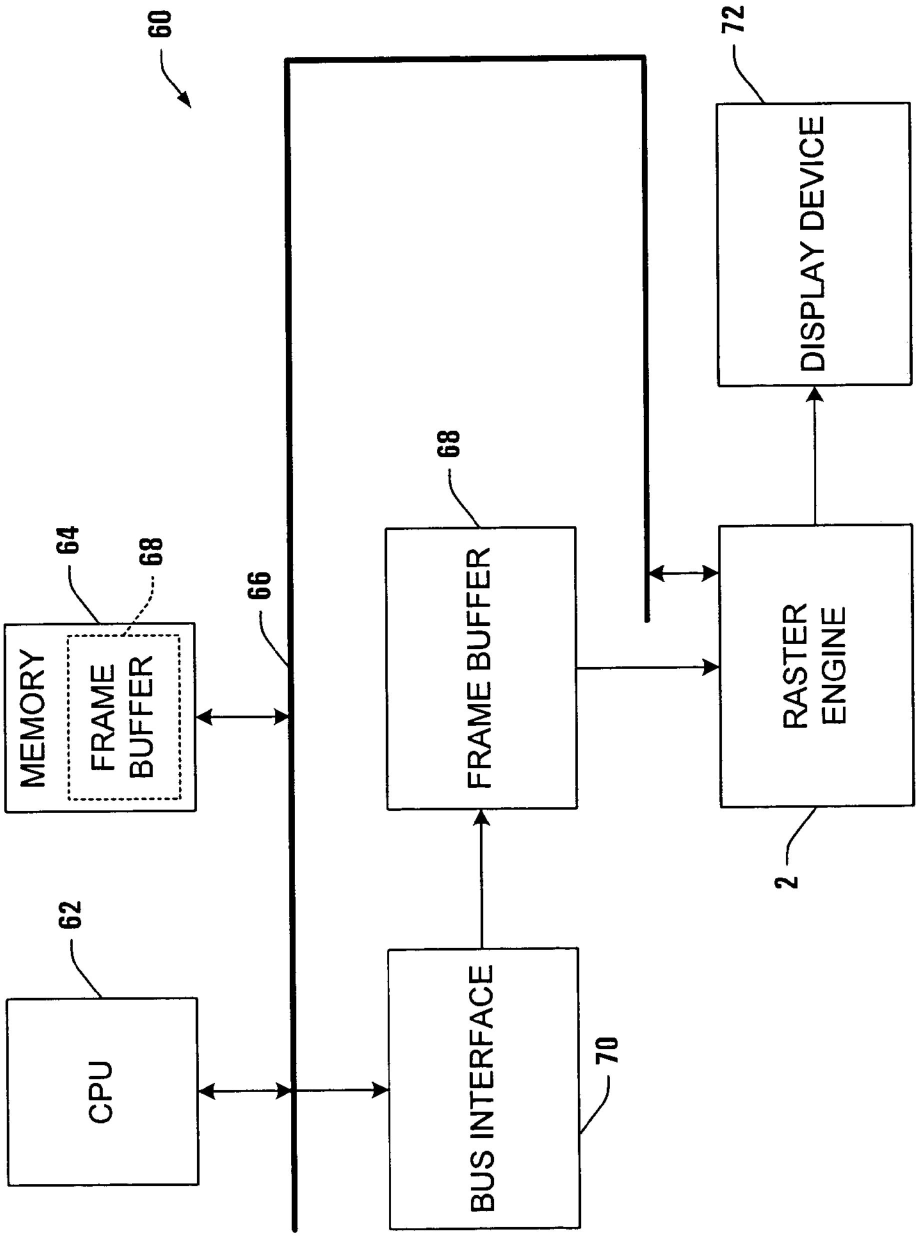
FIG. 2A is a schematic diagram illustrating a computer system in which various aspects of the invention may be employed.

Referring also to FIG. 2A, an exemplary computer system 60 is illustrated having a central processing unit (CPU) 62, a memory 64, and a bus 66 providing an interface therebetween. A video frame buffer 68 may interface with the bus 66 via a bus interface 70, or may alternatively be provided in a portion of main memory 64, wherein the beginning of video lines may be located on any 32 bit word boundary. Raster engine 2 may be operatively connected with the bus 66 for receiving video data therefrom for rendering to a display device 72. In addition, the bus 66 (e.g., including address and data busses) may provide access to the various control registers in raster engine 2, including compare and register logic 4. Video screen start registers (not shown) may be used to determine the upper left corner of the video screen. Video word addressing in screen memory may be from left to right and then top to bottom.

Four bit pixels packaged within video words may be organized in device independent bitmap (DIB) format with the left most pixel in the most significant location on a per byte basis. Several screens may be available for video display depending on screen size, pixel depth, and amount of memory dedicated to video images. The screen size may be up to 4096×4096 pixels and the pixel depth may be 4, 8, 16, 24, or 32 bpp. The raster engine 2 provides a pulse width modulated brightness control output that can be used in conjunction with a resistor and capacitor (not shown) to provide a DC voltage level for brightness control. The signal may be further employed for direct pulse width modulated cold cathode fluorescent lamp (CCFL) brightness control that can be synchronized to a display frame rate.

The raster engine 2 pipeline includes a hardware pixel blink logic system 8, adapted to selectively blink pixels on a display according to a programmable count of vertical sync intervals in a BLINKRATE register, as described in greater detail hereinafter. For 4 bpp and 8 bpp modes, either multiple or single bit planes may be used to specify blinking pixels according to the 256×24 SRAM look up table 10. This allows the number of definable blinking pixels to range from all pixel combinations blinking to one pixel combination blinking, providing significant overhead savings over conventional software blinking techniques, and finer grained blinking control than was available using conventional character blinking methodologies. For 16 bpp and 24 bpp modes, the blink logic system 8 may bypass the look up table 10, whereby blink functions may be accomplished via logic transformations of pixel data. In addition to logical AND/OR/XOR LUT address translations, the system 8 will support logical blink to background, blink dimmer, blink brighter, and blink to reverse operation.

The raster engine 2 may further comprise a dual look up table (LUT) 10, wherein each LUT will allow the raster engine 2 to output 256 different pixel combinations of 24 bit pixels in lower color depth modes. The raster engine 2 is further adapted to support video information as DIB format stored in a packed pixel architecture, although the video information need not be stored in a packed line architecture. The raster engine 2 allows a different memory organization between video scan out and graphic image memory. Therefore, memory gaps may exist between lines. Accordingly, the graphics memory may be organized wider than the video frame. For example, this may be used for left and right panning of the displayed information.

The grayscale generator 12 is adapted to generate grayscales on monochrome (or color) display types. The grayscale generator 12 supports up to 8 grayscale shades including on and off, by dithering pixels based on frame count, screen location, and pixel value. For example, the pixel value may be determined by the least significant 3 bits from LUT translated pixel data for any bpp mode. The raster engine 2 loads image data from a special DMA interface to a DRAM memory controller, and further comprises a separate advanced high speed bus (AHB) bus master for collecting hardware cursor information from anywhere in a host computer system memory.

The raster engine 2 also provides hardware cursor support via hardware cursor logic system 24. System 24 comprises an AMBA cursor bus master 50, cursor address counters 52, cursor state machines 54, cursor output counters 56, and a cursor line buffer 58. The cursor image size is adjustable to 16, 32, 48, or 64 pixels wide by up to 64 pixels in height, and is stored anywhere in memory as a 2 bpp format. The image pixel information implies transparent, inverted, cursor color 1, or cursor color 2. The cursor hardware may be supplied an image starting address, 2 cursor colors, an X and Y screen location, and a cursor size. Using this information, the raster engine 2 overlays the cursor in the output video stream. Bottom and right edge clipping may also be performed by the raster engine hardware. The raster engine 2 further provides hardware cursor support for dual scan display types according to a selected display mode, as described in greater detail hereinafter.

The VILOSATI 14 connects to a dedicated DMA port on an SDRAM controller (not shown) and reads video image data from memory, such as a frame buffer, and thereafter transfers the image data to the video FIFO 16. VILOSATI 14 keeps track of image location, width, and depth for both progressive and dual scanned images, and responds to controls (e.g., FULL, DS_FULL) from the FIFO 16 for more video data. During single scan operation, when the FIFO 16 has room for a 16 word burst, the FULL signal is inactive and VILOSATI 14 attempts to initiate a burst. The VILOSATI 14 will initiate appropriate size transfers and bursts in order to get to a 16 word boundary. After this point, VILOSATI 14 will perform transfers more efficiently using 16 word long bursts. When the FIFO 16 is full (e.g., 40 to 64, 32 bit words), the current burst is completed, and no further data is requested. When FIFO 16 signals that it has room for a burst again, the image reading process from the frame buffer continues.

For dual scan operation, the FIFO 16 is split in two and operates with a separate FULL indicator for each half. In this mode, the FULL signal and a DS_FULL indicator (not shown) trigger from 12 to 32 words. For dual and single scan displays, information for the upper left corner of the display begins at a word address stored in a VIDSCRNPAGE register (not shown). For a dual scan display, information from the upper left corner of the lower half of the display begins at the word address stored in a VIDSCRNHPG register (not shown). The VIDSCRPAGE and VIDSCRNHPG registers are used to pre-load address counters at the beginning of a video frame. The VILOSATI 14 continues to service the video FIFO 16 until it has transferred an entire screen image (e.g., a frame) from memory. The size of the screen image is controlled by the values stored in a SCRNLINES register and a LINELENGTH register (not shown). The SCRNLINES register value defines the total number of displayed (active) lines for the video frame. The LINELENGTH register defines the number of words for each displayed (active) video line. A separate register, VLINESTEP (not shown), defines the word offset in memory between the beginning of each line and the next line. Setting the VLINESTEP value larger than the LINELENGTH value provides the capability for image panning.

The video FIFO 16 is used to buffer video data transferred from the frame buffer memory (e.g., of frame buffer 68 of FIG. 2A) to the video output system without stalling the video data stream of the raster engine 2. The FIFO 16 comprises a dual port RAM 32 with input and output address index counters 34 and 36, respectively, and a control logic system 38 to operate as a FIFO memory. The input data bus width to the FIFO 16 is 32 bits. During dual scan mode, wherein the display requires scan out of the bottom and top half of the screen at the same time, top half (or bottom half) information is stored in every other FIFO location. In progressive scan mode wherein video data is scanned out as a single progressive image, the FIFO data is stored sequentially. The FIFO output data bus is 64 bits wide and can output even and odd words on both the upper and lower half of the bus. Writes to the FIFO 16 advance the input index counter 34, while reads from the FIFO 16 advance the output index counter 36. The input and output counters 34 and 36 are compared to generate the FULL and DS_FULL output controls to the VILOSATI 14. The N_CLR signal resets both the input and output index counters 34 and 36 to 0, for example, at the end of a video frame.

The control logic 38 in the FIFO system 16 includes an underflow detection and indication system which operates to detect an underflow of the FIFO 16 (e.g., dual port RAM 32) and/or a near underflow condition therein, and to provide the Underflow_INT signal according to the detected underflow condition. The underflow system of the FIFO control logic 38 may include, for example, comparison logic for comparing the values of in and out counters 34 and 36, respectively, and for making a determination of whether an underflow condition exists or is anticipated. The Underflow_INT indication may be advantageously provided to a host processor (e.g., CPU 62 of FIG. 2A) whereby methods to balance bus loading or to limit burst sizes may be applied by the host processor. This feature is particularly advantageous where the raster engine interface with the frame buffer memory is via a bus isolated from that of the host processor. In this situation, the host may not be able to independently detect or sense bus loading conditions resulting in a starving raster engine. Thus, the invention provides for early indication to the host processor, whereby elimination or reduction in raster engine underflow conditions may be achieved.

Figure 2B:
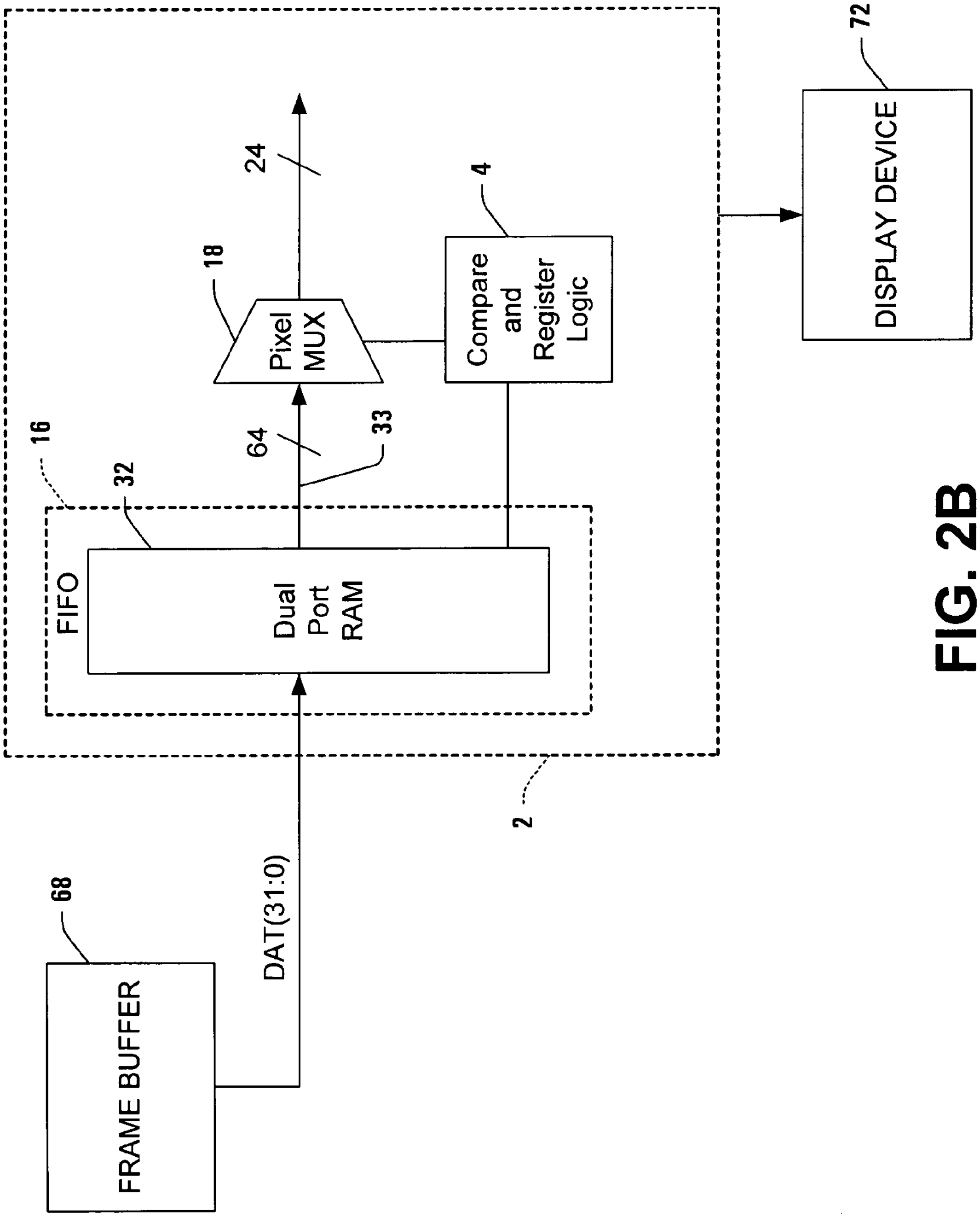
FIG. 2B is a schematic diagram further illustrating the raster engine of FIG. 1.

Referring also to FIG. 2B, the pixel reconstruction system of the raster engine 2 includes a pixel multiplexer 18 and pipe-line registers (not shown), wherein the pixel multiplexer 18 is operative to 'unpack' the video pixels stored in the dual port RAM 32 of the video FIFO 16. The stored FIFO words (e.g., 32 bit words in the dual port RAM 32) may be transferred 2 at a time across a 64 bit bus 33. The multiplexer 18 selects a single pixel to go on the 24 bit output bus based on the value set in a PIXELMODE register (e.g., in compare and register logic 4), as illustrated and described in greater detail hereinafter. The pixel multiplexer 18 is controlled by a pixel counter (not shown) that also increments based on the PIXELMODE register value.

The amount and frequency of data read from the FIFO 16 is dependent on the number of bits per pixel. For example, in an 8 bpp configuration, the 64 bit FIFO output is changed for every eight pixels. In dual scan mode, the upper 32 bits and lower 32 bits are read out in parallel and upper half screen and lower half screen pixels are unpacked and loaded into the video stream sequentially. The format of the video data in the frame buffer 68 may vary. For example, the data obtained by the dual port RAM 32 from the frame buffer 68 may comprise 4 bpp (bits per pixel), 8 bpp, 16 bpp 555 mode, 16 bpp 565 mode, 24 bpp mode, or 32 bpp data formats. The pixel multiplexer 18 selects appropriate pixel data from the dual port RAM 32 according to a selected display mode, and accordingly provides the selected pixel data to match an output format required by the selected display type. The raster engine 2 thereby provides for selective remapping of the pixel data from the frame buffer format to a format appropriate for interfacing to a selected display device type, without requiring rerouting of signals outside of the raster engine. This remapping feature is provided via one or more user programmable control registers, which may be included within the compare and register logic 4 as illustrated in FIG. 2B, or which may reside elsewhere in the raster engine 2.

Bounded Video Signature Analyzer

Figure 3:
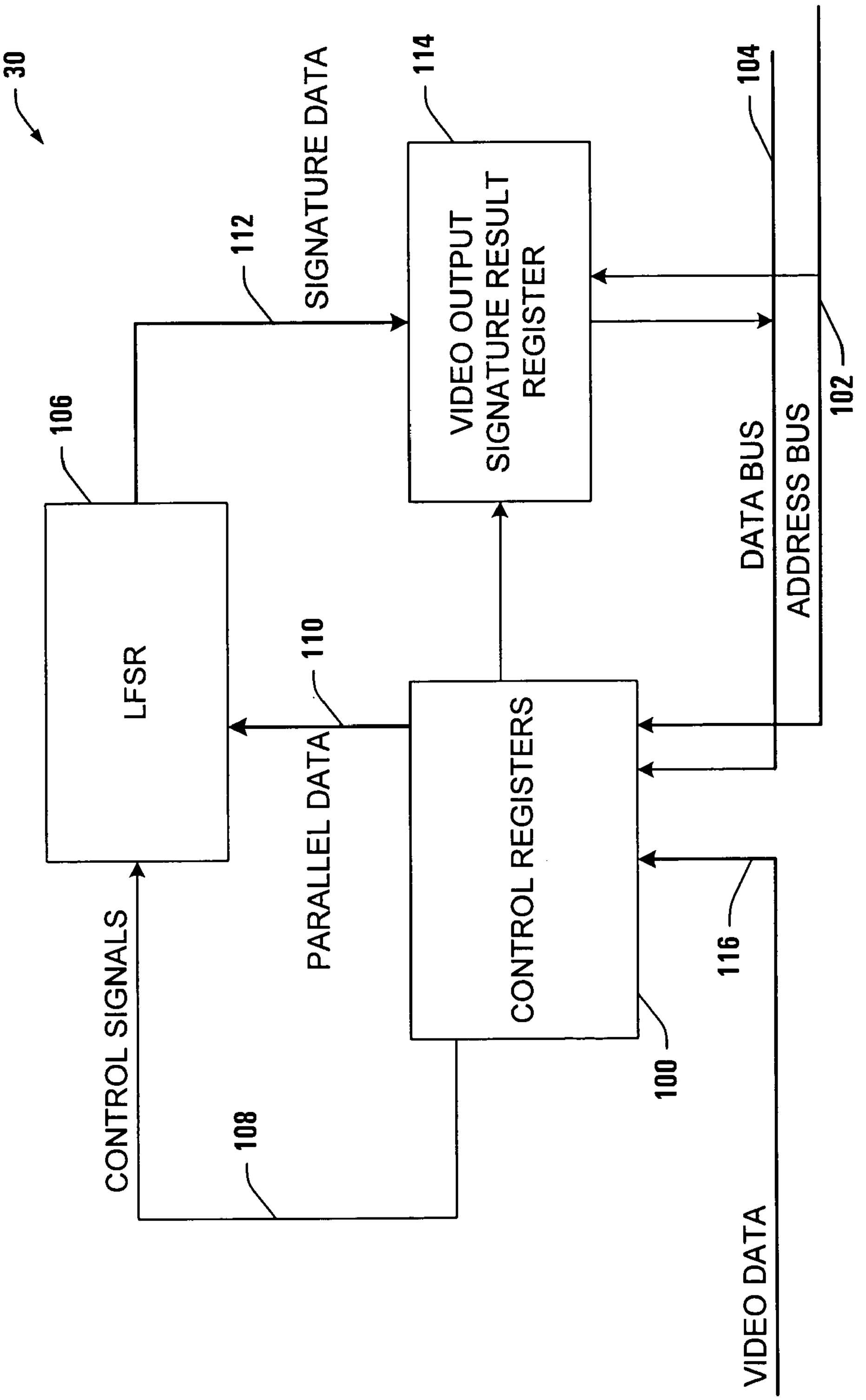
FIG. 3 is a schematic diagram illustrating an exemplary signature analyzer in accordance with an aspect of the invention.

Referring now to FIG. 3, the exemplary bounded video output signature analyzer 30 is illustrated having control registers 100 accessible to a host processor in the system (e.g., system 60 of FIG. 2A) via an address bus 102 and a data bus 104 (e.g., collectively system bus 66 of system 60), and further comprising a linear feedback shift register (LFSR) 106 receiving control signals 108 and parallel video data 110 from control registers 100, and providing video signature data 112 to a video output signature result register 114. Registers 100 may be, for example, included within the compare and register logic 4 of raster engine 2 in FIG. 1, and receive video data 116 from the mux 40 of the raster engine 2. Signature analyzer 30 may be used for built in self testing of reference images to ensure proper operation of the entire video system and data path. In addition, the signature analyzer 30 is operative to perform selective analysis of a portion of the video data from the raster engine 2. The bounded video signature analyzer 30 thus may perform signature analysis on one or more selected portions of the video data, in order to allow testing of video screen images having features which change over time (e.g., clocks, date indications, and the like). The video timing section (e.g., counters 28 and compare and register logic 4) of the exemplary raster engine 2 provides enable and clear control signals that determine the area of the output image that is used for the signature analysis calculation and at what time the next signature starts/last value is stored.

Figure 4:
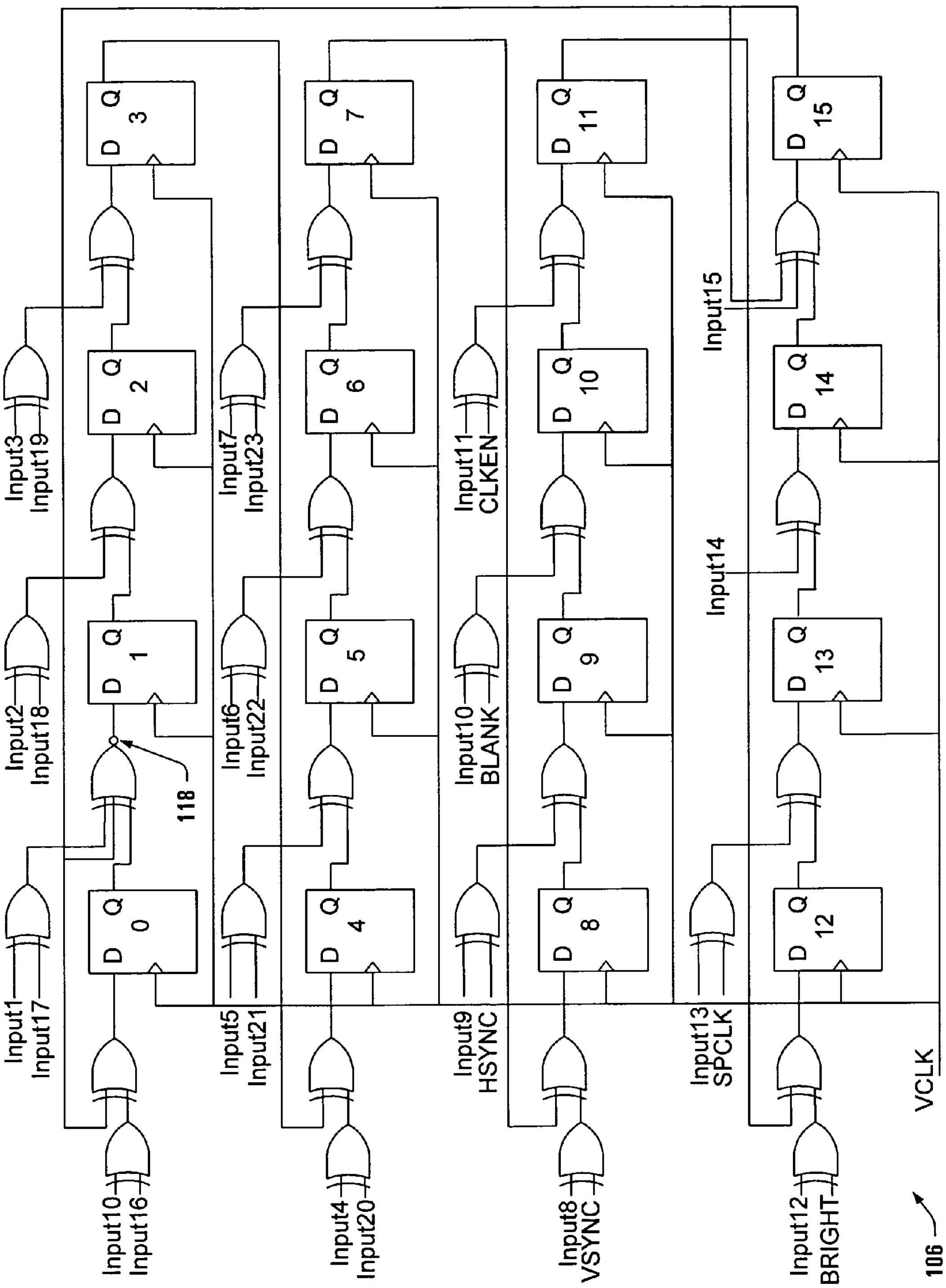
FIG. 4 is a schematic diagram illustrating an exemplary linear feedback shift register in accordance with another aspect of the invention.

Referring also to FIG. 4, the video analyzer LFSR 106 is illustrated having parallel inputs input0 through input23 for incoming video data to be analyzed. Timing control signals are also fed into the LFSR 106 as parallel data to be analyzed. Each parallel input into the video signature analyzer LFSR 106 may be separately enabled in the control registers 100. Result storage register 114 receives a signature value from the LFSR 106 which is unique to the input video data 110, and may be read via the host computer system (e.g., system 60 of FIG. 2A). For example, a new signature is calculated once per frame and stored based on a programmed signature clear location. During grayscale operation, the signature may be automatically taken over a 12 frame or other interval.

Depending on the refresh frequency of the display device 72, this could be a significant time interval. For example, the analyzer may have a calculation interval of 500 ms or more before updating the signature value. In addition, the signature analyzer LFSR 106 includes a logical inversion 118 in the feedback chain, whereby a non-zero signature output is provided by LFSR 106 in response to zero parallel input data 110 from control registers 100. Thus, for a zero seed value and null inputs, a signature is still generated based on the number of clock pulses.

The integration of the signature analyzer 30 with the raster engine 2, allows the raster engine 2 to be tested after shipment to an end user or retailer, and further enables self testing initiated via the control registers 100 by a user and/or an application programming running on a host computer system (e.g., system 60). This integration provides significant advantages over conventional video signature analyzers and video controllers where a separate signature analyzer had to be connected to a raster engine to perform such signature analysis.

Figure 5:
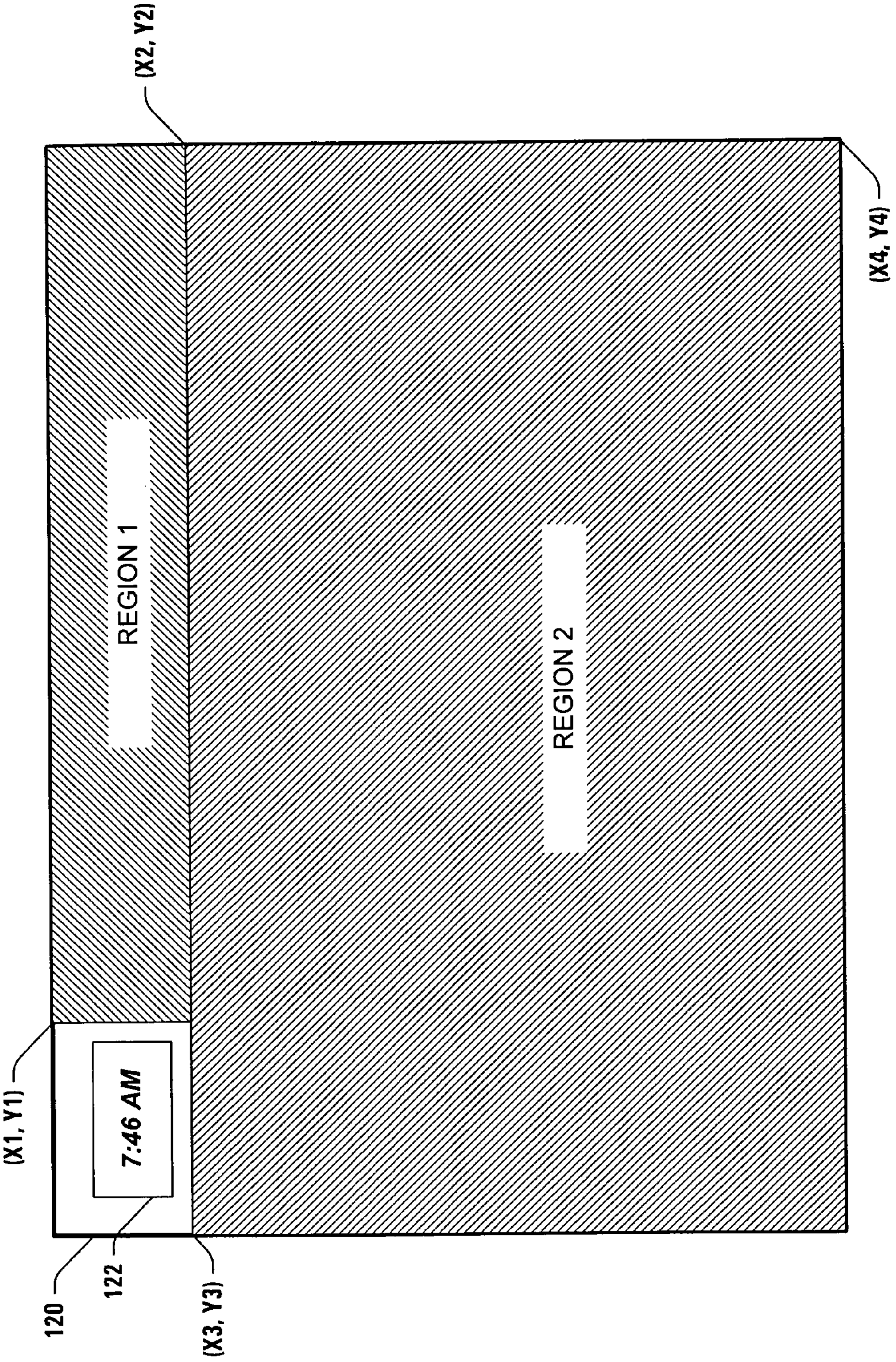
FIG. 5 is a schematic diagram illustrating a bounded video signature analysis for a bounded portion of a display using the exemplary signature analyzer of FIG. 3.

The signature analyzer 30, moreover, is bounded. The analyzer 30 may thus be programmed (e.g., via control registers 100) to analyze a portion of a video screen data set, whereby selective avoidance of certain display areas may be achieved. Referring also to FIG. 5, an exemplary display screen 120 is illustrated having a clock image 122 displayed thereon. Thus, where it is known that the clock image 122 changes over time, the signature analyzer 30 may be adapted to selectively analyze one or more regions REGION 1 and/or REGION 2 in the display 120. Thus, the signature analyzer 30 may first analyze the video data between display locations (X1, Y1), and (X2, Y2) to obtain a signature for REGION 1, and subsequently analyze the video data between locations (X3, Y3) and (X4, Y4) to generate a signature for REGION 2. This capability allows successful signature analysis of the majority of the display 120 by comparison to known good signature information, without experiencing false indications of failure due to the changing nature of the clock image 122, which false indications were common in prior non-bounded signature analyzers.

Figure 6A:
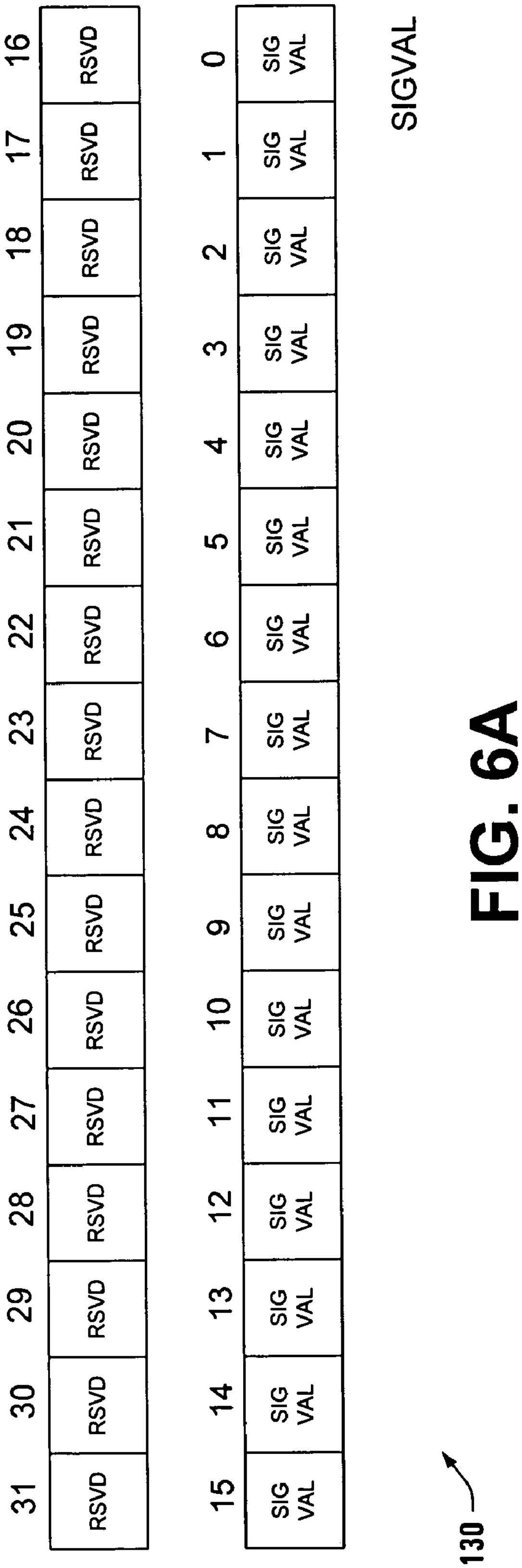
Figure 6B:
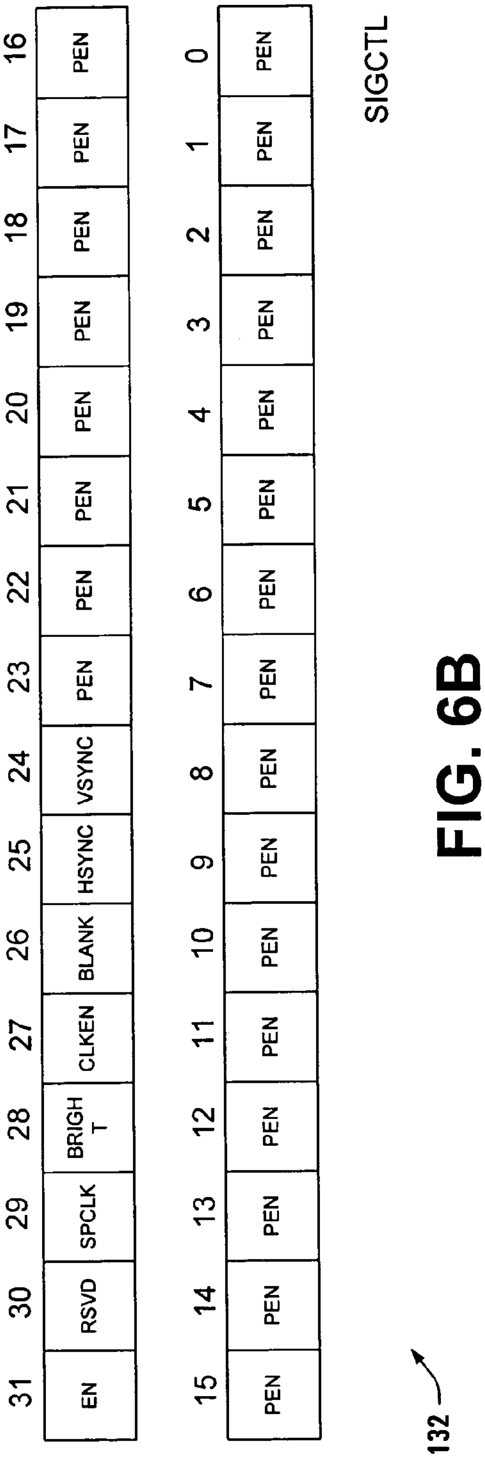
Figure 6C:
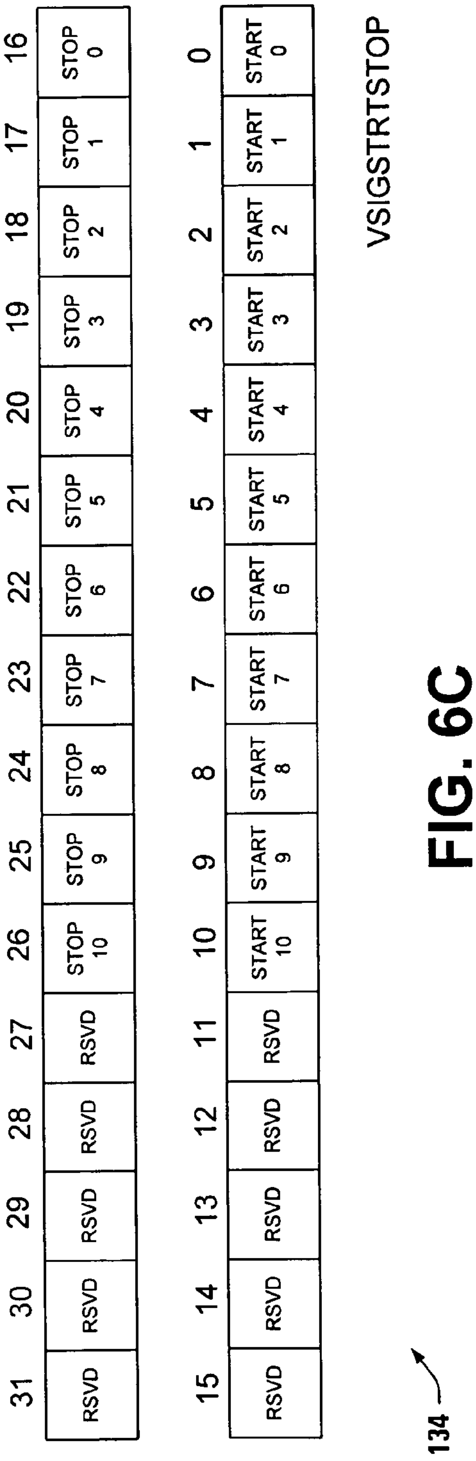

Referring also to FIGS. 6A through 6E, exemplary control registers SIGVAL 130, SIGCTL 132, VSIGSTRTSTOP 134, HSIGSTRTSTOP 136, and SIGCLR 138 are illustrated. The registers 130, 132, 134, 136, and 138 may be included within control registers 100 of FIG. 3. SIGVAL 130 is a video output signature result value register (e.g., register 114 of FIG. 3), having reserved bits RSVD, and SIGVAL[15:0] bits. The read only SIGVAL value is the 16 bit result of the video output signature. This value may be updated once per frame based on the SIGCLR location. During grayscale operation, the SIGVAL register may be updated once every 12 frames. The SIGCTL register 132 of FIG. 6B is a video output signature control register, having the following bit descriptions: EN: enable bit, which enables a linear feedback shift register; RSVD (reserved) bits; SPCLK bit which may be used to enable the SPCLK output for calculation in the video signature; BRIGHT bit used to enable the BRIGHTNESS control output for calculation in the video signature; a CLKEN bit used to enable the CLKEN control for calculation in the video signature; a HSYNC bit used to enable the HSYNC output for calculation in the video signature; a VSYNC bit is used to enable the VSYNC output for calculation in the video signature; and PEN[23:0] bits, which may be used to enable individual pixel bits for calculation in the video signature.

The SIGSTRTSTOP register 134 is a vertical signature bounds start/stop register, having reserved bits RSVD and STOP [10:0] bits to provide a value of a vertical down counter at which the VSIGEN signal goes inactive. This may be used to indicate the end of a signature calculation for a vertical frame. VSIGEN may be an internal block signal. The SIG_ENABLE control to the video signature analyzer may be enabled by the logical AND of VSIGEN and HSIGEN. In addition, the SIGSTRTSTOP register 134 further includes STRT[10:0] bits which indicate a value of the vertical down counter at which the VSIGEN signal becomes active. This may indicate the beginning of the signature calculation for the vertical frame. VSIGEN is an internal block signal. The SIG_ENABLE control to the video signature analyzer may be enabled by the logical AND of VSIGEN and HSIGEN.

The HSIGSTRTSTOP register 136 is a horizontal signature bounds start/stop register, having reserved bits RSVD and STOP[10:0] bits which indicate a value of the horizontal down counter at which the HSIGEN signal goes inactive, indicating the end of the signature calculation for a horizontal line. HSIGEN is an internal block signal. The SIG_ENABLE control to the video signature analyzer may be enabled by the logical AND of VSIGEN and HSIGEN. Register 136 further comprises STRT[10:0] bits indicating a value of the horizontal down counter at which the HSIGEN signal becomes active. This indicates the beginning of the signature calculation for a horizontal line. HSIGEN is an internal block signal. The SIG_ENABLE control to the video signature analyzer is enabled by the logical AND of VSIGEN and HSIGEN.

The SIGCLR register 138 is a signature clear location register having reserved bits RSVD and VCLR[10:0] bits which may indicate a value of the vertical down counter at which the VSIGCLR signal is active. This indicates the line for clearing the LFSR and storing the result value for the vertical frame. VSIGCLR is an internal block signal. The SIG_CLR control to the video signature analyzer is generated by the logical AND of VSIGCLR and HSIGCLR. The SIGCLR control signal is also routed to an edge trigger capable interrupt on the interrupt controller for use as a programmable secondary REALITI interrupt output. Register 138 further comprises HCLR[10:0] bits which may indicate a value of the horizontal down counter at which the HSIGCLR signal is active. This indicates the specific horizontal pixel clock for clearing the LFSR and storing the result value within a horizontal line. HSIGCLR is an internal block signal. The SIG_CLR control to the video signature analyzer is generated by the logical AND of VSIGCLR and HSIGCLR. The SIGCLR control signal is also routed to an edge trigger capable interrupt on the interrupt controller for use as a programmable secondary REALITI interrupt output.

Hardware Cursor

Figure 7A:
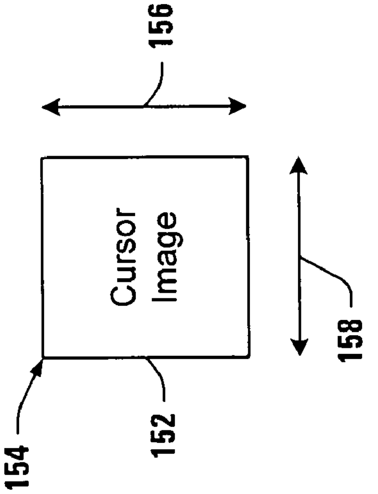
FIG. 7A is a schematic diagram illustrating an exemplary cursor image in accordance with another aspect of the invention.
Figure 7B:
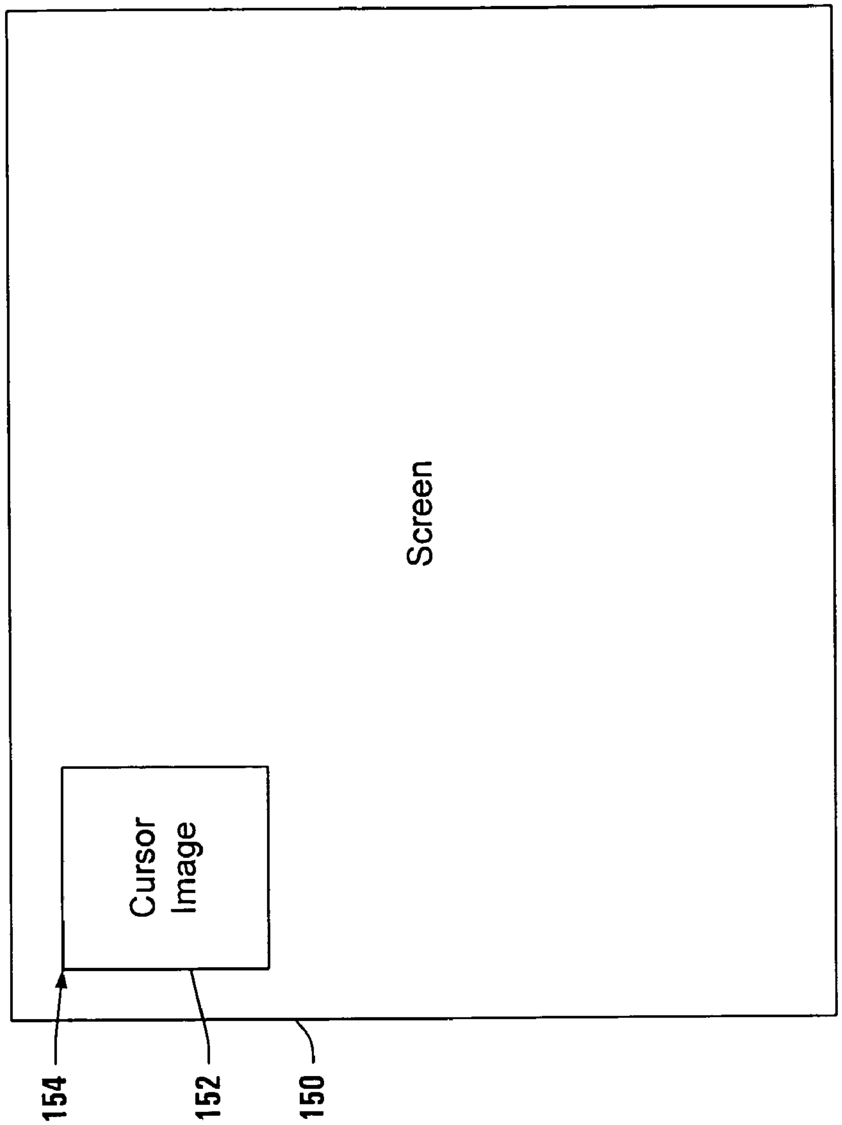
FIG. 7B is a schematic diagram illustrating an exemplary progressive scan display including the cursor image of FIG. 7A.

The raster engine 2 further provides support for a hardware cursor, via the exemplary hardware cursor system 24 of FIG. 1. The hardware cursor system 24 is adapted to support dual as well as progressive scan display types according to a selected display mode, as described in greater detail hereinafter. Referring to FIGS. 7A and 7B, a progressive scan display 150 is illustrated having a cursor image 152 displayed thereon. The cursor image 152 has a starting address 154 (e.g., X and Y location), a vertical height 156, and a width 158, for example, where the height 156 and width 158 may be expressed in terms of lines and pixels, respectively. The hardware cursor system 124 is adapted to selectively overlay the cursor image 152 onto the display 150 in progressive scan mode. For a progressive scanned images, the system 24 is provided a starting address in memory for the cursor image 152, the X and Y location 154, the height 156 of the cursor in lines, and the width 158 of the cursor in pixels. A single line of the cursor image 152 is then loaded into the storage registers 100 of FIG. 1. As the display 150 is scanned, the system 24 waits for the appropriate X and Y location on the line and pixel counters (e.g., horizontal and vertical counters 28 of FIG. 1), and then overlays the cursor data into the video stream via the mux 20.

Figure 8B:
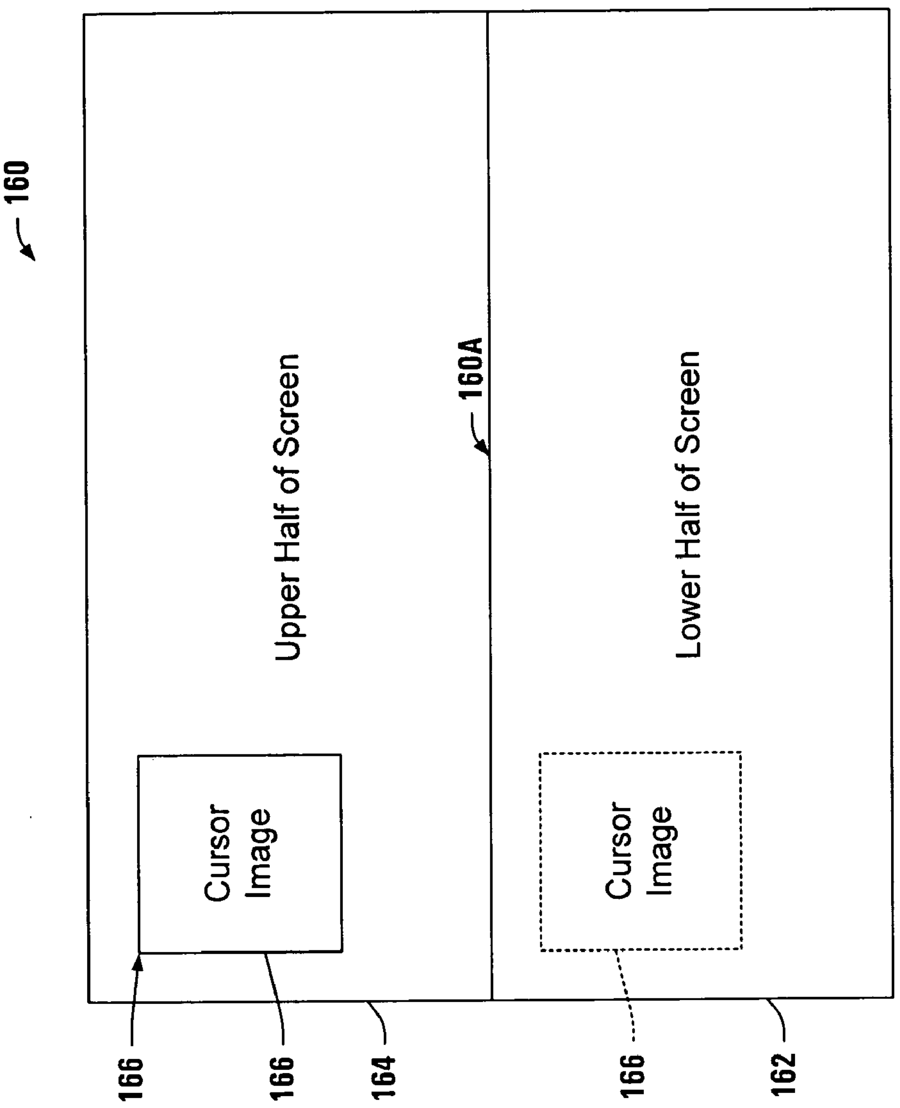
FIG. 8B is a schematic diagram illustrating an exemplary dual scan display including the cursor image of FIG. 8A.
Figure 8A:
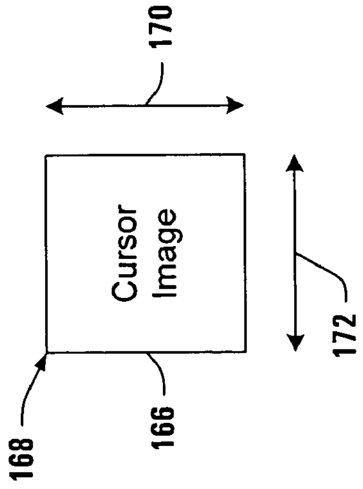
FIG. 8A is a schematic diagram illustrating another exemplary cursor image in accordance with the invention.

Referring now to FIGS. 8A and 8B, an exemplary dual scan display 160 is illustrated having adjacent first display portion 162 and second display portion 164, providing lower and upper halves of the display 160, respectively, and with a display boundary 160A therebetween. The dual scan display 160 may be refreshed by scanning out the first and second display portions 162 and 164 at the same time in parallel. A cursor image 166 has a start address 168, a vertical height 170, and a width 172. The hardware cursor system 24 is adapted to selectively overlay the cursor image 166 onto one of the first and second portions 162 and/or 164, respectively of the display 160 in dual scan mode.

Figure 9B:
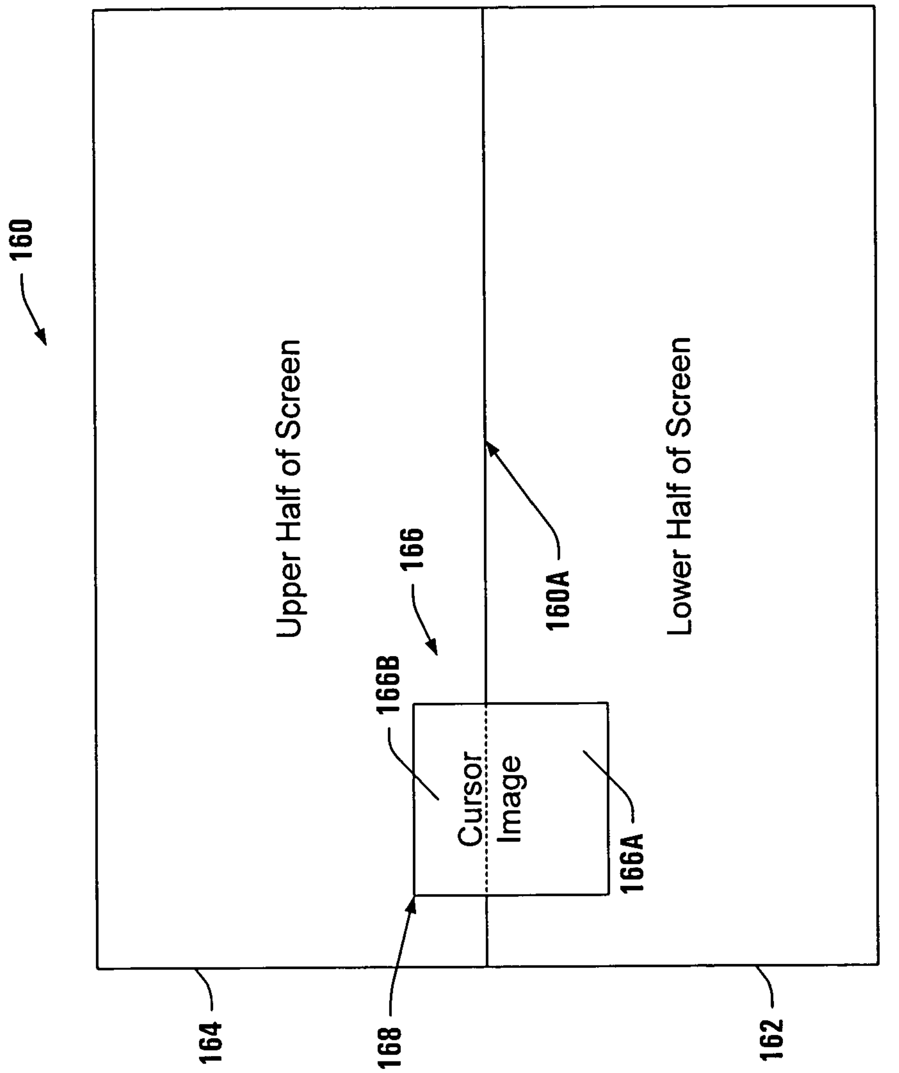
FIG. 9B is a schematic diagram illustrating the exemplary dual scan display of FIG. 8B including the cursor image of FIG. 9A.
Figure 9A:
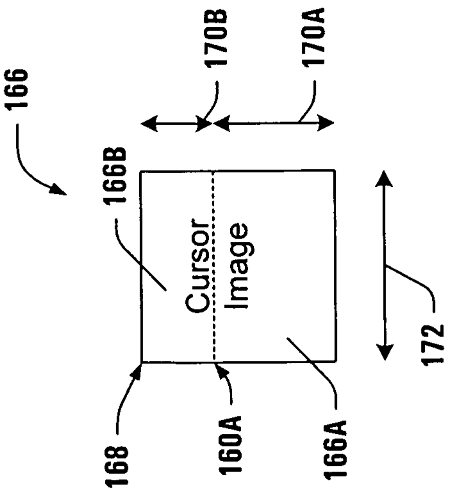
FIG. 9A is a schematic diagram illustrating another exemplary cursor image in accordance with the invention.

Referring also to FIGS. 9A and 9B, the cursor image 166 is illustrated crossing the display boundary 160A, wherein a first portion 166A thereof is in the first or lower portion 162 of the display 160 having a first cursor portion height 170A, and wherein a second cursor portion 166B is in the second or upper display portion 164 having a second cursor portion height 170B. For dual scanned images, the hardware cursor system 24 is provided with the X and Y coordinates or location of where to begin inserting the cursor image 166 into the video stream, the address of where the first portion 166A of the cursor image 166 is to be overlayed, the Y location or coordinate of the second portion 166B of the cursor image 166 if applicable (e.g., where the cursor image 166 crosses the display boundary 160A), the address at which to start looking for the next part of the cursor image 166 to be overlayed (e.g., the second cursor portion 166B) after overlaying the last line of the cursor image first portion 166A, the first and second cursor portion heights 170A and 170B, respectively (if applicable), the cursor width 172, and whether the cursor image 166 is in the first display portion 162, the second display portion 164, or both (e.g., cursor image 166 crosses the display boundary 160A).

The hardware cursor system 24 employs this information to overlay the cursor image 166 onto the display 160 by selectively inserting cursor image data into the video stream of the raster engine 2 via the mux 20. Initially, the first line of the first portion 166A of the cursor image 166 is loaded into one or more registers (e.g., of compare and register logic 4) from the start address. As the display 160 is scanned, the cursor system 24 waits for the X and Y location on the horizontal and vertical counters 28, and overlays or inserts the appropriate cursor data into the video stream. In dual scan operation where the cursor image 166 appears only in one of the first and second display portions 162 and 164, respectively, the cursor image data is overlaid in the appropriate display portion. This process continues until all the cursor image data lines have been inserted into the video stream via the mux 20. If the cursor is entirely in one of the display portions 162 or 164, this completes the cursor image overlay until the next video image frame.

Where the cursor image 166 crosses the display boundary 160A, the hardware cursor system 24 jumps to the address location for the second cursor portion 166B, which is also known as the reset address. The first line of the second cursor portion 166B is then loaded into the storage buffer registers of compare and register logic 4. It will be appreciated that where the dual scanning simultaneously scans from top to bottom of each of the first (lower) portion 162 and the second (upper) portion 164 of the display 160, that the first (lower) cursor portion 166A will be overlayed into the video stream for the first (lower) display portion 162 prior to the second (upper) cursor portion 166B being overlayed into the video stream for the second (upper) display portion 164, although the invention contemplates other scanning methodologies. The system 24 then waits for the same X and the second Y location in the line and pixel counters (e.g., via cursor output counters 56, compare and register logic 4, and horizontal and vertical counters 28). At the appropriate counter values, the cursor line buffer 58 overlays the second cursor portion 166B into the video stream for the second (upper) display portion 160B via the mux 20 until the second cursor portion 166B has been completely overlayed (e.g., according to the height 170B of the second cursor portion 166B).

In this fashion, fast hardware cursor overlaying is provided for progressive as well as dual scanned display types according to a selected display type. The invention thus provides significant reduction in the processing resource overhead associated with conventional software cursor overlay techniques, and programmatically supports a variety of disparate display and cursor types. For example, the cursor image size may be adjustable to 16, 32, 48, or 64 pixels wide by up to 64 pixels in height, and may be stored anywhere in memory as a 2 bpp.

The image pixel information implies transparent, inverted, cursor color 1, or cursor color 2. The cursor hardware system 24 may be supplied an image starting address, 2 cursor colors, an X and Y screen location, and a cursor size. Using this information, the raster engine 2 overlays the cursor in the output video stream. Bottom and right edge clipping may also be performed by the raster engine hardware 24. The bus mastering interface 50 to an AMBA bus allows the hardware cursor image to be stored anywhere in host system memory (e.g., memory 64 of FIG. 2A). Software provides a location start, reset, size, x & y position, and two cursor colors. The system 24 loads a line at a time from memory and multiplexes the video stream data based on the cursor values. The X & Y locations are compared to the horizontal and vertical counters (e.g., counters 28 of raster engine 2) and trigger the state machine 54 to enable the cursor output overlay via the cursor line buffer 58 and the mux 20.

Figure 10:
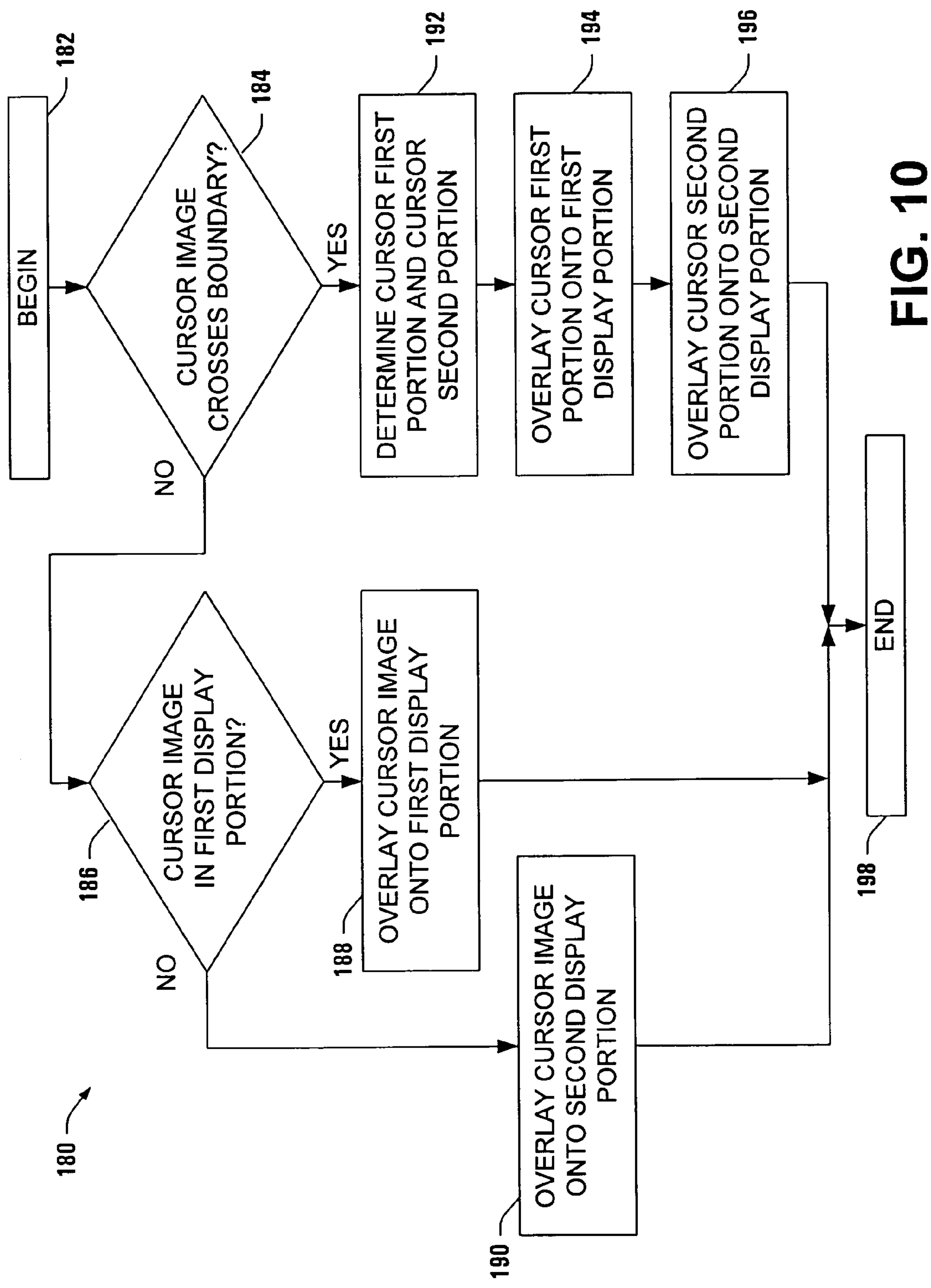
FIG. 10 is a flow diagram illustrating an exemplary method in accordance with another aspect of the invention.

The invention further comprises a method of overlaying a cursor image onto a dual scan display. Referring to FIG. 10, an exemplary method 180 is illustrated for each frame beginning at step 182. In dual scan display mode, decision step 184 determines whether the cursor image (e.g., image 166 of FIG. 9A) crosses the display boundary (e.g., display boundary 160A of display 160). If not, decision step 186 determines whether the cursor image is in the first display portion (e.g., first display portion 162). If so, the cursor image is overlayed onto the first display portion at step 188. If not, the cursor image is overlayed onto the second display portion (e.g., second display portion 164) at step 190. Where the cursor image crosses the display boundary at step, 184, the method 180 proceeds to step 192 where the first and second portions of the cursor are determined (e.g., first and second cursor portions 166A and 166B of FIG. 9A). Thereafter, the first cursor portion is overlayed onto the first display portion at step 194, after which the second cursor portion is overlayed onto the second display portion at step 196. Once the cursor image has been thus overlayed onto the dual scanned display, the method 180 ends at step 198, until the next frame is to be scanned out.

Figure 11A:
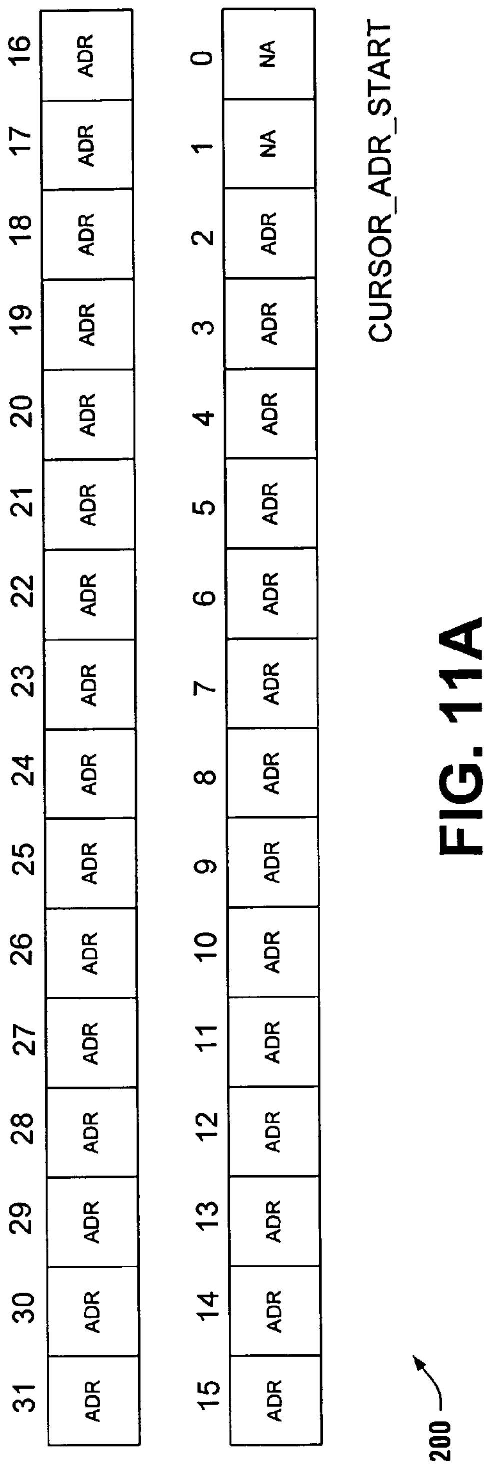

Referring now to FIGS. 11A through 11G, various registers operatively associated with the hardware cursor system 24 are illustrated and described hereinafter. It will be appreciated that the registers of FIGS. 11A through 11G may be included in the compare and register logic 4 of the exemplary raster engine 2 in FIG. 1, or alternatively may be located elsewhere in the raster engine 2. In FIG. 11A, a CURSOR_ADR_START register 200 is illustrated. This register 200 is a cursor image address start register having reserved bits RSVD and ADR[31:2] bits indicating the beginning word location of the part of the cursor image to be displayed first. The image is 2 bits per pixel, and may be stored linearly. The amount of storage space is dependent on the width and height of the cursor. Reset is the beginning word location of the part of the cursor which will be displayed next after reaching the last line of the cursor. These locations are used for dual scan display of cursor information. If the cursor is totally in the upper half or lower half of the screen, the Start and Reset locations may be the same. Otherwise the cursor may be overlaid on the video information at the start address, and when the dual scan height counter generates a carry, will jump to the reset value. The cursor then continues to be overlaid when the Y location is reached, and will jump to the start address value when the height counter for the upper half generates a carry. Offsetting the start value and changing the width of the cursor to be different from the cursor step value allows the appropriate 48, 32, or 16 pixels of a larger cursor to be displayed only. Furthermore, offsetting the starting X location off of the left edge of the screen allows pixel placement of the cursor off of the screen edge.

Figure 11B:
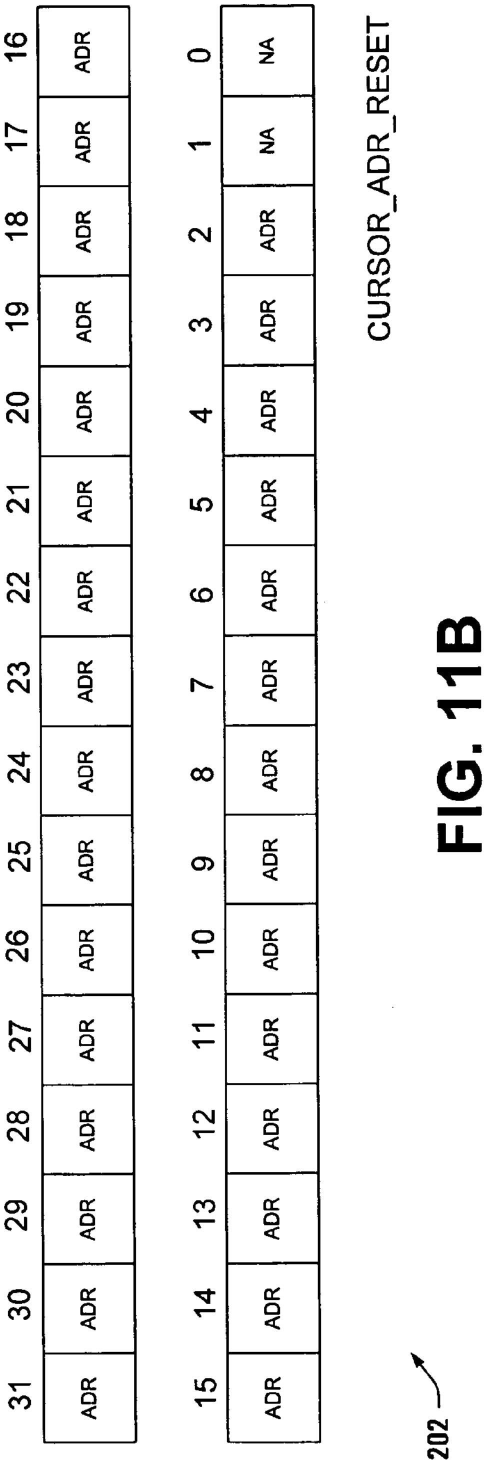

In FIG. 11B, a CURSOR_ADR_RESET register 202 is illustrated, having reserved bits RSVD and ADR[31:2] bits indicating the beginning word location of the part of the cursor which may be displayed next after reaching the last line of the cursor. Both start and reset locations are employed for dual scan display of cursor information. If the cursor is totally in the upper half or lower half of the screen, the Start and Reset locations may be the same. Otherwise (the cursor image crosses the display boundary) the cursor will be overlaid on the video information beginning at the start address, and when the dual scan height counter generates a carry, will jump to the reset value. The cursor will then continue to be overlaid when the Y location is reached, and will jump to the start address value when the height counter for the upper half (e.g., the second display portion) generates a carry. Offsetting the reset value and changing the width of the cursor to be different from the cursor step value allows the appropriate 48, 32, or 16 pixels of a larger cursor to be displayed only. Furthermore, offsetting the reset X location off of the left edge of the screen will allow pixel placement of the cursor off of the screen edge.

A CURSORSIZE register 204 is illustrated in FIG. 11C for setting the cursor height, width, and step size, having reserved bits RSVD and DLNS[5:0] (dual scan lower half lines) bits which may be set to the number of cursor lines displayed in the lower half of the screen in dual scan mode. Register 204 further comprises CSTEP[1:0] cursor step size bits, which control the counter step size for the width of the cursor image. For example, the following cursor step sizes are possible according to the CSTEP bits: 00 step by 1 word or 16 pixels at a time, 01=step by 2 words or 32 pixels at a time, 10=step by 3 words or 48 pixels at a time; and 11=step by 4 words or 64 pixels at a time. The register 204 further comprises CLINS[5:0]: cursor line bits, which control height in lines of the cursor image. The value may be set, for example, to the number of lines minus 1. In a dual scan mode this may be set to the number of cursor lines displayed in the top half of the screen. Also included in register 204 are CWID[1:0]: cursor width bits, which control the displayed word width (minus 1) of the cursor image, which may have the following values: 00=display 1 word or 16 pixels; 01=display 2 words or 32 pixels; 10=display 3 words or 48 pixels; or 11=display 4 words or 64 pixels.

In FIG. 11D, the CURSORCOLOR1, CURSORCOLOR2, CURSORBLINK1, and CURSORBLINK2 registers 206 are illustrated for defining the color of the displayed cursor image. The registers have the following bit definitions: RSVD: Reserved; COLOR[23:0]: Image color inserted directly in the video pipeline, which overlays all other colors when cursor enabled, and may not go through LUT. (e.g., look up table 10). The 2 bit per pixel stored cursor image bits may, for example, be displayed as follows: 00=transparent; 01=invert video stream; 10=CURSORCOLOR1 during no blink, CURSORBLINK1 during blink; and 11=CURSORCOLOR2 during no blink, CURSORBLINK2 during blink.

Referring to FIG. 11E, a CURSORXYLOC register 208 is illustrated for defining the X and Y cursor location, which includes reserved bits RSVD and YLOC[10:0] bits which control the starting vertical Y location of the cursor image. The value is used to compare to the vertical line counter and may be set by software to be between the active start and active stop vertical line values. The cursor hardware 24 may clip the cursor at the bottom of the screen. The new location value may not be used until the next frame to prevent cursor distortion. Also included in the register 208 is a CEN bit, which may be used to enable the hardware to insert the defined cursor into the image output video stream. For example, when active, data from a location defined by the CURSORADR register may be combined with the output video stream. Thus, the CEN bit may have the following values: 0=hardware cursor not activated; and 1=hardware cursor activated. During dual scan mode this bit may be used to indicate that some or all of the cursor is located on the upper half of the screen. The XLOC[10:0]: bits control the starting horizontal X location of the cursor image. The value may be used to compare to the horizontal pixel counter and may be set by software to be between the active start and active stop horizontal pixel values. The cursor hardware may clip the cursor at the right edge of the screen. This value may also be used to control the starting location for the cursor image on the upper half of the screen during dual scan mode. The new location value may not be used until the next frame to prevent cursor distortion.

In FIG. 11F, a CURSOR_DHSCAN_LH_YLOC register 210 is illustrated for indicating the X and Y cursor location. This register 210 includes reserved bits RSVD, a CLHEN bit (cursor lower half enable) indicating that some or all of the cursor is located on the lower half of the screen, and YLOC[10:0]bits, wherein during dual scan display mode, the YLOC[10:0] value controls the starting vertical Y location on the lower half of the screen for the cursor image. The value may be used to compare to the vertical line counter and may be set by software to be between the active start and active stop vertical line values. The cursor hardware may clip the cursor at the bottom of the screen. The new location value may not be used until the next frame to prevent cursor distortion. In FIG. 11G, a CURSORBLINK register 212 is illustrated, which may be used to control the blink rate for the cursor image. CURSORBLINK register 212 includes reserved bits RSVD and an EN (hardware cursor blinking enable) bit used to enable blinking for CURSORCOLOR1 and CURSORCOLOR2 to CURSORBLINK1 and CURSORBLINK2 registers (206) respectively. This bit may also enable the cursor blink rate counter, according to the following values: 0=hardware cursor blinking not activated, and 1=hardware cursor blinking activated. Register 212 further comprises RATE[7:0] bits. The value of the RATE bits may be used to control the number of video frames that occur before switching between CURSORCOLOR1 or CURSORCOLOR2 and CURSORBLINK1 or CURSORBLINK2 registers (206) respectively. An on/off cursor blink cycle may be controlled by the following equation: Blink Cycle=2×(1/VXTAL2)×HCLKSTOTAL×VLINESTOTAL×(255−BLINKRATE). This pertains to a 50% duty cycle blink rate, however other duty cycle blink rates may be attained by using an appropriate count value and comparison value.

In the above registers 200–212, Start is the beginning word location of the part of the cursor image to be displayed first. The image may be 2 bits per pixel, and may be stored linearly. The amount of storage space may depend on the width and height of the cursor. The two bits correspond to show screen image (transparent), invert screen image, display color1, and display color2. Reset is the beginning word location of the part of the cursor which will be displayed next after reaching the last line of the cursor. These locations may be advantageously employed for dual scan display of cursor information. For example, if the cursor is totally in the upper half or lower half of the screen, the Start and Reset locations may be the same. Otherwise (the cursor crosses the display boundary), the cursor may start being overlaid on the video information at the start address, and when the dual scan height counter generates a carry, may jump to the reset value. The cursor may then continue to be overlaid when the Y location is reached, and may jump to the start address value when the height counter for the upper half generates a carry.

Offsetting these values and changing the width of the cursor to be different from the cursor step value allows the right 48, 32, or 16 pixels of a larger cursor to be displayed. In addition, offsetting the starting X location off of the left edge of the screen may allow pixel placement of the cursor off of the screen edge. The size may be specified as a width adjustable to 16, 32, 48, or 64 pixels, a height in lines up to 64 pixels (e.g., controls the top half of the screen only in dual scan mode), a step size for number of words in a cursor line up to 4, and a height of up to 64 lines on the bottom half of the screen used in dual scan mode. The Y location value may control the starting vertical Y location of the cursor image. The value may be used to compare to the vertical line counter and may be set by software to be between the active start and active stop vertical line values. The cursor hardware 24 may clip the cursor at the bottom of the screen. The new Y location value may not be used until the next frame to prevent cursor distortion.

The X location value controls the starting horizontal X location of the cursor image. The value is used to compare to the horizontal pixel counter (e.g., horizontal and vertical counters 28) and may be set by software to be between the active start and active stop horizontal pixel values. The cursor hardware 24 may clip the cursor at the right edge of the screen. This value may be also used to control the starting location for the cursor image on the upper half of the screen during dual scan mode. The new X location value may not be used until the next frame to prevent cursor distortion. During dual scan display mode, the lower half Y value controls the starting vertical Y location on the lower half of the screen for the cursor image. The value may be used to compare to the vertical line counter and may be set by software to be between the active start and active stop vertical line values. The cursor hardware may clip the cursor at the bottom of the screen. The new location value may not be used until the next frame to prevent cursor distortion. The hardware cursor system 24 further includes a separate blinking function, wherein the rate may be a 50% or alternately other duty cycle programmable number of vertical frame intervals. For example, when a blink frame is active, the mux 20 may switch in 24 bit BLINKCOLOR1 and BLINKCOLOR2 values for CURSORCOLOR1, and CURSORCOLOR2, respectively.

Multiple Color Depth Interface

Figure 12:
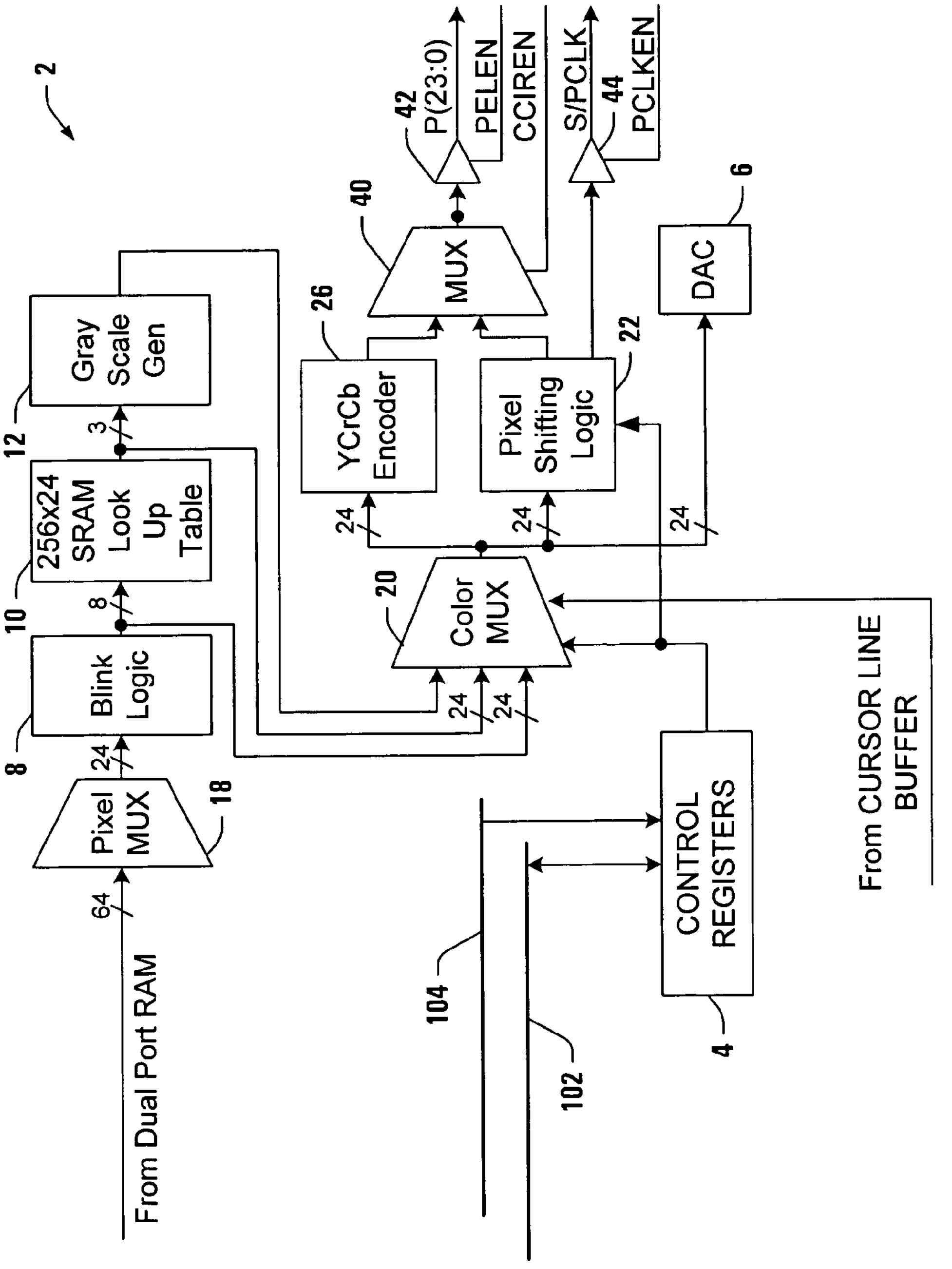
FIG. 12 is a schematic diagram illustrating an exemplary color mux and associated control registers in accordance with another aspect of the invention.

Referring now to FIGS. 1 and 12, the raster engine 2 comprises the dual 256×24-bit SRAM 10 used as a pixel color look up table (LUT). One LUT may be inserted in the video pipeline, while the other may be accessible by the system processor via the AHB bus. Writing a control bit selects which LUT is in the video pipeline and which is accessible via the bus. The dual LUT 10 may be memory mapped with respect to a raster engine base address and accessible from the AHB bus, one LUT at a time. During active video display, an LUT switch command may be synchronized to the beginning of the next vertical frame. The status of actual switch occurrence may be monitored on an LUTCONT.SSTAT bit (not shown) in the registers 4, which may be polled. Alternatively, the frame interrupt may be enabled and used to time the switching. Each table in the dual LUT 10 may be used for 4 bpp and 8 bpp modes and may be beneficial to bypass for 16 bpp and 24 bpp modes since a reduction in the number of simultaneously available colors would result. Control for whether or not the dual LUT 10 is used or bypassed altogether in the video pipeline is performed by configuring a PIXELMODE register color definition value, as illustrated and described in greater detail hereinafter. The PIXELMODE and other registers may thus be programmed by a user or by an application program to select and implement display modes for a variety of disparate display types.

The color RGB mux 20 is adapted to select appropriate pixel data and to provide the selected data to the appropriate video output stream. The mux 20 selects pixel data from the LUT 10, the grayscale generator 12, the hardware cursor logic 24, or directly from the pipeline after the blink logic system 8 according to the selected display mode. Mux 20 formats data for the pixel shift logic 22, a color digital to analog converter (DAC) 6, and/or for the YCRCB interface 26. The formatted video output data may be provided to a display device (not shown) via the output mux 40 together with data and clock buffers 42 and 44, respectively. The selected display mode is programmable to determine the operating mode for the mux 20, the pixel shift logic, system 22, the blink logic system 8, LUT 10, and the grayscale generator 12, as well as for the signature analyzer 30 and hardware cursor system 24, as described above. For example, the mode of operation for the mux 20 may be set by the value of the PIXELMODE register. Accordingly, the mux 20 selects video data from the grayscale generator 12, from the LUT 10, or from the video pipeline after the blink logic 8 according to the selected display mode.

When the hardware cursor 24 is enabled, cursor data values may be injected into the pipeline via the mux 20, or alternatively, the primary incoming video data may be inverted. When in 16-bit 555 or 565 data display modes, the pixel data may be reformatted to fit into a 24-bit bus. This may include copying the MSBs for the data into one or more unused LSBs of the bus to allow full color intensity range. Once selected and formatted, output data is provided by the mux 20 to the pixel shift logic system 22, the YCrCb encoder 26, and/or the DAC 6.

The pixel shifting logic system 22 allows for reduced external data and clock rates by performing multiple pixel transfers in parallel. The output can be programmatically adapted (e.g., via the compare and register logic 4) to transfer a single pixel per clock up to 24 bits wide, a single 24-bit or 16-bit pixel mapped to a single 18 bit pixel output per clock (e.g., triple 6 RGB on 18 active data lines), 2 pixels per clock up to 9 bits wide each (18 pixel data lines active), 4 pixels per clock up to 4 bits wide each (16 pixel data lines active), or 8 pixels per clock up to 2 bits wide each (16 pixel data lines active). The pixel shifting logic system 22 may also be programmed to output 2 and 2/3, 3 bit pixels on the lower 8 bits of the bus per pixel clock or to operate in a dual scan 2 and 2/3 pixel mode putting 2 and 2/3 pixels from the upper and lower halves of the screen on the lower 8 bits of the bus and the next 8 bits of the bus per clock respectively. In dual scan mode, every other pixel in the pipeline may be from the other half of the display. Dual scan mode support may thus be provided for various formats, including 1 upper/1 lower pixel, 2 upper/2 lower pixels, and 4 upper/4 lower pixels corresponding to the 2 pixels per clock, 4 pixels per clock and 8 pixels per clock modes.

Referring also to FIGS. 13A through 13C, the compare and register logic may further comprise a PIXELMODE register 230, a PARLLIFOUT register 232, and a PARLLIFIN register 234. The PIXELMODE register 230 is adapted to indicate a selected display mode for the operation of the raster engine 2, and includes reserved bits RSVD and a DSCAN (dual scan enable) bit for servicing dual scanned displays. When active, data from two locations in memory (top and bottom halves of the screen) may be piped through the video pipeline every other pixel. The output pixel shift logic system 22 accordingly drives the top and bottom half screen data at the same time. This mode may be employed, for example, in association with passive matrix LCD screens that require both halves of the screen to be scanned out at the same time, or alternatively, may be used to drive two separate screens with different data. The values for the DSCAN bit may include: 0=half page mode not activated, and 1=half page mode activated.

The PIXELMODE register 230 further comprises C[3:0]: color mode definition bits having values indicating a selected color mode according to the following table:

| C3 | C2 | C1 | C0 | Color Mode |
|---|---|---|---|---|
| X | 0 | 0 | 0 | Use LUT Data |
| X | 1 | 0 | 0 | Triple 8 bits per channel |
| X | 1 | 0 | 1 | 16-bit 565 color mode |
| X | 1 | 1 | 0 | 16-bit 555 color mode |
| 1 | X | X | X | Grayscale Palette Enabled |

In addition, PIXELMODE register 230 includes M[3:0]: blink mode definition bits, having values which indicate a selected blink mode according to the following table:

| M3 | M2 | M1 | M0 | Blink Mode |
|---|---|---|---|---|
| 0 | 0 | 0 | 0 | Blink Mode Disabled |
| 0 | 0 | 0 | 1 | Pixels ANDed with Blink Mask |
| 0 | 0 | 1 | 0 | Pixels ORed with Blink Mask |

-continued

| M3 | M2 | M1 | M0 | Blink Mode |
|---|---|---|---|---|
| 0 | 0 | 1 | 1 | XORed with Blink Mask |
| 0 | 1 | 0 | 0 | Blink to background register Value |
| 0 | 1 | 0 | 1 | Blink to offset color single value mode |
| 0 | 1 | 1 | 0 | Blink to offset color 888 mode (555,565) |
| 0 | 1 | 1 | 1 | Undefined |
| 1 | 1 | 0 | 0 | Blink dimmer single value mode |
| 1 | 1 | 0 | 1 | Blink brighter single value mode |
| 1 | 1 | 1 | 0 | Blink dimmer 888 mode (555,565) |
| 1 | 1 | 1 | 1 | Blink brighter 888 mode (555,565) |

PIXELMODE register 230 further comprises S[2:0]: output shift mode bits, having values indicating a selected shift mode according to the following table:

| S2 | S1 | S0 | Shift Mode |
|---|---|---|---|
| 0 | 0 | 0 | 1 - pixel per pixel clock (up to 24 bits wide) |
| 0 | 0 | 1 | 1 - 24-bit or 16-bit pixel mapped to 18 bits each pixel clock |
| 0 | 1 | 0 | 2 - pixels per shift clock (up to 9 bits wide each) |
| 0 | 1 | 1 | 4 - pixels per shift clock (up to 4 bits wide each) |
| 1 | 0 | 0 | 8 - pixels per shift clock (up to 2 bits wide each) |
| 1 | 0 | 1 | 2 ⅔ 3-bit pixels per clock over 8 bit bus |
| 1 | 1 | 0 | Dual Scan 2 ⅔ 3-bit pixels per clock over 8 bit bus |
| 1 | 1 | 1 | Undefined - Defaults to 1 - pixel per pixel clock |

The PIXELMODE register 230 also comprises pixel mode bits P[2:0]: having values indicating a selected number of bits per pixel scanned out by the raster engine 2, according to the following table:

| P2 | P1 | P0 | Pixel Mode |
|---|---|---|---|
| 0 | 0 | 0 | pixel multiplexer disabled |
| 0 | 0 | 1 | 4 bit per pixel |
| 0 | 1 | 0 | 8 bits per pixel |
| 0 | 1 | 1 | do not use |
| 1 | 0 | 0 | 16 bits per pixel |
| 1 | 0 | 1 | do not use |
| 1 | 1 | 0 | 24 bits per pixel |
| 1 | 1 | 1 | 32 bits per pixel |

Referring also to FIG. 13B, the compare and register logic 4 of the raster engine 2 further comprises a PARLLIFOUT register 232 (e.g., parallel interface output control register) having a RD bit for controlling reads of the register 232. When writing to register 232, a '0' in this bit location will initiate a parallel interface write cycle and a '1' in this bit location initiates a parallel interface read cycle. In addition, register 232 includes DAT[7:0] bits, adapted to indicate the data output on the parallel interface during a write cycle. The DAT[7:0] bits may be driven onto C/VSYNCn, HSYNCn, BLANKn, P[17]/AC, and P[3:0] lines respectively.

In FIG. 13C, a PARLLIFIN register 234 (parallel interface control register) is illustrated, having reserved bits RSVD and ESTRT[3:0] (E enable signal start value) bits, which indicate the value of the parallel interface counter where the E enable signal becomes active (high). The data buffer enable also becomes active at the same time as the E enable signal during a write cycle. The E enable signal becomes inactive just before the counter changes to 0, while the data is driven throughout the 0 count. This allows data to be driven active for one additional clock cycle to provide hold time to the display when writing. Register 234 further includes CNT[3:0] counter preload value bits adapted to indicate a value loaded into a parallel interface down counter. When a write or read command is issued by writing to register 234, the counter begins to count down from this value.

Additional IO lines (not shown) may be used to provide a read vs. write status indication, a data vs. instruction indication, and any address or chip select control signals. Raster engine 2 may thus provide a direct display command interface for interfacing a host processor (e.g., CPU 62) of FIG. 2A with a low cost display, such as an LCD, having a command interface. The difference between the CNT[3:0] value and the ESTRT[3:0] value operates to ensure setup timing for write data and IO signals to an integrated display module before the rising edge of the E enable signal. In addition, the register 234 comprises DAT[7:0] bits, which indicate the data input on the parallel interface during a read cycle. The DAT[7:0] bits may be loaded into the LSB of this register from C/VSYNCn, HSYNCn, BLANKn, P[17]/AC, and P[3:0] lines, respectively, on the falling edge of the E interface enable control signal. The direct display command interface may be employed, for example, in interfacing a display module having a built-in processor which receives command words from the raster engine 2, rather than rasterized data. This feature enables a high speed host processor (e.g., CPU 62 of FIG. 2A) to provide display commands to such a low-end display module (which typically operates at a much lower speed than does the host processor) via the raster engine, which provides appropriate timing and enable signaling to interface with the display module. Thus, the provision in the raster engine 2 of direct display command operating modes allows a processor to easily and efficiently provide commands to such a display module.

Referring also to FIGS. 14A and 14B, a table 236 indicates various exemplary output transfer modes which are programmable in the raster engine 2 via the PIXELMODE register 230. As can be seen in the table 236, the selection of a shift mode (e.g., via the S[2:0]: output shift mode bits) and the color mode (e.g., via the C[3:0]: color mode definition bits) provides programmable support for a plurality of different display types having various video data output display modes. For example, the selected shift mode and color mode may be used to support various display modes, including: single pixel per clock up to 24 bits wide; single 16 bit 565 pixel per clock; single 16 bit 555 pixel per clock; single 24 bit pixel on 18 lines; single 16 bit 565 pixel on 18 lines; single 16 bit 555 pixel on 18 lines; 2 pixels per clock; 4 pixels per clock; 8 pixels per shift clock; 2 2/3 pixels per clock; and dual 2 2/3 pixels per clock. Thus, the raster engine 2 provides the capability of outputting a plurality of pixels in a single shift clock.

The raster engine 2 may thus programmatically translate selected pixel data from a first format to a second format according to the selected display mode. As further indicated in the table 236, the raster engine may selectively translate video data between formats having disparate numbers of bits. For example, where the first format comprises more bits than does the second format, the raster engine 2 may selectively interpolate between a portion of the selected pixel data in the first format and generate a portion of the data in the second format (e.g., via the pixel shift logic 22). This may be accomplished, for example, via performing a logical OR combination of at least two bits of the selected pixel data in the first format to generate a bit in the second format. This selective interpolation accomplishes a rounding which provides for maximum utilization of available colors, thus significantly improving color usage compared with simple truncation of unused bits.

As can be seen in table 236 of FIGS. 14A and 14B, the raster engine provides a programmable interface to a plurality of disparate display device types. In this regard, the raster engine employs a universal routing scheme (e.g., as illustrated in the table 236) whereby a variety of such disparate display types may be interfaced with a host computer (e.g., CPU 62 of FIG. 2A). While prior raster engines required rerouting of output signals outside of the raster engine, no such rerouting is required in order to employ the raster engine 2. In addition, the raster engine 2 may be employed to interface with display devices using only four data bits, while still providing support for multiple video interface formats. In this regard, a control bit (not shown) is provided in the raster engine 2 which may be programmable via the PIXELMODE register 230 in order to invoke this operation as indicated in the table 236 (e.g., P(13), P(9), P(5), and P(1)).

Programmable Hardware Blinking

Figure 15:
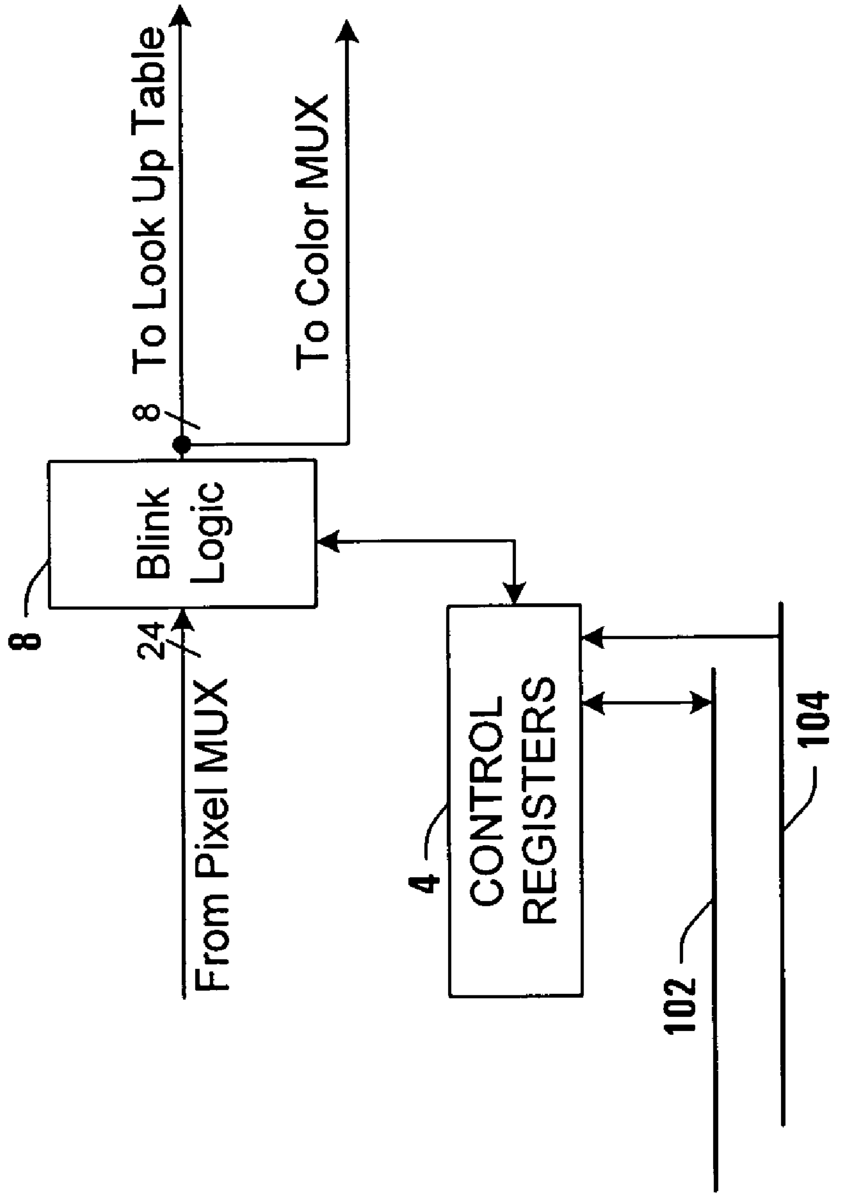
FIG. 15 is a schematic diagram illustrating an exemplary hardware blinking apparatus in accordance with another aspect of the invention.

Referring now to FIGS. 1 and 15, the raster engine 2 further comprises the pixel blink logic system 8 adapted to blink pixels based on a selected blink mode. The pixel blink logic system 8 may be operatively associated with one or more control registers in the compare and register logic 4 or elsewhere in the raster engine 2. Referring also to FIGS. 16A through 16E, the number of video frames for a blink cycle may be controlled by a value in a BLINKRATE register 250, as described in greater detail hereinafter. The system 8 is further adapted to determine which pixels are designated as blinking pixels. Pixel blinking may be programmatically accomplished in several different ways, some of which may employ the look up table 10. This is done via the blink logic system 8 logically transforming the address into the look up table 10 based on whether the pixel is a blink pixel, and whether it is currently in the blink state, as well as a selected display mode. For example, a red blinking pixel may be set up to normally address location 0x11 in the look up table. When not in the blink state, the color output from this location would be red. In the blink state, the address could be logically modified to 0x21 via the blink logic system 8 according to the values in one or more control registers 4. The color stored at the 0x21 location could be green or black or whatever other color that it is desired for red in the blink state. For every pixel color, there may be a blinking version.

For LUT blinking, the address may be modified by using a masked AND/OR/XOR function according to a selected blink mode. A mask may be defined in a BLINKMASK register, as described in greater detail hereinafter with respect to FIG. 16B. Selection of whether the pixel data is ANDed, ORed, or XORed with the mask is set by the PIXELMODE register 230 of FIG. 13A. In another mode of blink operation, the blink function may be performed by logical or mathematical operations on the pixel data via the system 8. Such logical and/or mathematical operations may be programmed, for example, to implement blink to background, blink dimmer, blink brighter, or blink to offset blink modes by setting an appropriate PIXELMODE register value.

For example, when blink to background mode is enabled, the blink logic system 8 may selectively replace a blinking pixel with the value in a BG_OFFSET register, as illustrated and described in greater detail hereinafter with respect to FIG. 16E. Setting this register to the background screen color in this mode may cause an object to appear and disappear. Blink brighter and blink dimmer modes may also be achieved, wherein pixel data values may be shifted by one or more bit locations. For example, to blink brighter, the LSB may be dropped, the MSBs may be all shifted one bit lower, and the MSB may be set to a ‘1’. For blink dimmer, the LSB may be dropped, the MSBs may be all shifted one bit lower, and the MSB may be set to a ‘0’. Blink to offset may be accomplished by adding the value in the BG_OFFSET register to blinking pixels. The shifting and offsetting can be programmed to be compatible with the selected pixel organization mode. Many different blinking modes are possible within the scope of the invention, whereby programmable hardware blinking of one or more pixels in a display may be accomplished.

A blinking pixel may be defined by a BLINKPATRN register and a PATTRNMASK register, as illustrated and described in greater detail hereinafter with respect to FIGS. 16C and 16D. By using the PATTRNMASK register, either multiple or single bit planes may be used to specify blinking pixels. This allows the number of definable blinking pixels to range from all pixel combinations blinking to only one pixel that blinks. In addition, this feature allows the option of minimizing the number of lost colors by reducing the number of blinking colors, thus providing significant flexibility and advantages over conventional palette blinking techniques. The BLINKPATRN register may then be used to define the value of the PATTRNMASKed bits that should blink.

Referring now to FIGS. 16A through 16E, several control registers are illustrated and described hereinafter, which are operatively associated with the blink logic system 8 of the raster engine 2. A BLINKRATE register 250, BLINKMASK register 252, BLINKPATRN register 254, PATTERNMASK register 256, and a BG_OFFSET register 258 may be employed in association with the system 8 in order to achieve the selective pixel blinking in accordance with the invention. The registers 250–258, moreover, may be included in the compare and register logic 4 of raster engine 2, or alternatively may be located elsewhere in the raster engine 2.

Figure 16A:
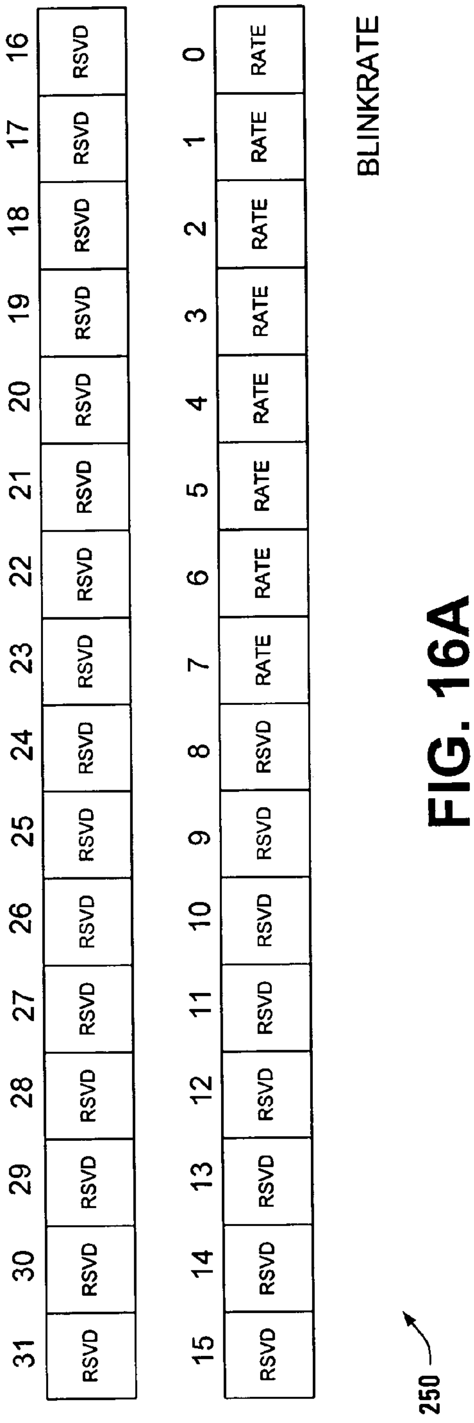

The number of video frames for a blink cycle may be controlled by a value in the BLINKRATE register 250 of FIG. 16A, which may comprise reserved bits RSVD, as well as RATE[7:0] bits. The value of the BLINKRATE register is programmable via the RATE bits to control the number of video frames that occur before the LUT addresses assigned to blink switch between masked and unmasked. Thus, an on/off blink cycle may be controlled according to the following equation: Blink Cycle=2×(1/VXTAL2)×HCLKSTOTAL×VLINESTOTAL×(255−BLINKRATE), wherein the HCLKSTOTAL and VLINESTOTAL represent the value of counters (not shown) in the raster engine 2. This pertains to a 50% duty cycle blink rate, however other duty cycle blink rates may be attained by using a count value and a comparison value.

Figure 16B:
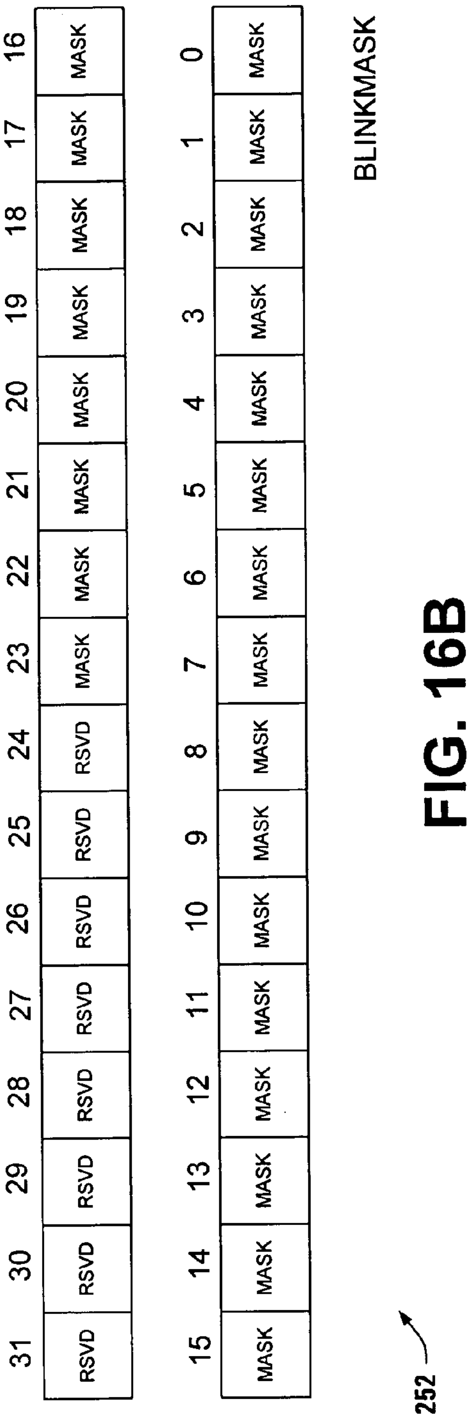

The BLINKMASK register 252 illustrated in FIG. 16B may comprise reserved bits RSVD, along with mask bits MASK[23:0]. The value of the BLINKMASK register 252 may be ANDed, ORed, or XORed with a pixel data address into the look up table 10 defined as a blink pixel during a blink cycle. The programmable mask allows a blinking pixel to jump from the normal color definition location to a blink color location in the look up table 10 according to whether the pixel is in the blinking state or the non-blinking state. A logical AND operation may accordingly modify the LUT address by clearing bits, whereas an OR operation modifies the LUT address by setting bits, and an exclusive OR operation (XOR) modifies the LUT address by inverting bits.

Figure 16C:
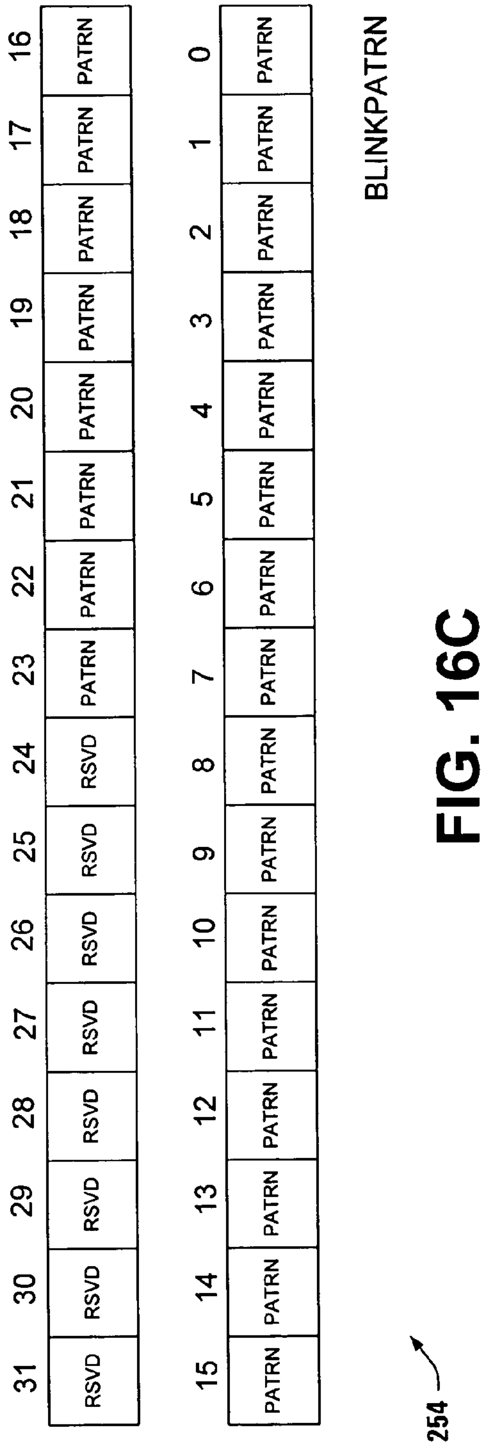
Figure 16D:

Referring also to FIG. 16C, the BLINKPATRN register 254 defines a blink pattern for use by the blink logic system 8, which comprises reserved bits RSVD as well as pattern bits PATRN[23:0]. After being masked with the value of the PATTRNMASK register 256 described hereinafter, the PATRN value may be compared with pixel data bits (e.g., bits 23–0) in order to determine when pipeline pixels are defined as blink pixels. Thus, the blink logic system 8 may be adapted to determine whether a pixel is a blinking pixel or not. In FIG. 16D, the PATTERNMASK register 256 is illustrated, having reserved bits RSVD and pattern mask bits PMASK[23:0]. These bits PMASK[23:0] may be used to determine which PATTRN[23:0] bits of the BLINKPATRN register 254 are to be used to define pixels as blinking pixels. For example, the PMASK bits may have the following values: 0=bit used for comparison, and 1=bit not used for comparison.

Referring also to FIG. 16E, the BG_OFFSET register 258 is illustrated having reserved bits RSVD along with bits BGOFF[23:0] which may be used to set a blink background color or a blink offset value. The function of the BG_OFFSET register 258 may change based on the selected blink mode. For example, when the M[3:0] bits of the PIXELMODE register (e.g., register 230 of FIG. 13A) are set to select a blink to background blink mode, the BG_OFFSET register 258 may be used by the blink logic system 8 to define a 24 bit color for the background. Alternatively, when the M[3:0] bits of the PIXELMODE register 230 are set to a blink to offset blink mode, the BG_OFFSET register 258 may be used by the blink logic system 8 to define a mathematical offset value for the blink color. In this regard, the format for the mathematical offset may be based on the selected display mode (e.g., 888, 565, 555).

Grayscale Generator

Figure 17:
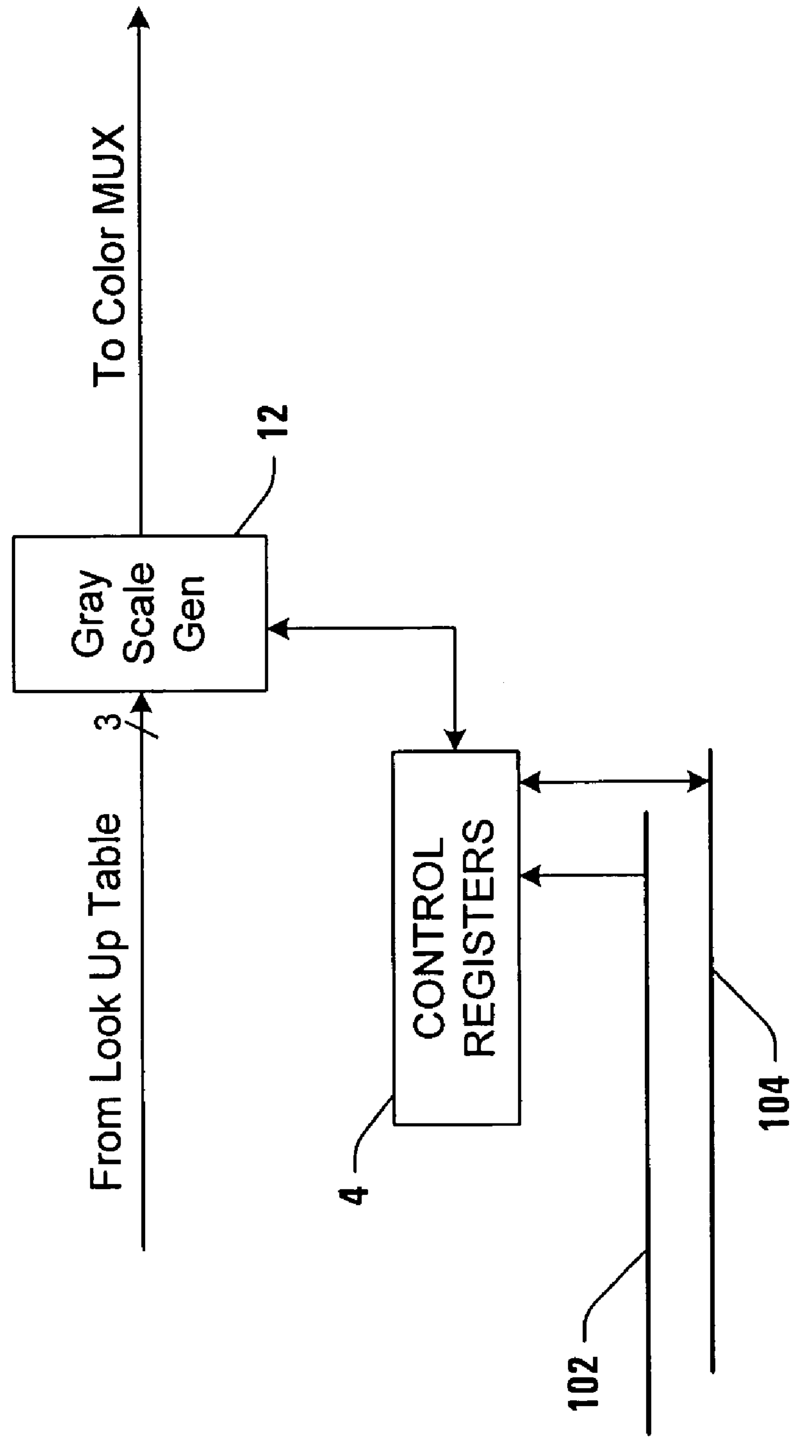
FIG. 17 is a schematic diagram illustrating an exemplary grayscale generator in accordance with another aspect of the invention.
Figure 18:
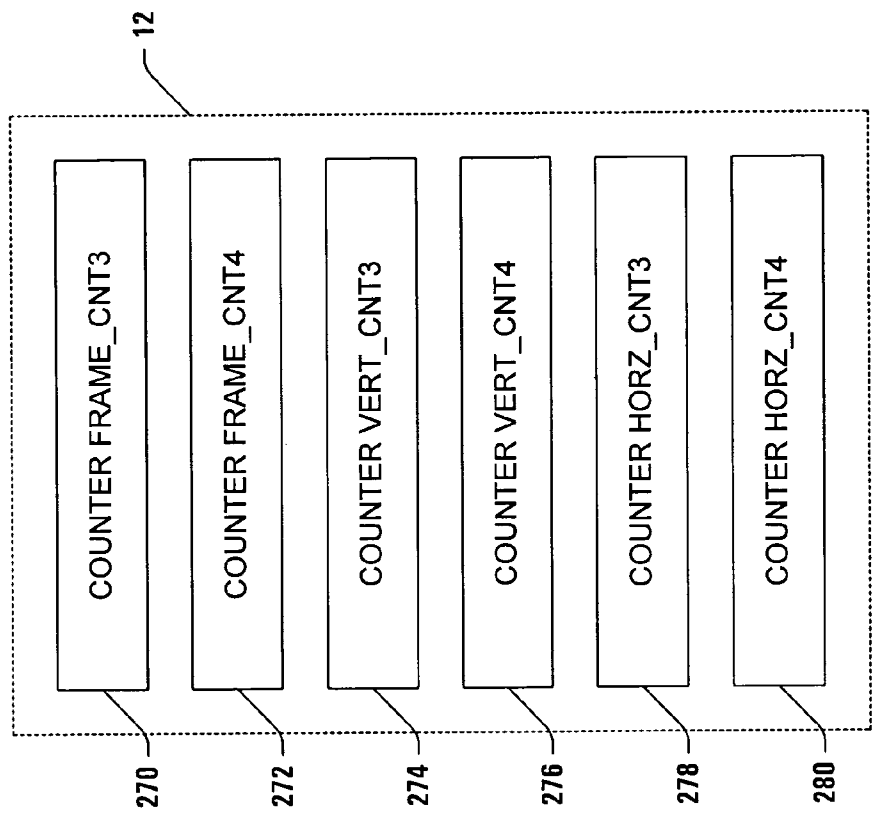
FIG. 18 is a schematic diagram illustrating several exemplary counters associated with the grayscale generator of FIG. 17.

As illustrated in FIGS. 1, 17, and 18, the raster engine 2 further provides a programmable grayscale generator 12 adapted to provide grayscales for monochrome displays via one or more control registers, which may but need not be included within the compare and register logic 4. The grayscale generator 12 may be inserted in the video pipeline by the mux 20 according to a selected display mode. The grayscale generator 12 translates a 3 bit input to a single monochrome bit dithered output, thereby providing 8 shades of gray including black and white. The grayscale generator 12 may further comprise six 2-bit counters; FRAME_CNT3 270, FRAME_CNT4 272, VERT_CNT3 274, VERT_CNT4 276, HORZ_CNT3 278, and HORZ_CNT4 280 as illustrated in FIG. 18 and described in greater detail hereinafter.

A look up table or matrix in the grayscale generator 12 (or elsewhere in the raster engine 2, e.g., in compare and register logic 4) may be programmed with values that define the on/off dithering operation for a pixel value based on value of one or more of the counters 270–280, as illustrated and described in greater detail hereinafter with respect to FIGS. 20–30. A matrix size or dimension may be defined for each pixel value (e.g., 0 through 7 for 3 bits). The matrix size may be from 3 horizontal rows×3 vertical columns×3 frames (e.g., 3H×3V×3F) to 4H×4V×4F, or any combination of 3 or 4. It will be appreciated that wile the exemplary grayscale generator 12 provides for matrices varying from 3H×3V×3F to 4H×4V×4F, that the many different matrix sizes are possible, and are contemplated as being within the scope of the invention. The grayscale look up table is then filled in for each pixel with this matrix information. The grayscale generator 12 uses the programmed matrix to perform grayscaling according to the selected display mode, which is particularly advantageous when employed in association with low cost or monochrome displays.

Figure 19:
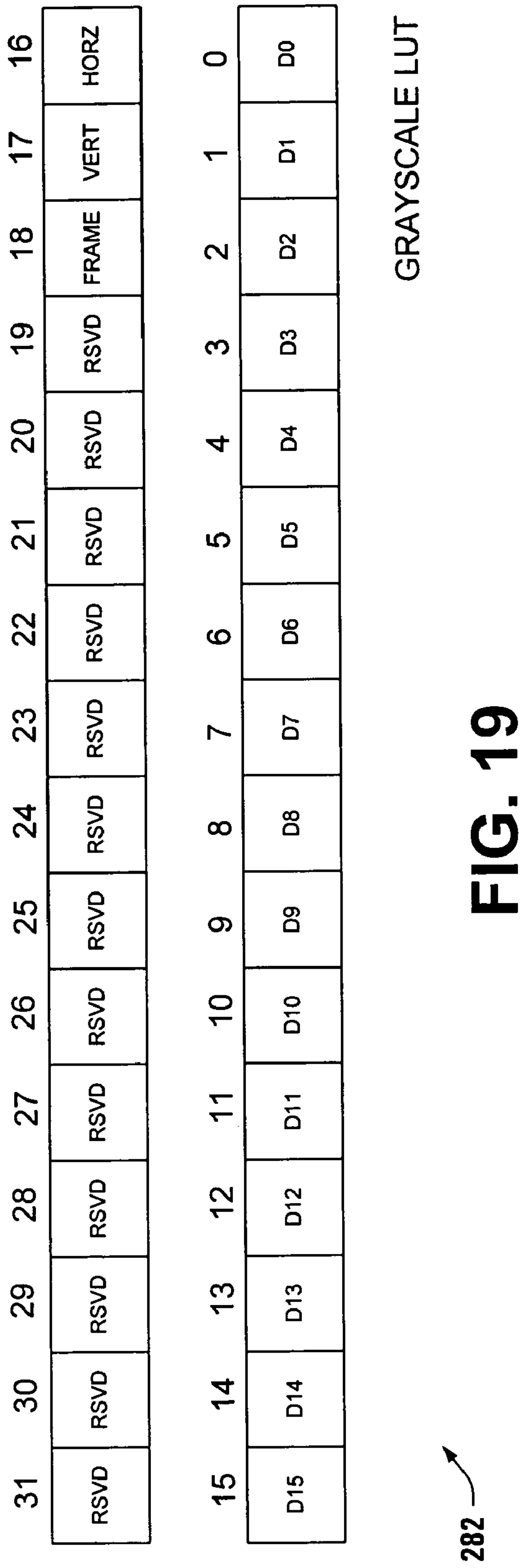
FIG. 19 is a schematic diagram illustrating an exemplary control register associated with the grayscale generator of FIGS. 17 and 18.

Referring also to FIG. 19, a GRAYSCALE LUT register 282 may be provided in the raster engine and operatively associated with the grayscale generator 12. It will be noted that the register 282 may be included in the compare and register logic 4, or may be located elsewhere in the raster engine 2. GRAYSCALE LUT register 282 may be used to fill the matrix, and comprises reserved bits RSVD, as well as a FRAME bit, defining a frame counter selection for the current 3 bit pixel value wherein 0=use FRAME_CNT3 and 1=use FRAME_CNT4. In addition, the register 282 comprises a VERT bit defining a vertical counter selection for the current 3 bit pixel value wherein 0=use VERT_CNT3 and 1=use VERT_CNT4, as well as a HORZ bit. A horizontal counter selection may be defined for the current 3 bit pixel value using the HORZ bit, wherein 0=use HORZ_CNT3 and 1=use HORZ_CNT4. In this manner, the matrix size may be programmed using the FRAME, VERT, and HORZ bits via the register 282.

The GRAYSCALE LUT register 282 further includes matrix position enable bits D[15:0]. These bits D[15:00] may be used to control/dither a monochrome data output according the to horizontal position, the vertical position, the frame, and the 3 bit incoming pixel definition. The grayscale matrix is thus fully programmable by a user or an application program to provide selective grayscaling according to a selected display mode for the raster engine 2. This allows the raster engine 2 to obtain pixel data from a frame buffer (e.g., frame buffer 68 of FIG. 2A) and to generate grayscale formatted video data according to the selected display mode.

Referring now to FIG. 20, an exemplary grayscale matrix 300 is illustrated having a dimension 4H×4V×4F. The bit positions in the matrix 300 are illustrated corresponding to the GRAYSCALE LUT register 282 of FIG. 19. As an example of programming the grayscale matrix, FIG. 21 illustrates another exemplary grayscale matrix 302, wherein the grayscale matrix 300 is programmed for full on and full off operation. For example, where a pixel input value of zero (e.g., 000 binary for three bit) is off, setting register addresses 0x80, 0xA0, 0xC0, and 0xE0 to all 0 ensures that a 0 pixel never turns on. Assuming that a pixel value of seven (e.g., 111 binary) is full on, setting addresses 0x9C, 0xBC, 0xDC, and 0×FC to all 1, ensures that the value is always on. The values between full on and full off may be programmed according to any criteria, including the characteristics of a particular display type, for example, contrast, persistence, turn on time, turn off time, on/off duty cycle, and refresh rate.

Figure 22:
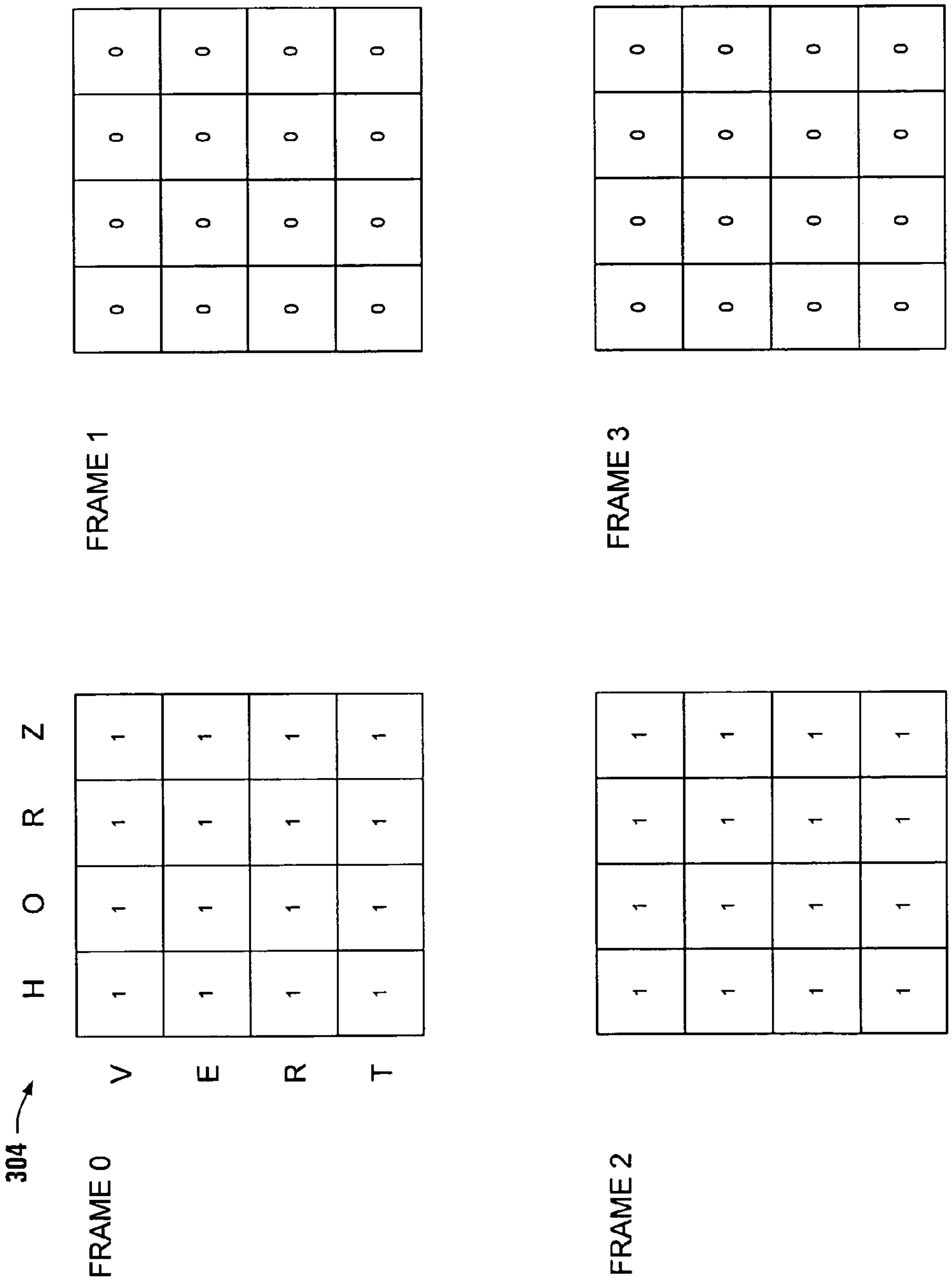
FIG. 22 is a schematic diagram illustrating an exemplary 4×4×4 grayscale pattern in accordance with the invention.

To achieve different shades of gray, more values may be provided below half the luminance average, due to the higher sensitivity to luminance variations by the human eye at lower levels. Other considerations in programming the grayscale matrix include temporal distortion (e.g., flickering), spatial distortion (e.g., walking patterns), and spatial interference patterns. Referring now to FIG. 22, a fifty percent duty cycle 4H×4V×4F matrix 304 is graphically illustrated. This particular matrix definition in FIG. 22 may be subject to temporal distortion or flickering due to each pixel being turned on and turned off together.

Figure 23:
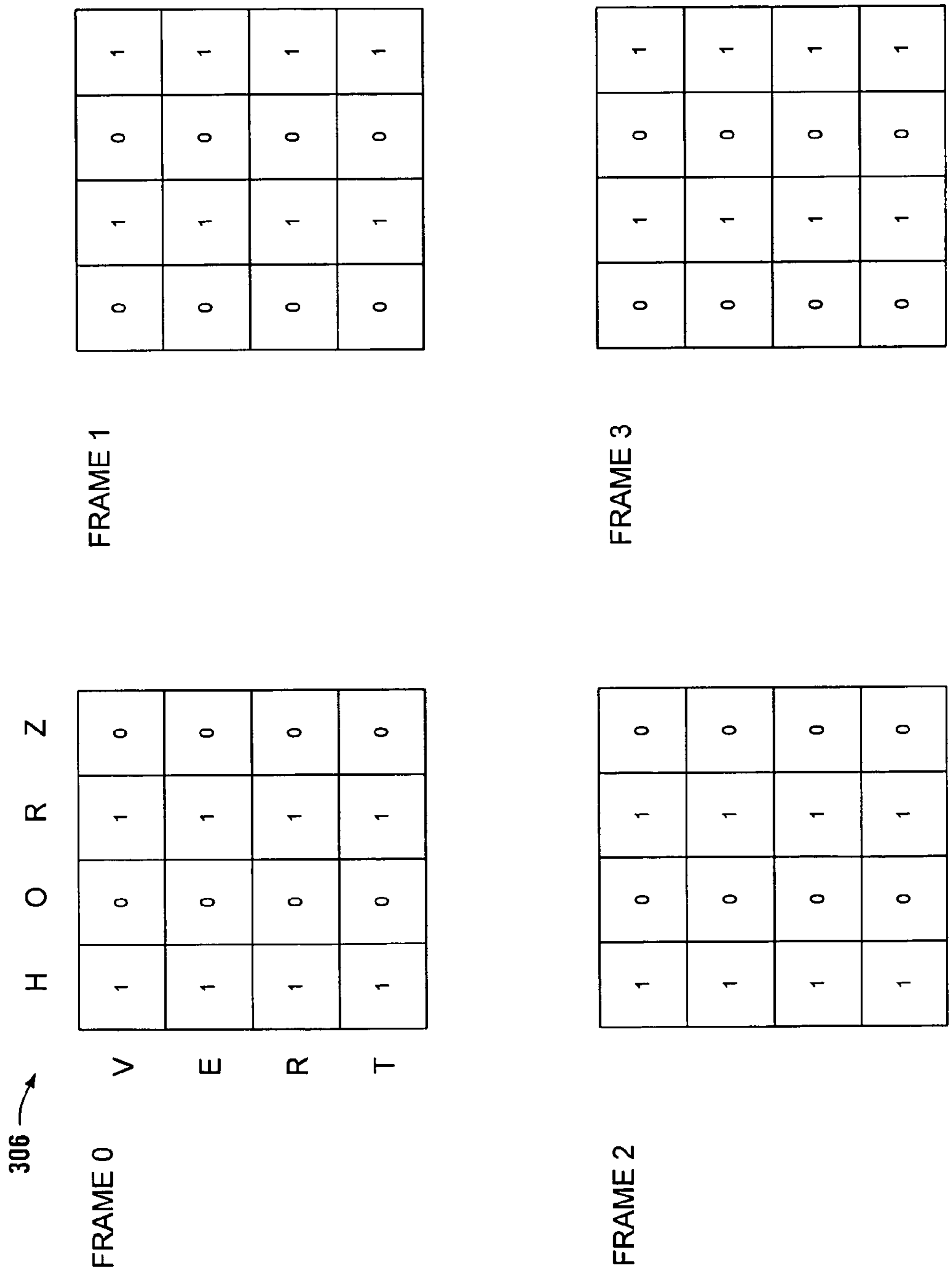
FIG. 23 is a schematic diagram illustrating another exemplary 4×4×4 grayscale pattern in accordance with the invention.
Figure 24:
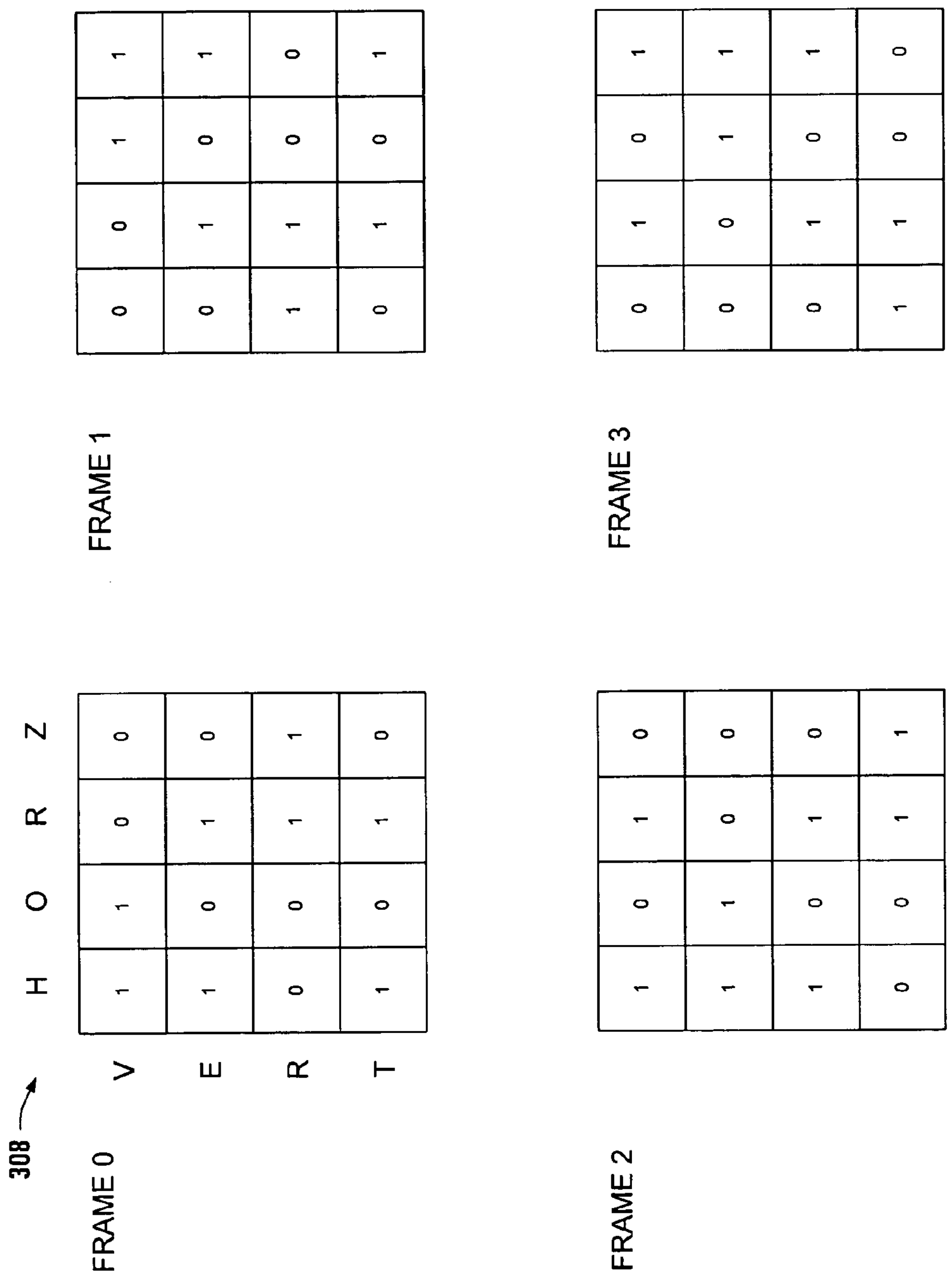
FIG. 24 is a schematic diagram illustrating another exemplary 4×4×4 grayscale pattern in accordance with the invention.

Referring now to FIG. 23, another exemplary fifty percent duty cycle 4H×4V×4F matrix 306 is illustrated. In order to avoid flickering, every other pixel may be turned on, such that the human eye integrates the on and off pixels between two consecutive frames. The matrix definition of FIG. 23, however, may suffer from spatial interference, particularly wherein image displayed in this grayscale requires that every other column be activated (e.g., a checkerboard pattern). Referring also to FIGS. 24 and 25, this type of spatial interference may be minimized by mixing up the pattern sequence as illustrated in the 4H×4V×4F matrix 308. This pattern mixes two sets of adjacent pixels with sets of every other pixel. The matrix 308 may suffer from a walking pattern type of distortion, depending on the display type. Assuming that a three bit pattern representing the fifty percent duty cycle grayscale of FIG. 24 is 011 binary, the matrix 310 of FIG. 25 illustrates the programming of the grayscale matrix of the grayscale generator 12 for the pattern of FIG. 24.

Figure 26:
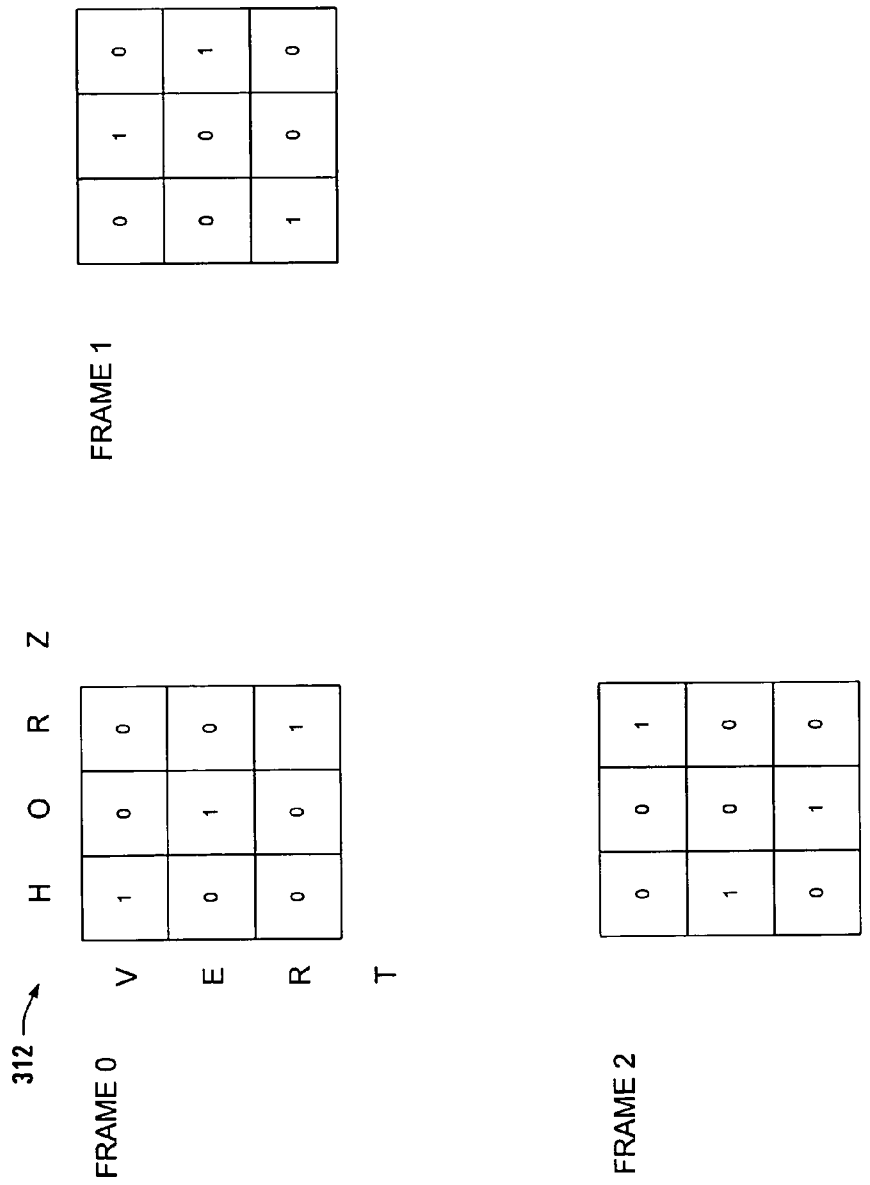
FIG. 26 is a schematic diagram illustrating an exemplary 3×3×3 grayscale pattern in accordance with the invention.

Referring now to FIG. 26, another exemplary grayscale matrix 312 is illustrated with a 3H×3V×3F dimension. According to this exemplary grayscale dithering pattern, each cell in the matrix 312 is active for only one frame in any three frame sequence, thus achieving a thirty three percent duty cycle for each pixel. This 3H×3V×3F matrix 312 may also suffer from spatial distortion, since as the frame number progresses, the bit pattern in each row moves one pixel to the right. For example, diagonal lines in a displayed image using the grayscale matrix 312 may accordingly appear as though they are moving or walking to the right.

Figure 27:
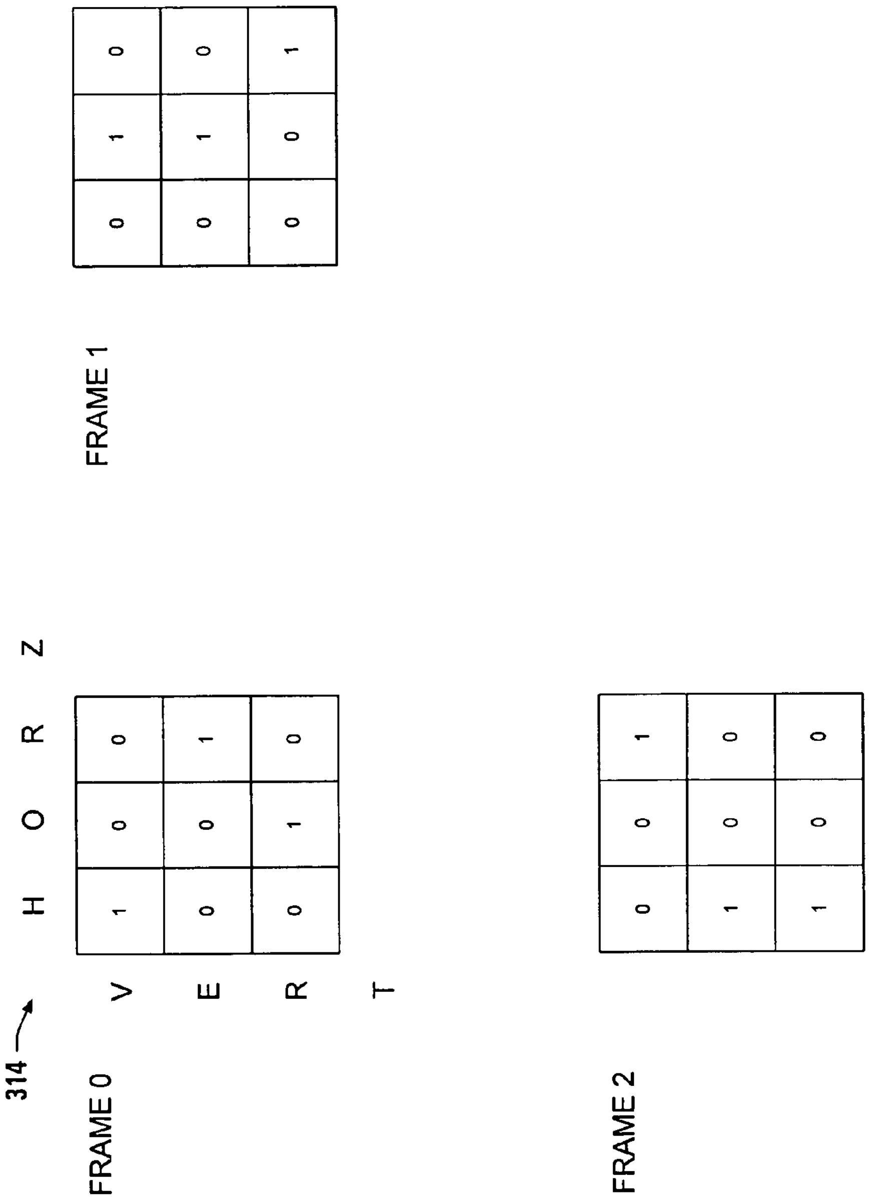
FIG. 27 is a schematic diagram illustrating another exemplary 3×3×3 grayscale pattern in accordance with the invention.
Figure 29:
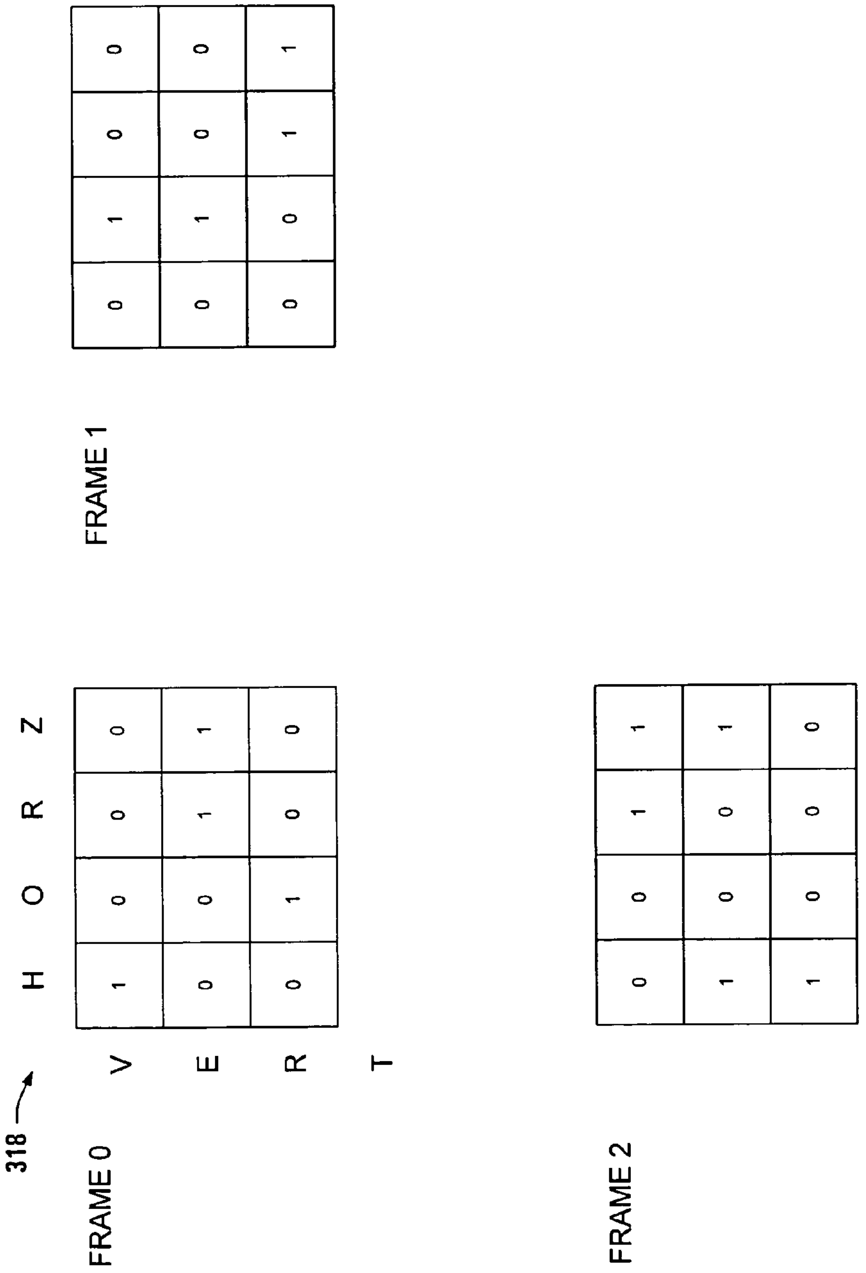
FIG. 29 is a schematic diagram illustrating an exemplary 4×3×3 grayscale pattern in accordance with the invention.

Turning now to FIG. 27, another exemplary 3H×3V×3F matrix 314 is illustrated which reduces the walking distortion potential of the matrix 312, via a slightly different dithering pattern. Assuming the 3 bit input pattern that represents the thirty three percent duty cycle grayscale of matrix 314 is 010 binary, the matrix may be programmed as illustrated in the register matrix 316 of FIG. 28. With the look up table or matrix 316 thus programmed into the control registers, the grayscale generator 12 may accordingly provide grayscaling in accordance therewith. Referring now to FIGS. 29 and 30, non-symmetrical matrix sizes are further possible in accordance with the invention. An exemplary 4H×3V×3F matrix 318 is illustrated graphically in FIG. 29. Referring also to FIG. 30, and assuming that the three bit input pattern that represents a thirty three percent duty cycle grayscale is 010 binary, the programmed register matrix 320 further illustrates the programming of the grayscale matrix.

Referring now to FIG. 31, the raster engine 2 may be employed in a variety of systems having disparate display types and data formatting requirements. For example, the table 350 illustrates several of the possible applications of the raster engine 2 with various display types. While the invention has been described herein in association with certain display types, it will be recognized that the invention is useful for other applications involving other display types not specifically illustrated and described herein. In addition the invention may be implemented as part of a system having other components and features.

Figure 32:
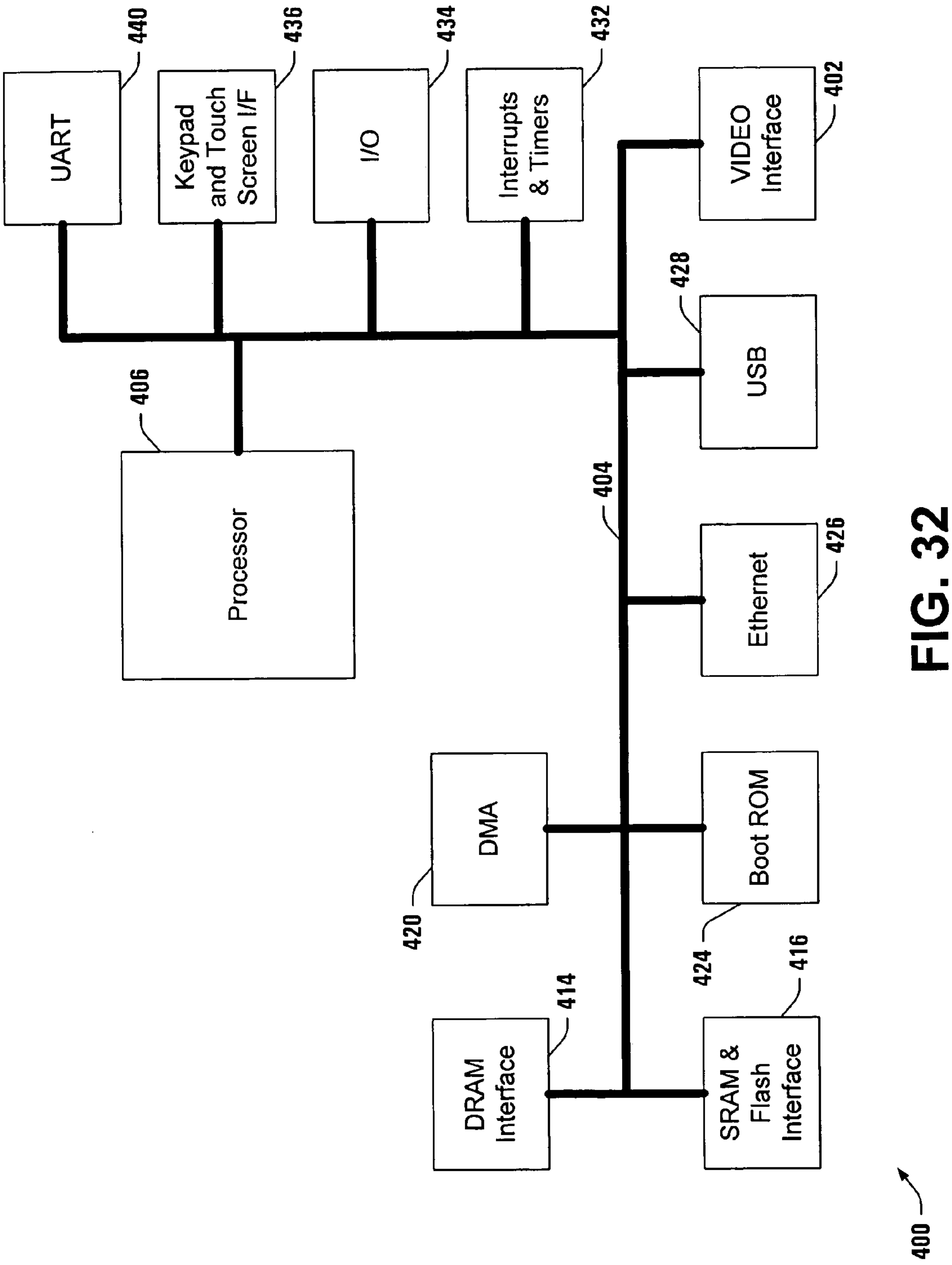
FIG. 32 is an illustration of a system in which various aspects of the invention may be carried out.

Referring now to FIG. 32, a system 400 is illustrated in which various aspects of the present invention may be carried out. As illustrated and described above, the raster engine 2 may be employed in various computer systems (e.g., system 60 of FIG. 2A). In addition, the raster engine 2 may be employed in other applications within the scope of the invention. For example, the raster engine 2 may be included within the system 400 of FIG. 32 as part of a video interface 402, wherein the system 400 may comprise a multi-function integrated circuit or chip having multiple components in addition to the video interface 402. The video interface 402 may be operatively connected to a bus 404 providing communications between various system components, as described hereinafter, including a processor 406.

The processor 406 may communicate via the bus 404 with various memory and peripheral components within the system 400. Included among these are a DRAM (dynamic random access memory) interface 414, an SRAM (static random access memory) and flash memory interface 416, a DMA (direct memory access) system 420, and a boot ROM (read only memory) 424. System 400 may further provide Ethernet access via an Ethernet device 426. A USB (universal serial bus) 428 is also connected to the bus 404, along with interrupts and timers 432, I/O circuitry 434, a keypad and touch screen interface 436, and a UART (universal asynchronous receiver transmitter) 440. In this regard, it will be appreciated that the exemplary raster engine 2 and video controller of the invention may be employed in a variety of systems and applications, including those not specifically illustrated and described herein.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A raster engine for interfacing a frame buffer in a computer system to one of a plurality of disparate displays, comprising:

at least one control register programmable via the computer system to select a display mode;

a dual port RAM device operative to obtain pixel data from the frame buffer; and a logic device having a parallel output, the logic device being adapted to select appropriate pixel data from the dual port RAM device according to the selected display mode, and to remap the selected pixel data according to the selected display mode;

the raster engine provides the remapped selected pixel data at the parallel output via the logic device according to a universal routing scheme applicable to the plurality of disparate displays.

2. The raster engine of claim 1, wherein the selected display mode comprises one of single pixel per clock up to 24 bits wide, single 16 bit 565 pixel per clock single 16 bit 555 pixel per clock, single 24 bit pixel on 18 lines, single 16 bit 565 pixel on 18 lines, single 16 bit 555 pixel on 18 lines, 2 pixels per clock, 4 pixels per clock, 8 pixels per shift clock, 2 2/3 pixels per clock, and dual 2 2/3 pixels per clock.

3. The raster engine of claim 2, further comprising one of a look up table, a grayscale generator, and a blink logic system, wherein the logic device receives the selected pixel data from the dual port RAM device via the one of the look up table, the grayscale generator, and the blink logic system according to the selected display mode.

4. The raster engine of claim 3, wherein the logic device comprises a multiplexer.

5. The raster engine of claim 1, wherein the logic device is adapted to provide the selected pixel data to the output device in a 24 bit parallel format when the selected display mode is one of single 16 bit 565 pixel per clock and single 16 bit 555 pixel per clock.

6. The raster engine of claim 5, wherein the logic device is further adapted to copy a plurality of most significant bits from the selected pixel data into a corresponding plurality of unused least significant bits in the 24 bit parallel format, whereby improved color intensity range is provided.

7. The raster engine of claim 6, further comprising one of a look up table, a grayscale generator, and a blink logic system, wherein the logic device receives the selected pixel data from the dual port RAM device via the one of the look up table, the grayscale generator, and the blink logic system.

8. The raster engine of claim 7, wherein the logic device comprises a multiplexer.

9. The raster engine of claim 1, further comprising one of a look up table, a grayscale generator, and a blink logic system, wherein the logic device receives the selected pixel data from the dual port RAM device via the one of the look up table, the grayscale generator, and the blink logic system.

10. The raster engine of claim 1, wherein the selected display mode comprises a color mode, a shift mode, and a pixel mode.

11. The raster engine of claim 10, wherein the color mode comprises one of a look up table mode, triple 8 bits per channel, 16 bit 565 color mode, 16 bit 555 color mode, and a grayscale palette enabled mode.

12. The raster engine of claim 11, wherein the shift mode comprises one of single pixel per pixel clock up to 24 bits wide, single 24 bit or 16 bit pixel mapped to 18 bits per pixel clock, 2 pixels per shift clock up to 9 bits wide, 4 pixels per shift clock up to 4 bits wide, 8 pixels per shift clock up to 2 bits wide, 2 2/3 pixels per clock over 8 bit bus 3 bits wide, and dual 2 2/3 pixels per clock over dual 8 bit busses 3 bits wide.

13. The raster engine of claim 12, wherein the pixel mode comprises one of 4 bits per pixel, 8 bits per pixel, 16 bits per pixel, 24 bits per pixel, and 32 bits per pixel.

14. The raster engine of claim 11, wherein the pixel mode comprises one of 4 bits per pixel, 8 bits per pixel, 16 bits per pixel, 24 bits per pixel, and 32 bits per pixel.

15. The raster engine of claim 10, wherein the pixel mode comprises one of 4 bits per pixel, 8 bits per pixel, 16 bits per pixel, 24 bits per pixel, and 32 bits per pixel.

16. The raster engine of claim 15, wherein the shift mode comprises one of single pixel per pixel clock up to 24 bits wide, single 24 bit or 16 bit pixel mapped to 18 bits per pixel clock, 2 pixels per shift clock up to 9 bits wide, 4 pixels per shift clock up to 4 bits wide, 8 pixels per shift clock up to 2 bits wide, 2 2/3 pixels per clock over 8 bit bus 3 bits wide, and dual 2 2/3 pixels per clock over dual 8 bit busses 3 bits wide.

17. The raster engine of claim 10, wherein the shift mode comprises one of single pixel per pixel clock up to 24 bits wide, single 24 bit or 16 bit pixel mapped to 18 bits per pixel clock, 2 pixels per shift clock up to 9 bits wide, 4 pixels per shift clock up to 4 bits wide, 8 pixels per shift clock up to 2 bits wide, 2 2/3 pixels per clock over 8 bit bus 3 bits wide, and dual 2 2/3 pixels per clock over dual 8 bit busses 3 bits wide.

18. The raster engine of claim 13, wherein the logic device comprises a multiplexer.

19. The raster engine of claim 1, wherein the logic device comprises a multiplexer.

20. The raster engine of claim 1, wherein the selected display mode comprises a direct display command interface.

* * * * *